US006975651B1

(12) United States Patent  
Ono et al.

(10) Patent No.: US 6,975,651 B1  
(45) Date of Patent: Dec. 13, 2005

(54) CELL PROCESSING APPARATUS, ATM EXCHANGE AND CELL DISCARDING METHOD

(75) Inventors: Hideaki Ono, Kawasaki (JP); Ryuichi Takechi, Kawasaki (JP); Hiroshi Sasaki, Sendai (JP); Takayuki Sasaki, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/441,124

(22) Filed: Nov. 17, 1999

(30) Foreign Application Priority Data

Jan. 20, 1999 (JP) ................................ 11-011766

(51) Int. Cl.[7] ............................................... H04J 3/24
(52) U.S. Cl. .................. 370/474; 370/394; 370/395.1; 370/395.6; 370/471; 370/476
(58) Field of Search ................................ 370/386, 394, 370/395.1, 395.6, 395.61, 395.63, 395.64, 370/465, 470, 471, 472, 474, 476, 477

(56) References Cited

U.S. PATENT DOCUMENTS

| | | | | |
|---|---|---|---|---|
| 5,509,007 A | | 4/1996 | Takashima et al. | 370/60.1 |
| 5,953,339 A | * | 9/1999 | Baldwin et al. | 370/397 |
| 6,023,465 A | * | 2/2000 | Brueckheimer et al. | 370/386 |
| 6,226,294 B1 | * | 5/2001 | Caves | 370/395.61 |
| 6,282,196 B1 | * | 8/2001 | Lyons et al. | 370/394 |
| 6,317,432 B1 | * | 11/2001 | Ono et al. | 370/395 |
| 6,317,433 B1 | * | 11/2001 | Galand et al. | 370/395.2 |

FOREIGN PATENT DOCUMENTS

| | | | | |
|---|---|---|---|---|
| EP | 0 872 983 A1 | 10/1998 | ........... | H04L 12/56 |
| GB | 2 322 515 A | 8/1998 | .......... | H04Q 11/04 |
| JP | 5268255 | 10/1993 | ........... | H04L 12/48 |
| WO | WO 97/38550 | 10/1997 | .......... | H04Q 11/04 |
| WO | WO 98/18286 | 4/1998 | .......... | H04Q 11/04 |
| WO | WO 98/29987 | 7/1998 | ........... | H04L 12/56 |

OTHER PUBLICATIONS

ATM Transport In Cellular Networks, XVI World Telecom Congress Proceedings, G. Eneroth et al, Sep. 21, 1997, pp. 139-146.

* cited by examiner

*Primary Examiner*—Dang Ton  
*Assistant Examiner*—Shick Hom  
(74) *Attorney, Agent, or Firm*—Katten Muchin Rosenman LLP

(57) ABSTRACT

A cell processing apparatus which executes processing for switching a short-packet in AAL Type 2 cell format has a separation processing unit and a restoration processing unit. The separation processing unit splits a short packet, which has a length greater than a length L (=48) bytes capable of being accommodated in one ATM cell, into two portions, accommodates significant data containing (1) one of the short-packet portions and (2) short-packet length information, in a payload area of the first ATM cell, accommodates remaining significant data including another short-packet portion, which could not be accommodated in the first ATM cell, in a payload area of the second ATM cell, and inputs the first and second ATM cells to an ATM switch. The restoration processing unit refers to the short-packet length information that has been accommodated in the first ATM cell output from the ATM switch, restores the original short packet, the length of which exceeds L bytes, using the short packet portions that have been accommodated in respective ones of the first and second ATM cells, and sends the restored short packet to a line in the AAL Type 2 cell format.

21 Claims, 58 Drawing Sheets

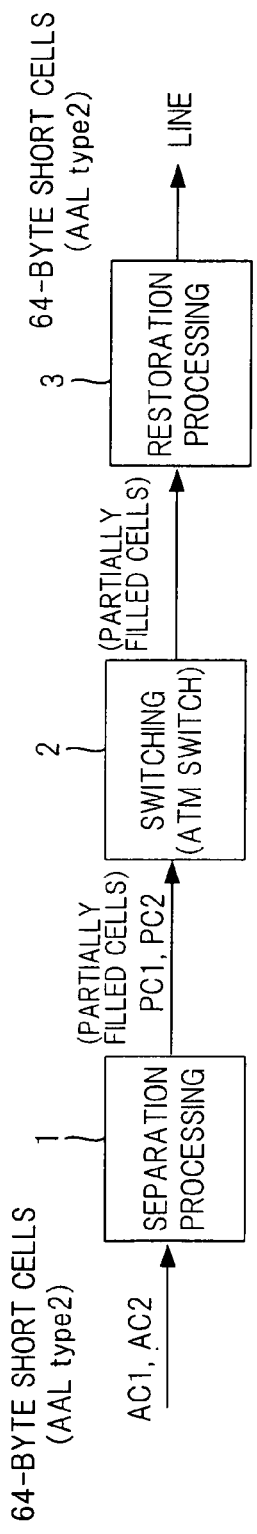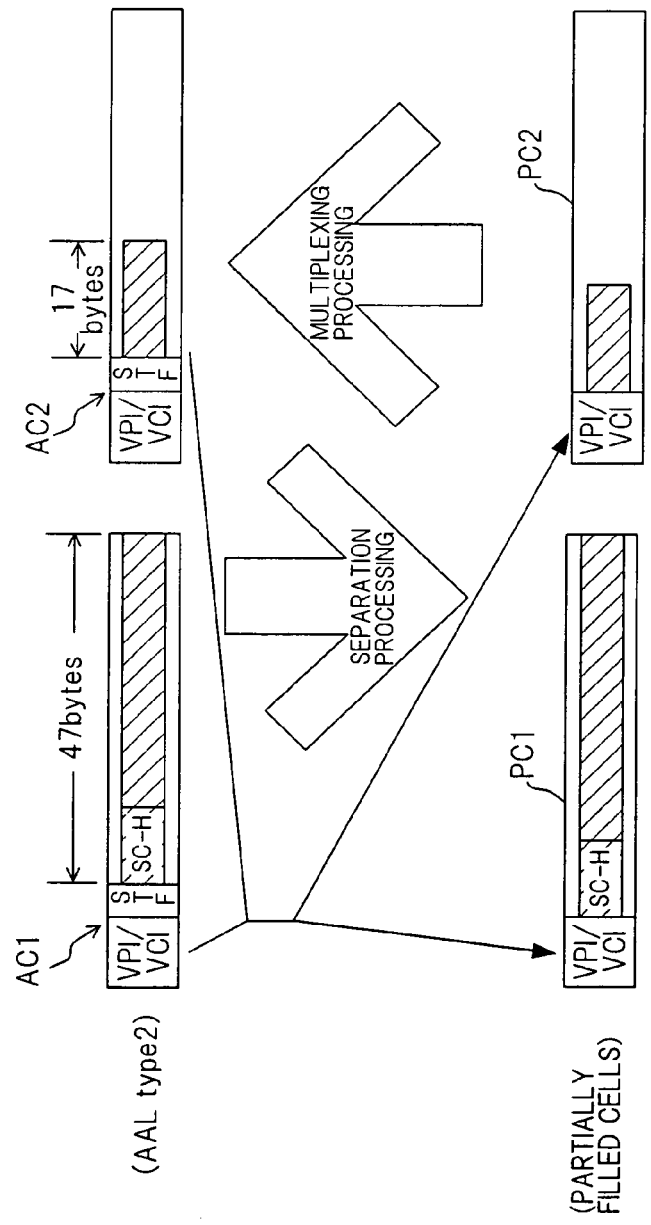

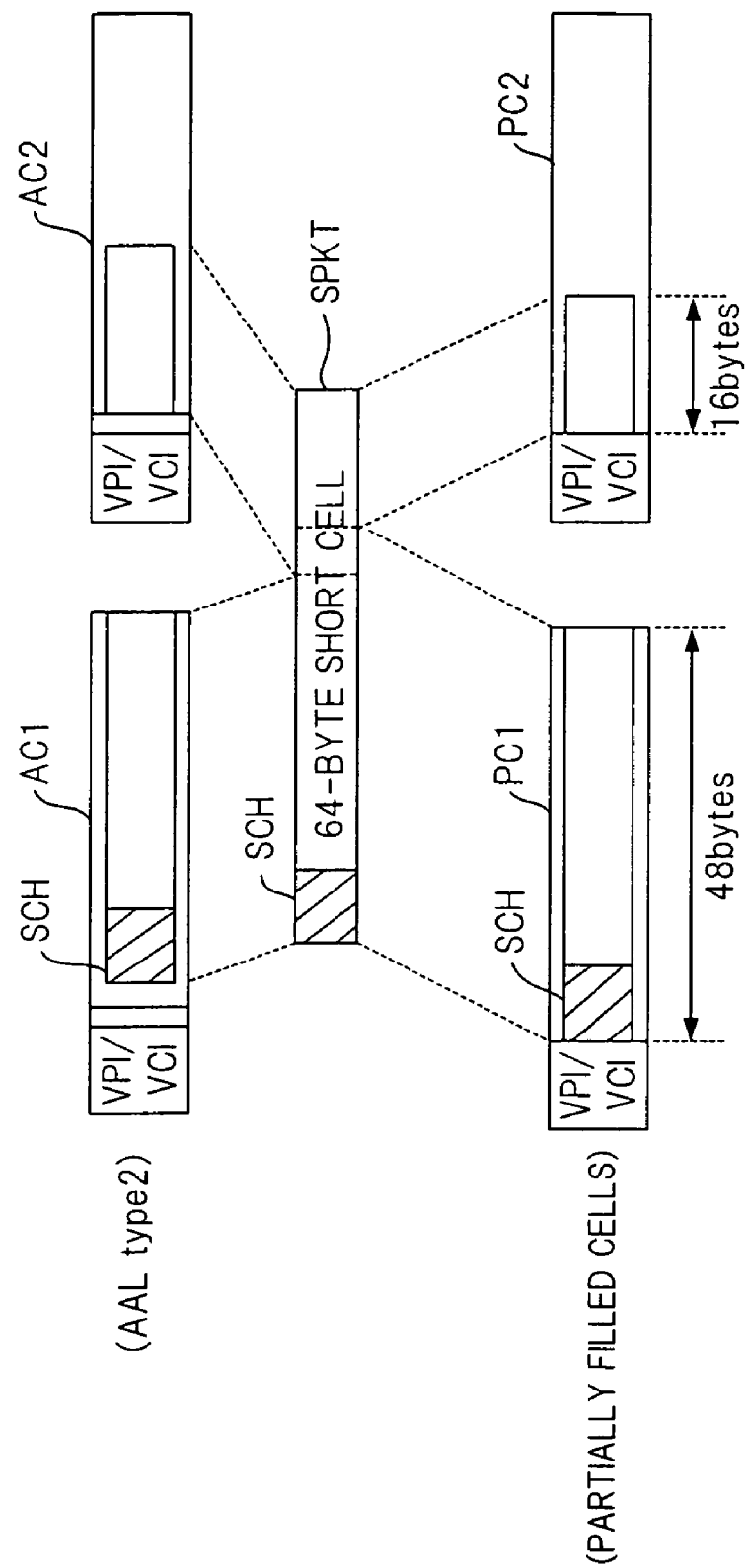

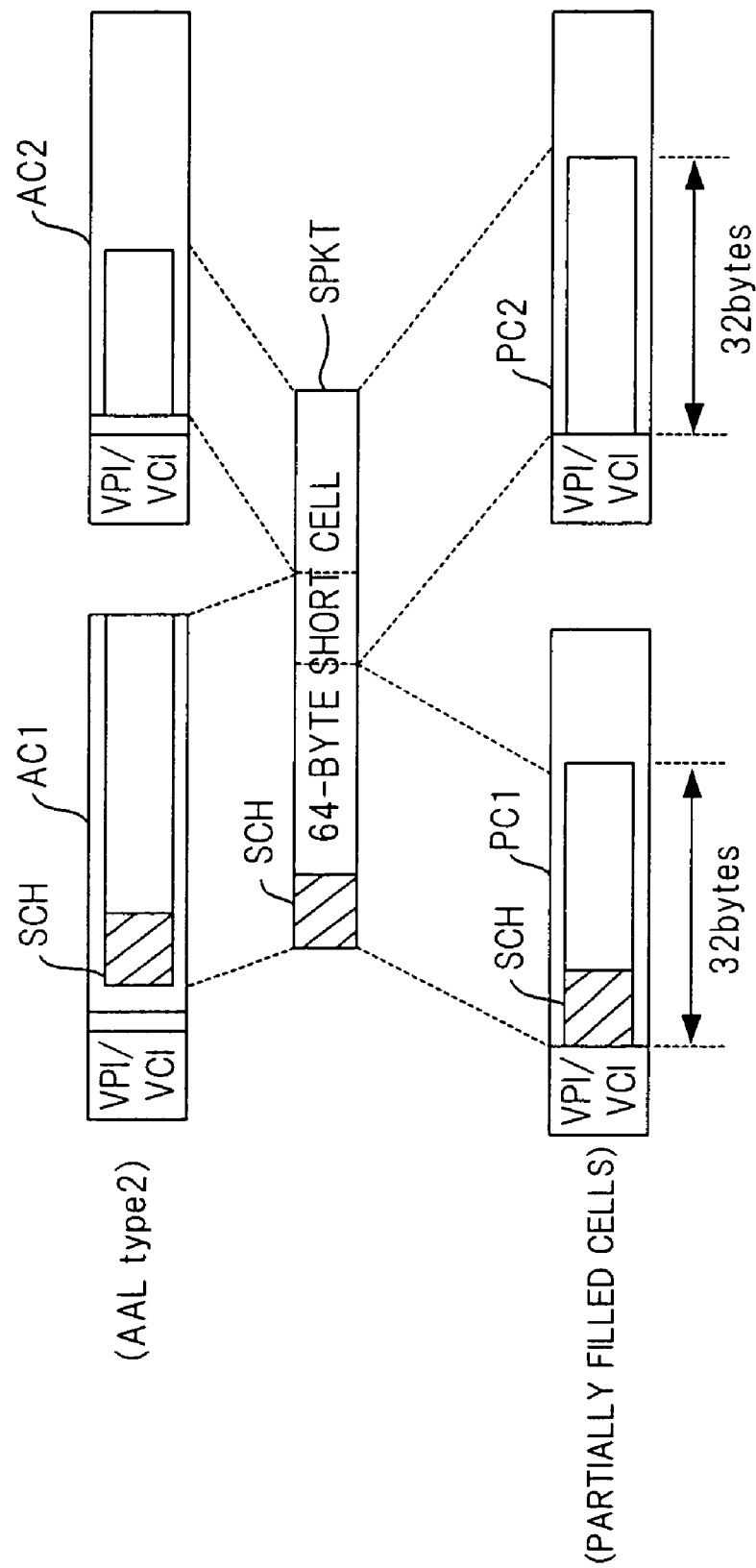

FIG.4

| LENGTH OF SHORT PACKET (byte) | LI [ (LENGTH OF SHORT PACKET) - 4] | NUMBER OF BYTES OF FIRST CELL B1 | NUMBER OF BYTES OF SECOND CELL B2 |
|---|---|---|---|
| 4 | 0 | 4 | 0 |
| 5 | 1 | 5 | 0 |
| ⋮ | ⋮ | ⋮ | 0 |
| 47 | 43 | 47 | 0 |
| 48 | 44 | 48 | 0 |
| 49 | 45 | 24 | 25 |
| 50 | 46 | 25 | 25 |
| 51 | 47 | 25 | 26 |
| 52 | 48 | 26 | 26 |
| 53 | 49 | 26 | 27 |
| 54 | 50 | 27 | 27 |
| 55 | 51 | 27 | 28 |
| 56 | 52 | 28 | 28 |
| 57 | 53 | 28 | 29 |
| 58 | 54 | 29 | 29 |
| 59 | 55 | 29 | 30 |
| 60 | 56 | 30 | 30 |
| 61 | 57 | 30 | 31 |
| 62 | 58 | 31 | 31 |
| 63 | 59 | 31 | 32 |
| 64 | 60 | 32 | 32 |
| 65 | 61 | 32 | 33 |
| 66 | 62 | 33 | 33 |
| 67 | 63 | 33 | 34 |

FIG.10

| LENGTH (BYTES) OF ARRIVING SHORT PACKET | ARRIVING CELL LI (= LENGTH − 4) | SIGNIFICANT-DATA LENGTH OF FIRST CELL | FIRST-CELL LI (BINARY NOTATION) | SIGNIFICANT-DATA LENGTH OF SECOND CELL | SECOND-CELL LI (BINARY NOTATION) |
|---|---|---|---|---|---|
| 4 (USE PROHIBITED) | 0 | – | – (USE PROHIBITED) | – | – |
| 5 | 1 | 5 | 000001 | – | – |
| 6 | 2 | 6 | 000010 | – | – |
| 7 | 3 | 7 | 000011 | – | – |
| 8 | 4 | 8 | 000100 | – | – |
| 9 | 5 | 9 | 000101 | – | – |
| 10 | 6 | 10 | 000110 | – | – |
| 11 | 7 | 11 | 000111 | – | – |
| 12 | 8 | 12 | 001000 | – | – |
| 13 | 9 | 13 | 001001 | – | – |
| 14 | 10 | 14 | 001010 | – | – |
| 15 | 11 | 15 | 001011 | – | – |
| 16 | 12 | 16 | 001100 | – | – |
| 17 | 13 | 17 | 001101 | – | – |
| 18 | 14 | 18 | 001110 | – | – |
| 19 | 15 | 19 | 001111 | – | – |
| 20 | 16 | 20 | 010000 | – | – |
| 21 | 17 | 21 | 010001 | – | – |
| 22 | 18 | 22 | 010010 | – | – |
| 23 | 19 | 23 | 010011 | – | – |
| 24 | 20 | 24 | 010100 | – | – |
| 25 | 21 | 25 | 010101 | – | – |
| 26 | 22 | 26 | 010110 | – | – |
| 27 | 23 | 27 | 010111 | – | – |
| 28 | 24 | 28 | 011000 | – | – |
| 29 | 25 | 29 | 011001 | – | – |
| 30 | 26 | 30 | 011010 | – | – |
| 31 | 27 | 31 | 011011 | – | – |
| 32 | 28 | 32 | 011100 | – | – |
| 33 | 29 | 33 | 011101 | – | – |
| 34 | 30 | 34 | 011110 | – | – |
| 35 | 31 | 35 | 011111 | – | – |
| 36 | 32 | 36 | 100000 | – | – |
| 37 | 33 | 37 | 100001 | – | – |
| 38 | 34 | 38 | 100010 | – | – |
| 39 | 35 | 39 | 100011 | – | – |
| 40 | 36 | 40 | 100100 | – | – |

FIG.11

| LENGTH (BYTES) OF ARRIVING SHORT PACKET | ARRIVING CELL LI (= LENGTH - 4) | SIGNIFICANT -DATA LENGTH OF FIRST CELL | FIRST-CELL LI (BINARY NOTATION) | SIGNIFICANT -DATA LENGTH OF SECOND CELL | SECOND-CELL LI (BINARY NOTATION) |
|---|---|---|---|---|---|
| 41 | 37 | 41 | 100101 | – | – |
| 42 | 38 | 42 | 100110 | – | – |
| 43 | 39 | 43 | 100111 | – | – |
| 44 | 40 | 44 | 101000 | – | – |
| 45 | 41 | 45 | 101001 | – | – |
| 46 | 42 | 46 | 101010 | – | – |
| 47 | 43 | 47 | 101011 | – | – |
| 48 | 44 | 48 | 101100 | – | – |
| 49 | 45 | 48 | 000000 | 1 | 101101 |
| 50 | 46 | 48 | 000000 | 2 | 101110 |
| 51 | 47 | 48 | 000000 | 3 | 101111 |
| 52 | 48 | 48 | 000000 | 4 | 110000 |
| 53 | 49 | 48 | 000000 | 5 | 110001 |
| 54 | 50 | 48 | 000000 | 6 | 110010 |
| 55 | 51 | 48 | 000000 | 7 | 110011 |
| 56 | 52 | 48 | 000000 | 8 | 110100 |
| 57 | 53 | 48 | 000000 | 9 | 110101 |
| 58 | 54 | 48 | 000000 | 10 | 110110 |
| 59 | 55 | 48 | 000000 | 11 | 110111 |
| 60 | 56 | 48 | 000000 | 12 | 111000 |
| 61 | 57 | 48 | 000000 | 13 | 111001 |
| 62 | 58 | 48 | 000000 | 14 | 111010 |
| 63 | 59 | 48 | 000000 | 15 | 111011 |
| 64 | 60 | 48 | 000000 | 16 | 111100 |
| 65 | 61 | 48 | 000000 | 17 | 111101 |
| 66 | 62 | 48 | 000000 | 18 | 111110 |
| 67 | 63 | 48 | 000000 | 19 | 111111 |

FIG.13

| LENGTH OF ARRIVING SHORT PACKET | LI OF ARRIVING CELL | SIGNIFICANT-DATA LENGTH OF FIRST CELL | FIRST-CELL LI | SIGNIFICANT-DATA LENGTH OF SECOND CELL | SECOND-CELL LI |
|---|---|---|---|---|---|
| 4 | 0 | 4 | 0 | - | - |
| 5 | 1 | 5 | 1 | - | - |
| 6 | 2 | 6 | 2 | - | - |
| 7 | 3 | 7 | 3 | - | - |
| 8 | 4 | 8 | 4 | - | - |
| 9 | 5 | 9 | 5 | - | - |
| 10 | 6 | 10 | 6 | - | - |
| 11 | 7 | 11 | 7 | - | - |
| 12 | 8 | 12 | 8 | - | - |
| 13 | 9 | 13 | 9 | - | - |
| 14 | 10 | 14 | 10 | - | - |
| 15 | 11 | 15 | 11 | - | - |
| 16 | 12 | 16 | 12 | - | - |
| 17 | 13 | 17 | 13 | - | - |
| 18 | 14 | 18 | 14 | - | - |
| 19 | 15 | 19 | 15 | - | - |
| 20 | 16 | 20 | 16 | - | - |
| 21 | 17 | 21 | 17 | - | - |
| 22 | 18 | 22 | 18 | - | - |
| 23 | 19 | 23 | 19 | - | - |
| 24 | 20 | 24 | 20 | - | - |

FIG.14

| LENGTH OF ARRIVING SHORT PACKET | LI OF ARRIVING CELL | SIGNIFICANT -DATA LENGTH OF FIRST CELL | FIRST- CELL LI | SIGNIFICANT -DATA LENGTH OF SECOND CELL | SECOND- CELL LI |
|---|---|---|---|---|---|
| 25 | 21 | 25 | 21 | – | – |
| 26 | 22 | 26 | 22 | – | – |
| 27 | 23 | 27 | 23 | – | – |
| 28 | 24 | 28 | 24 | – | – |
| 29 | 25 | 29 | 25 | – | – |
| 30 | 26 | 30 | 26 | – | – |
| 31 | 27 | 31 | 27 | – | – |
| 32 | 28 | 32 | 28 | – | – |
| 33 | 29 | 33 | 29 | – | – |
| 34 | 30 | 34 | 30 | – | – |
| 35 | 31 | 35 | 31 | – | – |
| 36 | 32 | 36 | 32 | – | – |
| 37 | 33 | 37 | 33 | – | – |
| 38 | 34 | 38 | 34 | – | – |
| 39 | 35 | 39 | 35 | – | – |
| 40 | 36 | 40 | 36 | – | – |
| 41 | 37 | 41 | 37 | – | – |
| 42 | 38 | 42 | 38 | – | – |
| 43 | 39 | 43 | 39 | – | – |
| 44 | 40 | 44 | 40 | – | – |
| 45 | 41 | 45 | 41 | – | – |
| 46 | 42 | 46 | 42 | – | – |
| 47 | 43 | 47 | 43 | – | – |
| 48 | 44 | 48 | 44 | – | – |
| 49 | 45 | 32 | 45 | 17 | 16 |
| 50 | 46 | 32 | 46 | 18 | 17 |
| 51 | 47 | 32 | 47 | 19 | 18 |
| 52 | 48 | 32 | 48 | 20 | 19 |
| 53 | 49 | 32 | 49 | 21 | 20 |
| 54 | 50 | 32 | 50 | 22 | 21 |
| 55 | 51 | 32 | 51 | 23 | 22 |
| 56 | 52 | 32 | 52 | 24 | 23 |
| 57 | 53 | 32 | 53 | 25 | 24 |
| 58 | 54 | 32 | 54 | 26 | 25 |
| 59 | 55 | 32 | 55 | 27 | 26 |
| 60 | 56 | 32 | 56 | 28 | 27 |
| 61 | 57 | 32 | 57 | 29 | 28 |
| 62 | 58 | 32 | 58 | 30 | 29 |
| 63 | 59 | 32 | 59 | 31 | 30 |
| 64 | 60 | 32 | 60 | 32 | 31 |
| 65 | 61 | 32 | 61 | 33 | 32 |
| 66 | 62 | 32 | 62 | 34 | 33 |
| 67 | 63 | 32 | 63 | 35 | 34 |

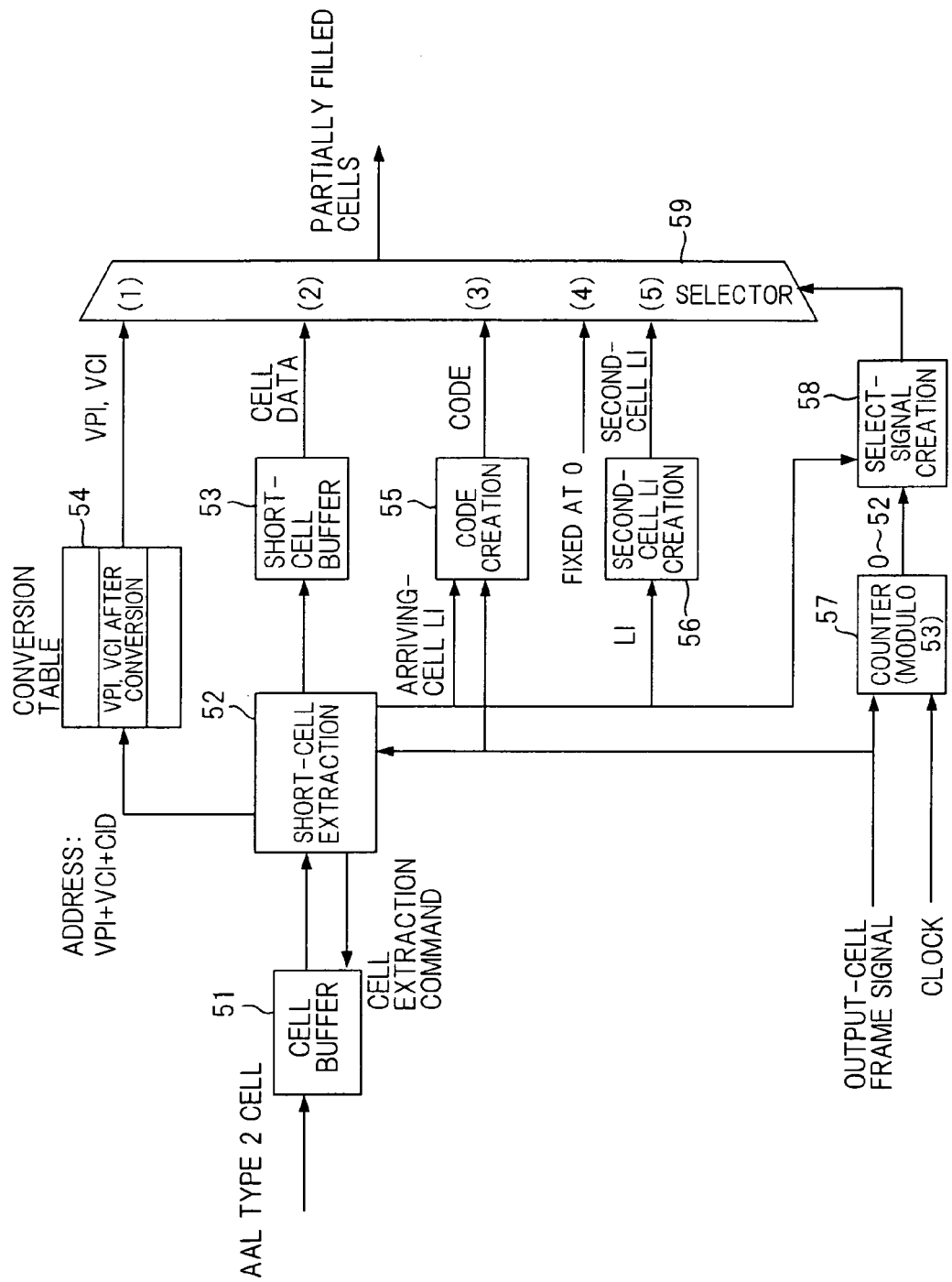

FIG. 17A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (4) |

FIG. 17B

WHEN LI > 44 HOLDS
(WHEN FIRST CELL IS SENT)

| COUNT | SELECT SIGNAL |
|---|---|
| 0~4 | SELECT (1) |
| 5~36 | SELECT (2) |
| 37~51 | SELECT (4) |
| 52 | SELECT (3) |

FIG. 17C

WHEN LI > 44 HOLDS
(WHEN SECOND CELL IS SENT)

| COUNT | SELECT SIGNAL |
|---|---|
| 0~4 | SELECT (1) |
| 5 | SELECT (4) |
| 6 | SELECT (5) |
| 7 | SELECT (4) |
| 8~(LI-21) | SELECT (2) |
| (LI-21)+1~51 | SELECT (4) |
| 52 | SELECT (3) |

FIG.20A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (3) |

FIG.20B

WHEN LI > 44 HOLDS
(WHEN FIRST CELL IS SENT)

| COUNT | SELECT SIGNAL |
|---|---|
| 0~4 | SELECT (1) |
| 5~52 | SELECT (2) |

FIG.20C

WHEN LI > 44 HOLDS
(WHEN SECOND CELL IS SENT)

| COUNT | SELECT SIGNAL |
|---|---|
| 0~4 | SELECT (1) |
| 5~(LI−40) | SELECT (2) |
| (LI−40)+1~51 | SELECT (3) |

FIG.23A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (3) |

FIG.23B

WHEN LI > 44 HOLDS
(WHEN FIRST CELL IS SENT)

| COUNT | SELECT SIGNAL |
|---|---|
| 0~4 | SELECT (1) |
| 5~(B1+4) | SELECT (2) |
| (B1+5)~52 | SELECT (3) |

FIG.23C

WHEN LI > 44 HOLDS
(WHEN SECOND CELL IS SENT)

| COUNT | SELECT SIGNAL |
|---|---|
| 0~4 | SELECT (1) |
| 5~(B2+4) | SELECT (2) |
| (B2+5)~52 | SELECT (3) |

FIG.26A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (3) |

FIG.26B

WHEN LI > 44 HOLDS
(WHEN FIRST CELL IS SENT)

| COUNT | SELECT SIGNAL |
|---|---|
| 0~4 | SELECT (1) |
| 5~(B1+4) | SELECT (2) |
| (B1+5)~51 | SELECT (3) |
| 52 | SELECT (4) |

FIG.26C

WHEN LI > 44 HOLDS
(WHEN SECOND CELL IS SENT)

| COUNT | SELECT SIGNAL |
|---|---|
| 0~4 | SELECT (1) |
| 5~(B2+4) | SELECT (2) |
| (B2+5)~51 | SELECT (3) |
| 52 | SELECT (4) |

FIG.29A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (3) |

FIG.29B

WHEN LI > 44 HOLDS
(WHEN FIRST CELL IS SENT)

| COUNT | SELECT SIGNAL |
|---|---|
| 0~4 | SELECT (1) |
| 5~6 | SELECT (2) |
| 7 | SELECT (4) |
| 8~(B1+4) | SELECT (2) |
| (B1+5)~52 | SELECT (3) |

FIG.29C

WHEN LI > 44 HOLDS
(WHEN SECOND CELL IS SENT)

| COUNT | SELECT SIGNAL |
|---|---|
| 0~4 | SELECT (1) |
| 5~6 | SELECT (2) |
| 7 | SELECT (4) |
| 8~(B2+4) | SELECT (2) |
| (B2+5)~52 | SELECT (3) |

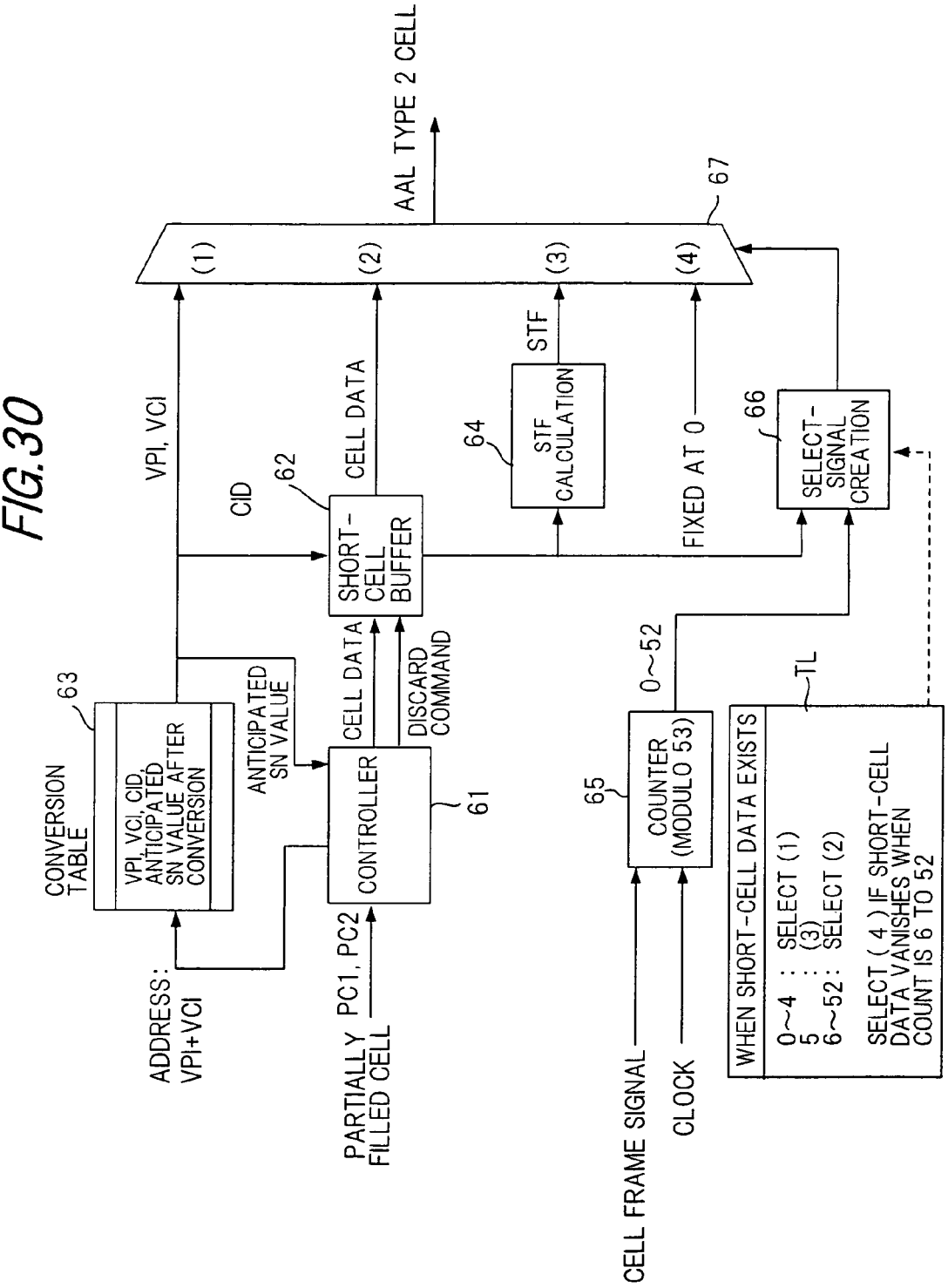

FIG.32A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (3) |

FIG.32B

WHEN LI > 44 HOLDS
(WHEN FIRST CELL IS SENT)

| COUNT | SELECT SIGNAL |
|---|---|
| 0 | SELECT (4) |
| 1~4 | SELECT (1) |
| 5~(B1+4) | SELECT (2) |
| (B1+5)~52 | SELECT (3) |

FIG.32C

WHEN LI > 44 HOLDS
(WHEN SECOND CELL IS SENT)

| COUNT | SELECT SIGNAL |
|---|---|
| 0 | SELECT (4) |
| 1~4 | SELECT (1) |
| 5~(B2+4) | SELECT (2) |
| (B2+5)~52 | SELECT (3) |

FIG.35A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (3) |

FIG.35B

WHEN LI > 44 HOLDS
(WHEN FIRST CELL IS SENT)

| COUNT | SELECT SIGNAL |
|---|---|
| 0~4 | SELECT (1) |
| 5~52 | SELECT (2) |

FIG.35C

WHEN LI > 44 HOLDS
(WHEN SECOND CELL IS SENT)

| COUNT | SELECT SIGNAL |
|---|---|
| 0~4 | SELECT (1) |
| 5~(LI-40) | SELECT (2) |
| (LI-40)+1~51 | SELECT (3) |
| 52 | SELECT (4) |

FIG.38A

WHEN LI < 45 HOLDS

| COUNT | SELECT SIGNAL |
|---|---|
| 0~4 | SELECT (1) |
| 5~(LI+8) | SELECT (2) |
| (LI+9)~52 | SELECT (4) |

FIG.38B

WHEN LI > 44 HOLDS
(WHEN FIRST CELL IS SENT)

| COUNT | SELECT SIGNAL |
|---|---|
| 0~4 | SELECT (1) |
| 5~7 | SELECT (4) |
| 8~52 | SELECT (2) |

FIG.38C

WHEN LI > 44 HOLDS
(WHEN SECOND CELL IS SENT)

| COUNT | SELECT SIGNAL |
|---|---|
| 0~4 | SELECT (1) |
| 5 | SELECT (4) |
| 6 | SELECT (5) |
| 7 | SELECT (4) |
| 8~(LI−37) | SELECT (2) |
| (LI−37)+1~52 | SELECT (4) |

$Cadd_1 = Gadd_2$ $Cadd_2 = Gadd_3$

NUMERAL IN PARENTHESES
INDICATES NUMBER OF BITS

FIG.55 PRIOR ART

| ABBREVIATION | NUMBER OF BITS | CONTENT | REMARKS |
|---|---|---|---|
| VPI | 12 | VIRTUAL PATH IDENTIFIER | |
| VCI | 16 | VIRTUAL CHANNEL IDENTIFIER | |
| PTI | 3 | PAYLOAD-TYPE IDENTIFIER | |
| CLP | 1 | CELL LOSS PRIORITY | |
| HEC | 8 | HEADER ERROR CONTROL | |
| OSF | 6 | OFFSET FIELD (POINTER TO START OF SHORT CELL) (0 – 47) OSF = 0: SHORT-CELL MAPPING IMMEDIATELY AFTER START FIELD OSF = 47: NO BREAK IN SHORT CELL WITHIN THIS CELL | OSF = 48 OR GREATER PROHIBITED |
| SN | 1 | 1-BIT SEQUENCE NO. (0.1.0.1.) | MODULO 2 |
| P | 1 | PARITY (ODD-NUMBER PARITY WITH RESPECT TO TOTAL OF SEVEN BITS OF StartPointer, SN) | |
| CID | 8 | SHORT-CELL CHANNEL IDENTIFIER | |
| LI | 6 | SHORT-CELL PAYLOAD LENGTH INDICATION ( 0 – 44) (0 INDICATES PAYLOAD LENGTH OF ONE BYTE ) | |
| UUI | 2 | USER-USER IDENTIFICATION (HIGHER-ORDER SIDE) | |
| UUI | 3 | USER-USER IDENTIFICATION (LOWER-ORDER SIDE) | |
| S-HEC | 5 | SHORT-CELL HEADER ERROR CORRECTION (GENERATED POLYNOMIAL $X^5 + X^2 + 1$) | |

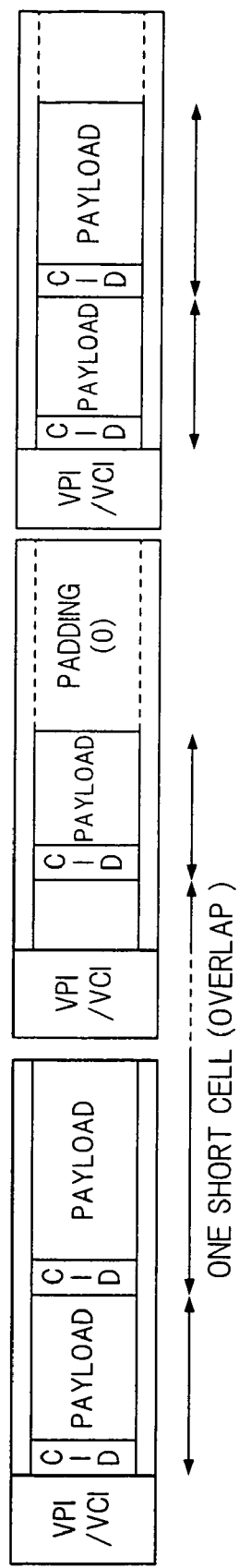

CELL PROCESSING APPARATUS, ATM EXCHANGE AND CELL DISCARDING METHOD

BACKGROUND OF THE INVENTION

This invention relates to cell processing apparatus, an ATM exchange and a cell discarding method. More particularly, the invention relates to an ATM processing apparatus, ATM exchange and cell discarding method for handling cells compliant with the standard of AAL Type 2 in the field of communications that employs ATM (Asynchronous Transfer Mode).

In ATM communication, the payload of an ATM cell is packed with information and the information is transmitted by sending the ATM cell via an ATM connection set up in advance. More specifically, destination information (VPI/VCI: Virtual Path Identifier/Virtual Channel Identifier) is placed in the header of the ATM cell and the ATM cell is sent to a destination via a predetermined ATM connection in an ATM network in accordance with the VPI/VCI, whereby the information that has been encapsulated in the payload is transmitted.

In the field of mobile communications, data is transmitted upon being converted by compression processing to a data format having a low bit rate in order to utilize the communication bandwidth effectively. When information having such a low bit rate is encapsulated in the payload of a standard ATM cell, filling the payload of one ATM cell with data takes time. This can lead to a delay in the data and to a decline in communications quality. A multiplex transfer scheme referred to as AAL Type 2 has been recommended by ITU-T Recommendation I.363.2 as a scheme that makes possible the transmission of information having a low bit rate with little delay. AAL Type 2 is suited to the transfer of low bit rate information of the kind used in mobile communications networks and is a transfer method that contemplates effective bandwidth utilization with little delay.

FIGS. 54 and 55 are diagrams useful in describing the format of AAL Type 2, and FIG. 56 is a conceptual view of a transfer scheme in accordance with the standard of AAL Type 2. As shown in FIG. 54, a cell having a format that is compliant with AAL Type 2 is composed of a standard cell header and a standard cell payload. A start field STF of one byte and one or more short cells are mapped to the standard cell payload. The start field STF is composed of (1) an offset field OSF that contains a pointer (offset value) indicating the starting position of the initial short cell, (2) a field SN which stores a 1-bit sequence number, and (3) a parity field P.

A short cell is composed of a short-cell header of fixed length and a short-cell payload of variable length. Encapsulated in the short-cell header are (1) a CID (a Channel Identifier of the short cell) for identifying the short-cell connection, (2) an LI (Length Indication) indicating the payload length of the short cell, and (3) user-to-user indication UUI, etc. The above-mentioned information of low bit rate is encapsulated in the payload of the short cell. It should be noted that the LI is the result of subtracting four from the length of the short cell (the length of the short packet).

An AAL2-compliant cell contains a plurality of short cells in multiplexed form. If part of a short cell will not fit in the payload of a single AAL2 cell, the remaining portion of the short cell is mapped to the next AAL2 cell, as shown in FIG. 56. (This is referred to as "overlap".) The AAL2 cells are then sent to a destination via the predetermined ATM connection in accordance with the VPI/VCI contained in the headers.

In a case where an AAL2 cell is transmitted by an ATM connection, the following problem arises: A plurality of short cells having different CIDs are multiplexed in the payload of the AAL2 cell, as mentioned above. Since an ATM switch performs a switching operation on a per-ATM-cell basis, however, short cells cannot be switched individually and, hence, each short cell cannot be sent to the desired destination.

Accordingly, the ATM switch extracts the plurality of short cells from an AAL2 cell input thereto, generates a plurality of standard ATM cells (referred to as "partially filled cells") in each payload of which one short cell is planted (see FIG. 57), and performs switching per each partially filled cell, thereby making it possible to realize switching on a per-short-cell basis. A partially filled cell switched by the ATM switch is stored temporarily in a memory provided on the output side of the ATM switch and is restored to the format of an AAL2 cell as appropriate and transmitted over a line. If the partially filled cell resides in memory for an extended period of time in this case, a malfunction occurs because the memory becomes filled to capacity and cannot store newly arriving partially filled cells. In order to utilize the memory effectively and prevent the occurrence of malfunction, therefore, control is necessary to discard partially filled cells resident in memory for too long.

FIG. 58 is a diagram showing a conventional arrangement for implementing such cell discard control. The components include a vacant-address management FIFO 101; an input-data storage memory 102 for storing input data and its data arrival time as well as chain data (not shown) indicating the order (a→b→c) in which the input data arrived; a time counter (timer) 103 for monitoring present time; a register 104 indicating chain starting position; a delay-stipulation-time comparator 105 for comparing the present time and the arrival time to determine whether a delay stipulation time has elapsed; and a register 106 for storing the delay stipulation time.

The vacant-address management FIFO 101 manages vacant addresses of the input-data storage memory 102. The latter accepts a write address WADD from the vacant-address management FIFO 101 and stores input data as well as a time-stamp value (the present time) that is output from the time counter 103. The stored data is connected by the chain data in the order of entry. The delay-stipulation-time comparator 105 periodically (1) calculates the difference between the arrival time of the leading data pointed to by the register 104, which indicates the chain starting position, and the present time output by the time counter 103, (2) compares this difference with a stipulated value that has been set in the register 106, which stores the delay stipulation time, and (3) if the difference exceeds the stipulated value, i.e., if the following relation holds:

(arrival time+delay stipulation time)≦present time commands the discarding of the data on the grounds that the data has been residing in memory for too long, thereby making available the address that stored this data. The cell discarding processing is repeated treating the leading data as the next item of data in the order of input.

In accordance with ITU-T Recommendation I.363.2, the length of a short packet is such that a variable-length cell having a length of from 4 to 48 bytes is used as a default. However, transmission of information in excess of 48 bytes, up to a maximum length of 67 bytes (a maximum length of 64 bytes for the payload of the short packet) is allowed as an option.

FIGS. 59A and 59B illustrate an example of a short packet the length of which exceeds 48 bytes in the AAL Type 2 format, in which FIG. 59A shows a case in which a 64-byte short packet overlaps two cells and FIG. 59B a case in which the 64-byte short packet overlaps three cells. The OSF (offset) within the STF (start field) provided as the first byte of the ATM cell payload is for the purpose of indicating the position at which the leading edge of the short packet is located. The OSF indicates the number of offset bytes from the STF to the beginning of the leading edge of the short packet.

According to the prior art, it is assumed that the short cell is 48 bytes or less. A separating unit extracts one short cell from the AAL2 cell before the cell enters an ATM switch, converts this to a partially filled cell and inputs each of the partially filled cells to the ATM switch. However, if a short cell exceeds 48 bytes, the fact that the payload length of a partially filled cell (i.e., the payload length of the ATM cell) is only 48 bytes per cell means that the separating unit cannot process a short cell having a length greater than the payload length. In other words, the prior art is such that it is not possible to handle a short cell having a length of 49 to 67 bytes.

In addition to not being able to accommodate input cells having a length greater than 48 bytes, the prior art is such that cell discard processing is executed on a cell-by-cell basis with regard to partially filled cell, making it impossible to discard these cells in units of a plurality of partially filled cells at a time.

SUMMARY OF THE INVENTION

Accordingly, an object of the present invention is to enable the processing of a short cell having a length greater than 48 bytes.

Another object of the present invention is to make possible the use of an already existing ATM switch for the processing of standard ATM cells.

A further object of the present invention is to arrange it so that when a short packet having a length of greater than 48 bytes is split into two portions and the two portions are accommodated in payloads of respective ones of first and second ATM cells (first-half and second-half cells, respectively) and then transmitted, it is possible to detect the fact that one of the ATM cells has been discarded on a transfer path.

A further object of the present invention is to detect the fact that one of the ATM cells has been discarded during the course of transmission, this being accomplished using a sequence number, a code number or an error detection code.

Another object of the present invention is to so arrange it that when one of the ATM cells has been discarded during the course transmission, significant data accommodated in the other ATM cell is discarded to manage the quality of the data transmission.

Another object of the present invention is to utilize data effectively and manage the quality of data transmission by discarding the first-half cell from memory if, after the first-half cell arrives, the second-half cell fails to arrive upon elapse of a predetermined period of time.

Still another object of the present invention is to utilize memory effectively and manage the quality of data transmission by discarding short-packet data from the memory if, after the arrival of a second-half cell or after the arrival of a cell that is 48 bytes or less, short-packet data accommodated in these cells is not read out of the memory and sent to a line upon elapse of a predetermined period of time.

According to the present invention, a cell processing apparatus splits a short packet, which has a length greater than a length L (=48) bytes capable of being accommodated in one ATM cell, into two portions so as to be accommodated respectively in first and second ATM cells, accommodates (1) one of the short-packet portions and (2) short-packet length information in a payload area of the first ATM cell, accommodates an other short-packet portion, which could not be accommodated in the first ATM cell, in a payload area of the second ATM cell, and inputs each of the ATM cells to an ATM switch. The cell processing apparatus according to the present invention further extracts the short-packet portions accommodated in respective ones of the first and second ATM cells upon referring to the short-packet length information that has been accommodated in the first ATM cell output from the ATM switch, restores the original short packet whose length exceeds L bytes using the short packet portions, and sends the restored short packet to a line in the AAL2 cell format. As a result, a short cell having a length greater than 48 bytes can be processed and, moreover, and already existing ATM switch can be used.

In the cell processing apparatus according to the present invention, various methods of splitting up a short cell whose length is greater than 48 bytes are conceivable. A first method includes (1) splitting a short packet so as to accommodate one of short packet portions having a preset length in a first ATM cell and remaining short packet portion in a second ATM cell and (2) adding on length information so that it can be determined whether the first and second ATM cells are cells that have been produced by splitting a short packet and so that the length of the short packet portion in each cell can be identified. A second method includes (1) splitting a short packet so as to accommodate 48-byte short packet portion in a first cell and remaining short packet portion in a second cell and (2) making length information LI of the first cell equal to zero and length information LI of the second cell the length of the short packet.

If a short packet is split in the manner described above, then the side on which packet restoration is performed can determine whether a cell is one that has been produced by splitting a short packet whose length is greater than 48 bytes, can identify the length of the short packet portion in each cell and can restore correctly the original short packet the length of which is greater than 48 bytes.

The cell processing apparatus of the present invention (1) adds on sequence-number information in a specific area of each of first and second cells, or (2) adds on cell-identification code information in a specific area of each of first and second cells, or (3) adds on an error detection code, which has been created using all significant data of a short packet, in a specific area of the second cell. By thus adding on a sequence number, code information or an error detection code, discarding of a cell during the course of transfer can be detected on the restoration side and the quality of data transmission can be maintained by discarding the other cell that constitutes the pair with the cell whose discarding has been detected.

An ATM exchange according to the present invention comprises (1) a preprocessor for receiving a short packet in AAL Type 2 cell format, the short packet having a length greater than a length of L bytes capable of being accommodated in one ATM cell, splitting the short packet and converting it to two standard ATM cells; (2) an ATM switch for switching the standard ATM cells, which enter from the preprocessor, to a prescribed outbound path upon referring to headers of the ATM cells; and (3) a restoration unit, which is provided on the outbound-path side of the ATM switch, for receiving the two standard ATM cells created based upon the split short packet, assembling the original short packet, the length of which is greater than L bytes, using the standard ATM cells, and outputting the short packet to a line in an AAL Type 2 cell format. In accordance with this ATM exchange, a short cell having a length greater than 48 bytes can be processed.

The ATM exchange according to the present invention is such that if a second-half cell does not arrive upon elapse of a set period of time following arrival of the first-half cell, it is construed that the second-half cell was discarded during the course of a transfer and the first-half cell constituting the pair with the second-half cell is discarded. Further, if, following the arrival of the second-half cell, this cell is not sent to a line upon elapse of a set period of time, the first-half cell, which has already arrived, and the second-half cell are discarded. If this arrangement is adopted, memory can be utilized effectively and the quality of the data transmission can be maintained.

Other features and advantages of the present invention will be apparent from the following description taken in conjunction with the accompanying drawings.

BRIEF DESCRIPTION OF THE DRAWINGS

FIGS. 1A and 1B are diagrams useful in describing an overview of the present invention;

FIG. 2 is a diagram showing an example of a first partially filled cell;

FIG. 3 is a diagram showing an example of a second partially filled cell;

FIG. 4 is a table showing an example of length information (LI) and numbers of bytes into which a short packet is split;

FIG. 10 is a table (part 1) useful in describing LI values of first and second partially filled cells according to a seventh embodiment;

FIG. 11 is a table (part 2) useful in describing LI values of first and second partially filled cells according to the seventh embodiment;

FIG. 13 is a table (part 1) useful in describing LI values of first and second partially filled cells according to an eighth embodiment;

FIG. 14 is a table (part 2) useful in describing LI values of first and second partially filled cells according to the eighth embodiment;

FIG. 16 is a block diagram showing an example of the construction of a partially filled cell forming unit according to a first embodiment of the present invention;

FIGS. 17A, 17B and 17C are correspondence tables showing the correspondence between a count value and a select signal;

FIGS. 20A, 20B and 20C are correspondence tables showing the correspondence between a count value and a select signal;

FIGS. 23A, 23B and 23C are correspondence tables showing the correspondence between a count value and a select signal;

FIGS. 26A, 26B and 26C are correspondence tables showing the correspondence between a count value and a select signal;

FIGS. 29A, 29B and 29C are correspondence tables showing the correspondence between a count value and a select signal;

FIG. 30 is a block diagram showing an example of the construction of an AAL2 cell forming unit according to the fifth embodiment;

FIGS. 32A, 32B and 32C are correspondence tables showing the correspondence between a count value and a select signal;

FIGS. 35A, 35B and 35C are correspondence tables showing the correspondence between a count value and a select signal;

FIGS. 38A, 38B and 38C are correspondence tables showing the correspondence between a count value and a select signal;

FIG. 55 is a table useful in describing the formats of an AAL2 cell and short cell;

FIG. 56 is a conceptual view of a transfer scheme in accordance with AAL Type 2;

Figure 5:
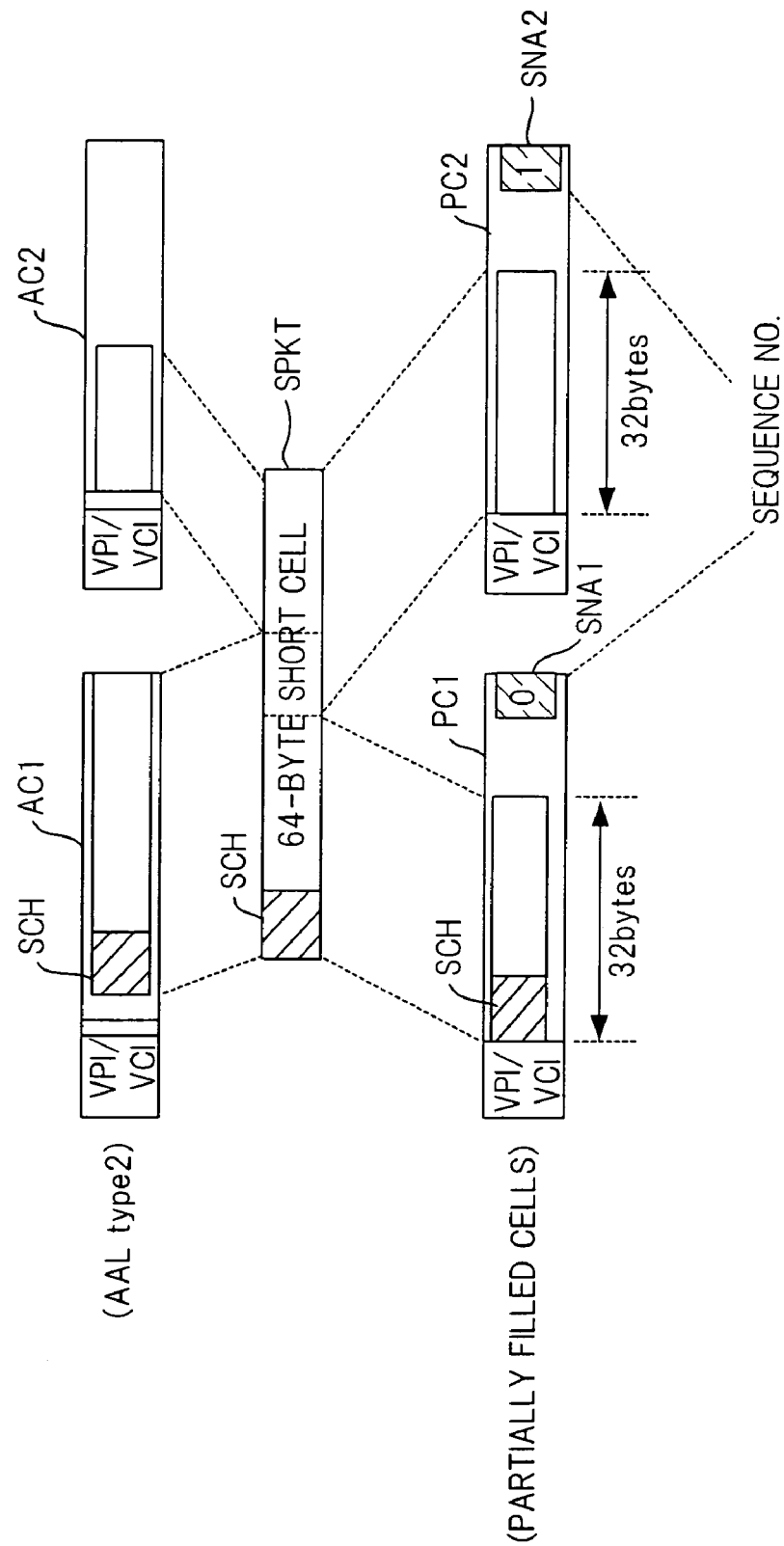
FIG. 5 is a diagram showing an example of a third partially filled cell.

DESCRIPTION OF THE PREFERRED EMBODIMENTS (A) Overview of the Invention

FIG. 1A is a diagram illustrating an overview of the present invention, and FIG. 1B is a conceptual view in which a short packet having a length of 64 bytes is transferred in the format of a cell compliant with the standard of AAL Type 2, converted to partially filled cells and then converted back to the AAL2 cell.

As shown in FIG. 1A, a separation processor 1 receives AAL2 cells AC1, AC2 from a line and, when the length of a short packet (short cell) exceeds 48 bytes, splits the short packet into two partially filled cells PC1, PC2 and then transmits these cells to an ATM switch 2. The two partially filled cells switched by the ATM switch 2 enter a restoration processor 3, which reassembles the partially filled cells back into the short packet and outputs the short packet in AAL Type 2 cell format to a line.

The separation processor 1 receives the AAL2 cells AC1, AC2. If the length of a short packet (the hatched portion) exceeds 48 bytes (the length is 64 bytes in the example of FIGS. 1A, 1B), the separation processor 1 splits one short packet into the partially filled cells PC1, PC2 and inputs the partially filled cells to the ATM switch 2. The ATM switch 2 routes the two input partially filled cell PC1, PC2 to a desired output port by processing similar to that for switching standard ATM cells (i.e., processing for routing the cells upon referring to the ATM cell headers, especially VPI and VCI). The restoration processor 3 then reassembles the two partially filled cells back into one short packet and sends the short packet in AAL Type 2 cell format to the line leading in the direction of the destination.

More specifically, since the 64-byte short packet will not fit into the payload of one ATM cell, it is transferred in two or three cells. The separation processor 1 makes a conversion from the AAL2 format to the partially filled cell format and inputs the partially filled cells to the ATM switch 2. The latter refers to the VPI and VCI of the individual partially filled cells and transfers the partially filled cells to the desired output port. An ordinary short packet having a length of 48 bytes or less is capable of being transferred by one partially filled cell. However, if the short packet has a length exceeding 48 bytes, the payload (48 bytes) of one ATM cell will not furnish sufficient area. For this reason the excessively long short packet is split into the two partially filled cells PC1, PC2, which are then transmitted. The restoration processor 3 provided on the side that receives the partially filled cells, reassembles the short packet at the moment the two partially filled cells are in possession and outputs the short packet to the line in the AAL2 cell format.

In this case it is possible for the two partially filled cells PC1, PC2 to be discarded along the transfer path on which these cells pass through the ATM switch 2 and are reassembled back into the short packet. If one of the partially filled cells has been discarded, the other partially filled cell also needs to be discarded because the original short packet can no longer be restored. Accordingly, sequence numbers, for example, are inserted into the two partially filled cells PC1, PC2 beforehand so that the discarding of a partially filled cell can be detected. Then, at the moment two cells have been received correctly, which is determined by referring to the sequence numbers, the cells are restored to the short packet having the length of 64 bytes. If it is found that the sequence numbers are not consecutive, however, it is construed that one of the partially filled cells has been discarded along the transfer path and, hence, the other partially filled cell is discarded as well. Another way to detect the discarding of a cell is to calculate an error detection/correction code, e.g., a BIP (Bit Interleaved Parity), with regard to significant data contained in a cell, and transmit the code together with the partially filled cell. If there is an error on the receiving side, then the partially filled cell is discarded.

Thus, if a short packet having a length greater than 48 bytes arrives in a form mapped to two or more AAL2 cells, the ATM exchange forms the short packet into two partially filled cells in such a manner that processing can be executed in standard ATM-cell units, switches the cells, reassembles the two partially filled cells into AAL2 cells and sends the AAL2 cells to a line. As a result, the switching of a short packet having a length greater than 48 bytes can be carried out using an ATM switch that handles standard ATM cells.

(B) Forming Short Packet Cell into Partially Filled Cells

As described above, the present invention is such that a short packet having a length that exceeds 48 bytes is required to be converted to two partially filled cells. Accordingly, various embodiments of methods of forming partially filled cells will be described below. The length of the short packet in these embodiments is assumed to be 64 bytes, by way of example.

(a) First Method of Forming Partially Filled Cells

FIG. 2 is a diagram useful in describing a first embodiment in which a 64-byte short packet SPKT that has arrived in a form mapped to two or more AAL2 cells AC1, AC2 is split into two partially filled cells PC1, PC2. According to the first embodiment, the payload area of the first partially filled cell PC1 is used in its entirety and the remaining data is transmitted by the second partially filled cell PC2. Since the payload of the first partially filled cell PC1 is 48 bytes, the data is transmitted upon mapping 48 bytes of data to the payload of the first partially filled cell PC1 and mapping the remaining 16 bytes of data to the payload of the second partially filled cell PC2. Here the length information LI contained in the header SCH of the short packet (the short-cell header) is included in the first partially filled cell PC1. In a case where the first and second partially filled cells are restored to the 64-byte short packet SPKT, therefore, the length of the short packet included in the arriving second partially filled cell can be determined based upon the length information LI.

(b) Second Method of Forming Partially Filled Cells

FIG. 3 is a diagram useful in describing a second embodiment in which the 64-byte short packet SPKT that has arrived in a form mapped to two or more AAL2 cells AC1, AC2 is split into two partially filled cells PC1, PC2. The second embodiment illustrates a case where transfer is performed using 32-byte payload areas in each of the two partially filled cells PC1, PC2. According to the second embodiment, it is necessary for the separation processor and the restoration processor to decide between them how to split the short packet depending upon the length thereof.

FIG. 4 is a table showing an example of the relationship between the short-packet length information LI and numbers of bytes into which a short packet is split. It should be noted that the length information LI is a value obtained by subtracting four from the length of the short packet. The reason for this is as follows: Since the number of bits allocated to LI is six, length can be expressed only up to 64 ($=2^6$) bytes. Accordingly, it is so arranged that short packets having the 64 lengths of 4 to 67 bytes can be expressed while short packets of one to three bytes are prohibited.

If the length of a short packet is 49 bytes or greater, then the short packet is split in the manner indicated by the table. For example, if the length of a short packet is 49 bytes, the packet is split into 24-byte and 25-byte cells. If the length of a short packet is 50 bytes, the packet is split into two cells of 25 bytes each.

(c) Third Method of Forming Partially Filled Cells

FIG. 5 is a diagram useful in describing a third embodiment in which the 64-byte short packet SPKT that has arrived in a form mapped to two or more AAL2 cells AC1, AC2 is split into two partially filled cells PC1, PC2. The third embodiment is an example in which, in addition to splitting a short packet into partially filled cells according to the second embodiment shown in FIG. 3, a conversion is made to a format in which sequence numbers are added on in sequence-number areas SNA1, SNA2 before the transfer is made. According to the third embodiment, the sequence-number areas SNA1, SNA2 are placed in areas at the tail end of the partially filled cells and the partially filled cells are transmitted upon adding on 0 and 1, for example, as the sequence numbers to the first partially filled cell PC1 and second partially filled cell PC2, respectively.

On the side that receives the partially filled cells (i.e., in the restoration processor), reference is had to the serial numbers to determine whether a cell has been discarded while in transit.

It should be noted that an error correction/detection code can be added onto a serial number so as to provide greater reliability. Further, the sequence-number areas SNA1, SNA2 may each consist of a plurality of bits in order to raise the precision with which the discarding of cells is detected. For example, if a 3-bit sequence number is used, the sequence number can take on values of 0 to 7 and the discarding of up to a maximum of seven cells can be detected. Furthermore, other code information that makes it possible to identify the first and second partially filled cells can be used instead of serial numbers.

(d) Fourth Method of Forming Partially Filled Cells

Figure 6:
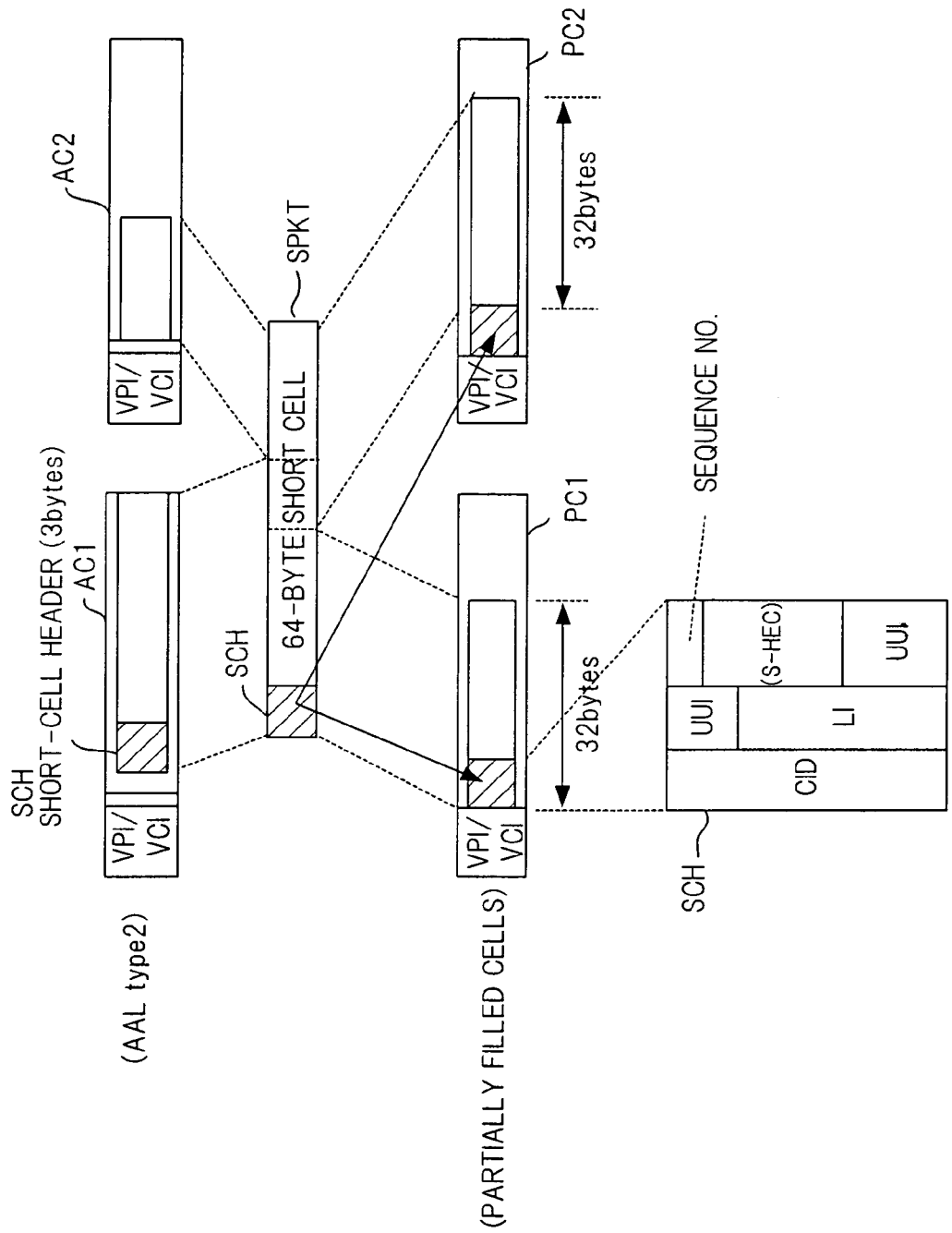
FIG. 6 is a diagram showing an example of a fourth partially filled cell.

FIG. 6 is a diagram useful in describing a fourth embodiment in which the 64-byte short packet SPKT that has arrived in a form mapped to two or more AAL2 cells AC1, AC2 is split into two partially filled cells PC1, PC2. The fourth embodiment is an example in which the short-cell header SCH of a received short cell SPKT is added onto both of the first and second partially filled cells PC1, PC2 as is, and an area (e.g., S-HEC, etc.) of the cell header SCH not used in the device is employed as a bit area for a sequence number.

If the error control information of the S-HEC area is recalculated and added on when the first and second partially filled cells PC1, PC2 are restored to an AAL2 cell, the S-HEC area can be used as an area for a sequence number. In a case where a new CID is added on again when the CID area of the partially filled cell PC1, PC2 is restored to the AAL2 format, the sequence number can be transferred also using the CID area.

(e) Fifth Method of Forming Partially Filled Cells

Figure 7:
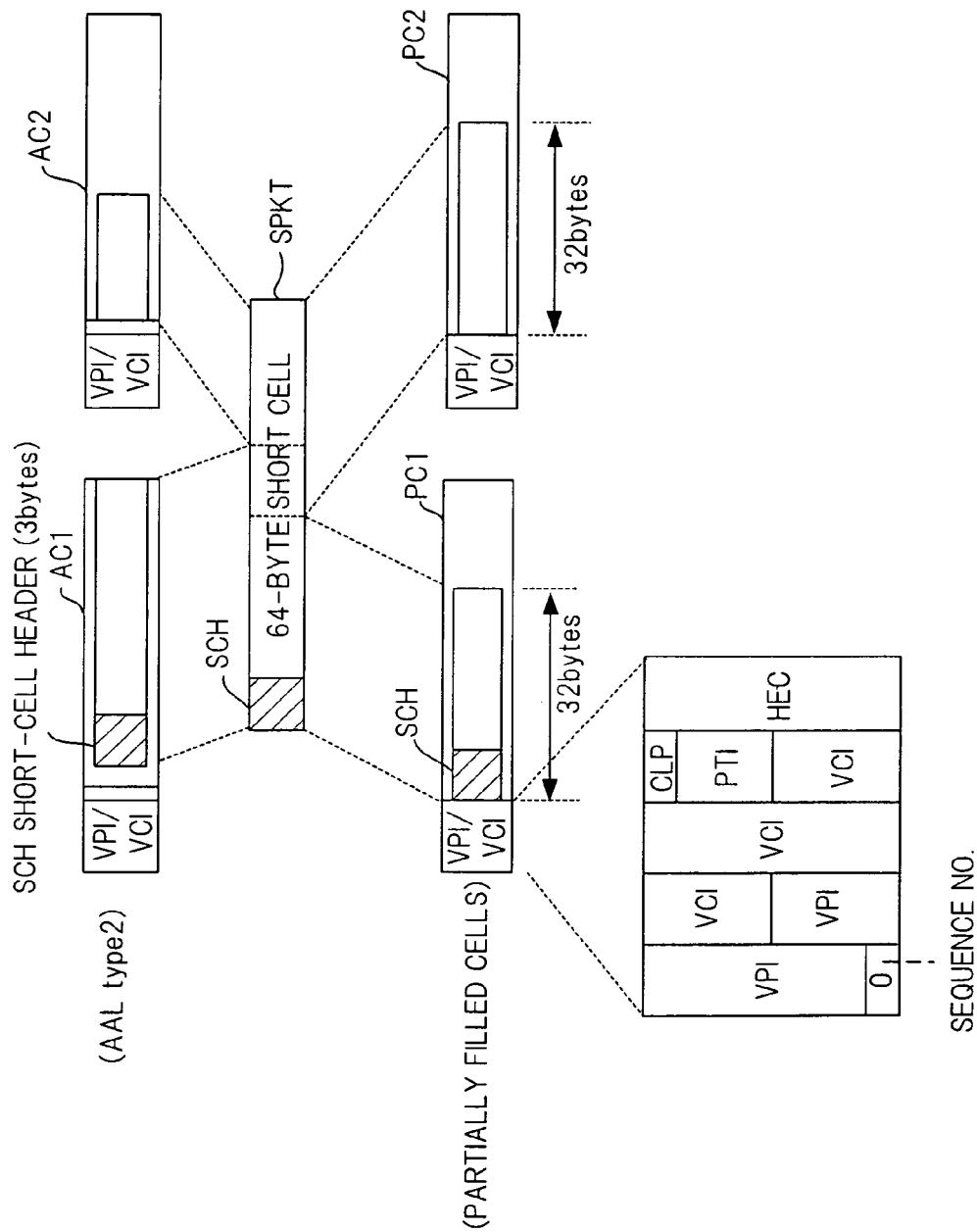
FIG. 7 is a diagram showing an example of a fifth partially filled cell.

FIG. 7 is a diagram useful in describing a fifth embodiment in which the 64-byte short packet SPKT that has arrived in a form mapped to two or more AAL2 cells AC1, AC2 is split into two partially filled cells PC1, PC2. The fifth embodiment illustrates an example of a case in which, in addition to splitting a short packet into partially filled cells according to the second embodiment shown in FIG. 3, the ATM cell header areas of the partially filled cells PC1, PC2 are used as sequence-number information areas. Adding the bits of the VPI and VCI areas of the ATM cell header gives a total of 28 bits. Depending on the system, there are instances where these areas are not used in their entirety. The fifth embodiment shown in FIG. 7 illustrates an example in which bits on the higher-order bit side of the VPI area that are not used in the system are employed as a sequence-number information area. The HEC area in the header of the ATM cell may also be used.

(f) Sixth Method of Forming Partially Filled Cells

Figure 8:
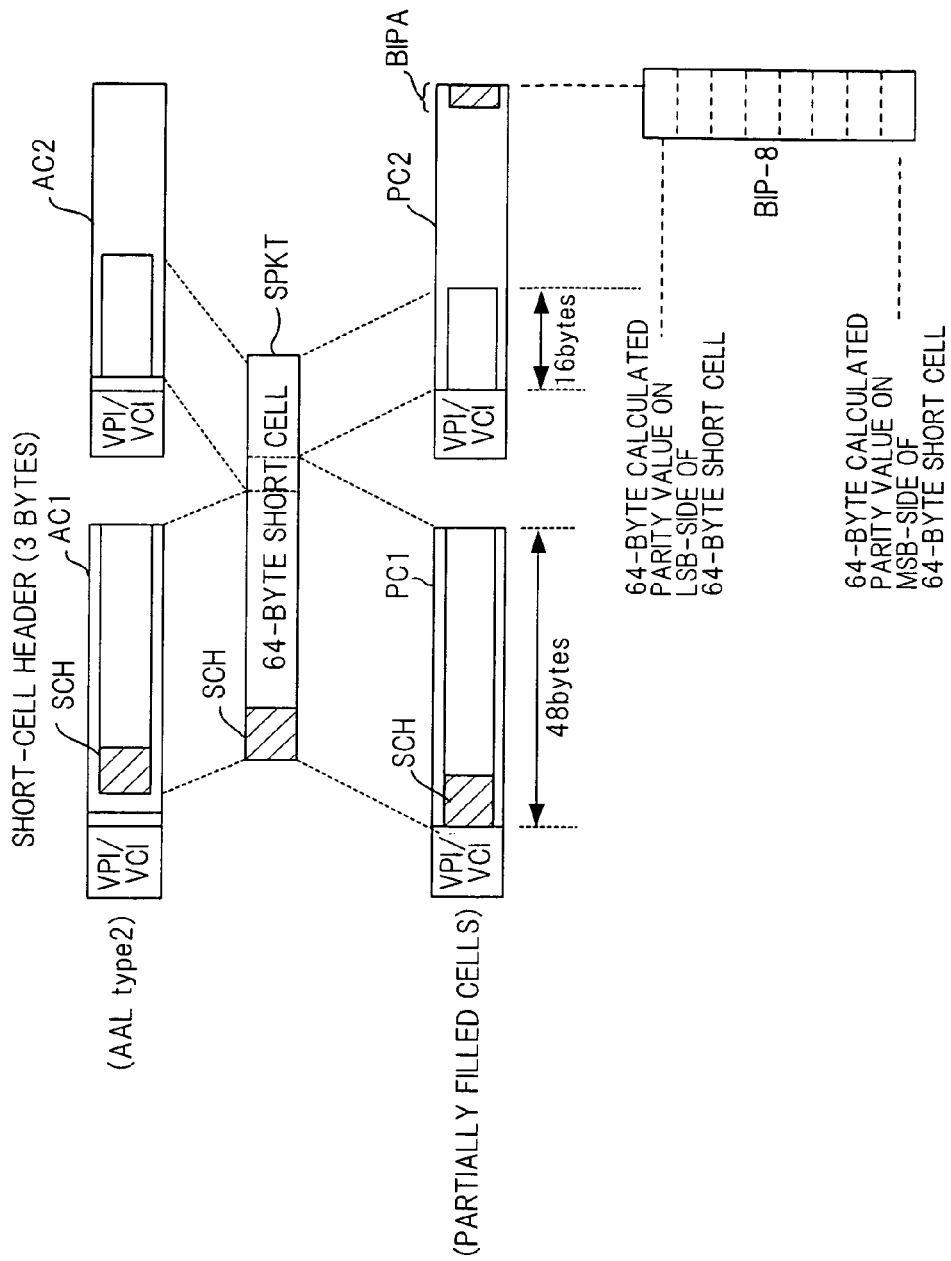
FIG. 8 is a diagram showing an example of a sixth partially filled cell.

FIG. 8 is a diagram useful in describing a sixth embodiment in which the 64-byte short packet SPKT that has arrived in a form mapped to two or more AAL2 cells AC1, AC2 is split into two partially filled cells PC1, PC2. The sixth embodiment is an example in which, in the splitting of a short packet into partially filled cells according to the first embodiment shown in FIG. 2, an error detection code is added on and error detection is performed on the receiving side, as a result of which the discarding of cells is detected.

The sixth embodiment illustrates an example of a case where BIP-8 is used as the error detection code. The separation processor on the transmitting side adopts a specific 1-byte area (e.g., the final byte) of the second partially filled cell PC2 as a calculation-result storage area BIPA for BIP-8, calculates the BIP (Bit Interleaved Parity) for each 64-byte short packet, stores the 8-bit result of calculation in the BIP area BIPA and then transmits the second partially filled cell PC2.

The restoration processor on the receiving side compares the value of the received BIP and the result of BIP calculation performed using the data of the received partially filled cells. If there is an error, i.e., if the two values do not match, the restoration processor construes that a discard or bit error has occurred and discards the incomplete part of the received data.

(f-1) When Second Partially Filled Cell PC2 is Discarded

When the first partially filled cell PC1 arrives, referring to the LI of this cell makes it possible to determine the remaining length of the cell that should be contained in the second partially filled cell PC2, which arrives next. If the second partially filled cell PC2 does arrive because it has not been discarded, the BIP value that has been stored in the second partially filled cell PC2 will match the BIP value calculated using the data from first and second partially filled cells that have arrived, as a result of which it is judged that arrival took place normally. If the second partially filled cell is discarded along the transfer path, the BIP values will not match, making it possible to detect that the second partially filled cell has been discarded or that an error has occurred.

(f-2) When First Partially Filled Cell PC1 is Discarded

When the first partially filled cell PC1 has been discarded during transfer, the second partially filled cell arrives first. The BIP calculation, therefore, is carried out when the next cell arrives. However, since the calculation is performed at locations in both the data string and bit string that differ from those of the original data, the BIP values will not agree and, hence, an anomaly can be detected.

Though the BIP is used above, another code (a CRC code, etc.) giving a higher error-detection precision can be used instead of the BIP.

(g) Seventh Method of Forming Partially Filled Cells

Figure 9:
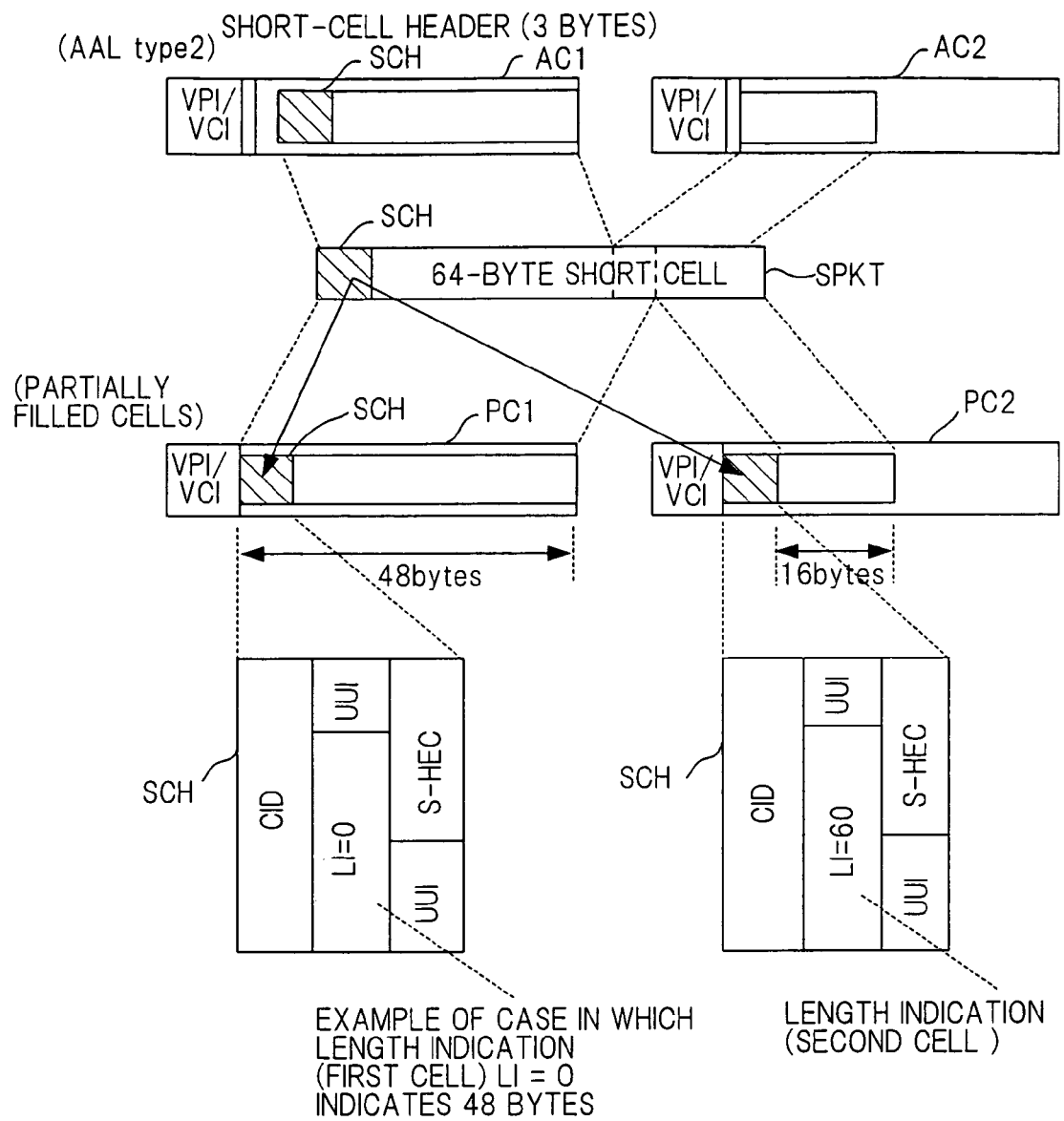
FIG. 9 is a diagram showing an example of a seventh partially filled cell.

FIG. 9 is a diagram useful in describing a seventh embodiment in which the 64-byte short packet SPKT that has arrived in a form mapped to two or more AAL2 cells AC1, AC2 is split into two partially filled cells PC1, PC2. According to the seventh embodiment, the short packet SPKT is split into the first and second partially filled cells PC1, PC2 in a manner similar to that of the first embodiment shown in FIG. 2. The short-cell header SCH is added onto both of these partially filled cells and the length information LI within the header of each partially filled cell is used to determine whether the cell is the first partially filled cell or second partially filled cell obtained at splitting of the short packet into the partially filled cells. It should be noted that LI=000000 is taken to indicate a length of 48 bytes. If the length of a short packet exceeds 48 bytes in the seventh embodiment, the length of the significant data in the first partially filled cell PC1 is fixed at 48 bytes and the remaining significant data is mapped to the second partially filled cell PC2. These cells are then transmitted.

FIGS. 10 and 11 are tables showing the relationship among the length of an arriving short packet, the LI of an arriving cell, the length of significant data in a first cell, the LI of the first cell, the length of significant data in a second cell and the LI of the second cell. For lengths of arriving short packets of up to 48 bytes, all significant data is transmitted upon being mapped to one partially filled cell. When the length of an arriving short packet exceeds 48 bytes, however, the leading 48 bytes of significant data are mapped to the first partially filled cell PC1, the LI thereof becomes 000000, the remaining significant data is mapped to the second partially filled cell PC2 and the LI thereof becomes equal to the short-packet length minus four [(short-packet length)−4]. The data is then transmitted.

The area for LI serving as the length information consists of only six bits. Consequently, a single partially filled cell created from a short packet of 48 bytes or less without splitting the short packet and each of the cells obtained by splitting a short packet of greater than 48 bytes into two partially filled cells cannot be uniquely identified. In the example of the table shown in FIG. 11, therefore, use of 4-byte short packet, for which there is little possibility of utilization, is prohibited. Instead, a cell for which "LI=0" holds is adopted as the first partially filled cell obtained by splitting an AAL2 cell of greater than 48 bytes into two cells, and a cell for which "LI≧45" holds is adopted as the second partially filled cell obtained by splitting the AAL2 cell of greater than 48 bytes. Accordingly, by appending the above-mentioned LI value to each partially filled cell, the first and second cells can be distinguished from each other and, even when the length of a short packet is 48 bytes or less, it is possible to identify a cell as being a partially filled cell of 48 bytes or less. The LI of a received partially filled cell is referred to on the side that received the partially filled cell. If the LI has a value of 1 to 44, it is judged that the cell did not result from splitting. If LI=0 holds, on the other hand, it is judged that the cell is the first cell that is the result of splitting. If LI has a value of 45 or greater, it is judged that the cell is the second cell resulting from splitting.

Further, the length of data mapped to the second partially filled cell PC2 is (LI−44) because the overall data length is (LI+4) and 48 bytes are mapped to the first partially filled cell PC1.

By determining that cells for which LI=0 holds are contiguous, the fact that a second partially filled cell PC2 has been discarded during transfer can be detected. By determining that cells for which LI≧45 holds are contiguous, the fact that a first partially filled cell PC1 has been discarded during transfer can be detected.

(h) Eighth Method of Forming Partially Filled Cells

Figure 12:
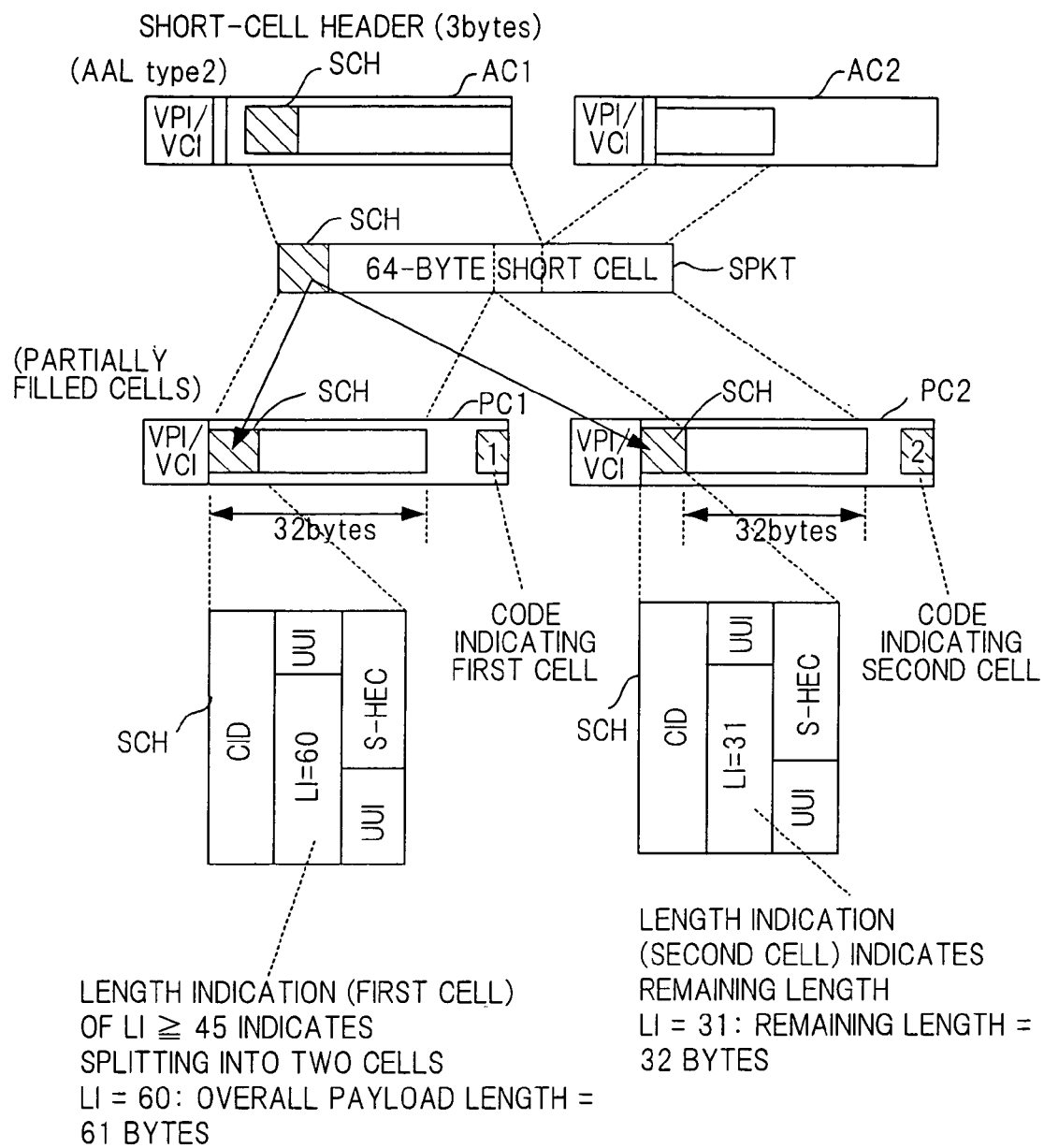
FIG. 12 is a diagram showing an example of an eighth partially filled cell.

FIG. 12 is a diagram useful in describing an eighth embodiment in which the 64-byte short packet SPKT that has arrived in a form mapped to two or more AAL2 cells AC1, AC2 is split into two partially filled cells PC1, PC2. According to the eighth embodiment, the short packet SPKT is split into the first and second partially filled cells PC1, PC2. The short-cell header SCH is added onto both of these partially filled cells, overall-length information [=(short-packet length)−4] of the short packet is indicated by the length information LI of the first partially filled cell PC1, and the length of data mapped to the second partially filled cell PC2 is indicated by the length information LI of the second partially filled cell PC2. A code number for identifying whether a cell is the first partially filled cell PC1 of second partially filled cell PC2 is inserted into each cell as the final byte thereof.

In a case where the length of a short packet exceeds 48 bytes so that the short packet is split into two cells, namely the first and second partially filled cells PC1, PC2, significant data having a fixed length of, e.g., 32 bytes, is mapped to the first partially filled cell PC1 and the remaining data is mapped to the second partially filled cell PC2. The length indication LI of the second partially filled cell PC2 indicates the length of the remaining data. The codes for determining whether a cell is the first partially filled cell PC1 or second partially filled cell PC2 is inserted into each cell.

FIGS. 13 and 14 are tables showing the relationship among the length of an arriving short packet, the LI of an arriving cell, the length of significant data in a first cell, the LI of the first cell, the length of significant data in a second cell and the LI of the second cell. For lengths of arriving short packets of up to 48 bytes, all significant data is transmitted upon being mapped to one partially filled cell. When the length of an arriving short packet exceeds 48 bytes, however, the leading 32 bytes of significant data are mapped to the first partially filled cell PC1, the LI thereof becomes [(short-packet length)−4], the remaining significant data is mapped to the second partially filled cell PC2 and the LI thereof becomes the length of the remaining significant data. The data is then transmitted.

(C) Overall Construction of ATM Exchange

Figure 15:
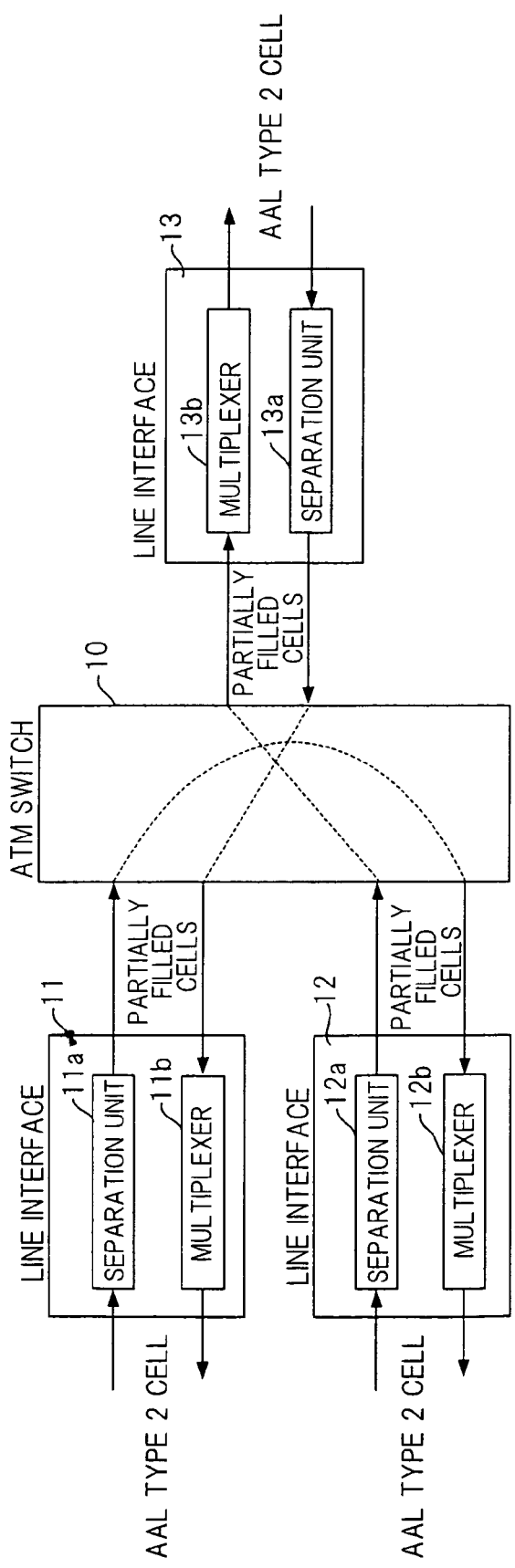
FIG. 15 is a block diagram showing an example of the construction of an ATM exchange that supports a 64-byte short cell.

FIG. 15 is a block diagram showing the overall construction of an ATM exchange that supports a 64-byte short cell. The ATM exchange includes an ATM switch 10 and line interfaces 11 to 13. Each line interface converts an AAL2 cell, which has entered from a corresponding transmission line, to partially filled cells and then outputs the partially filled cells, and each line interface multiplexes short cells, which are contained in partially filled cell that enter from the ATM switch 10, and send the multiplexed cells to the corresponding transmission line. The line interfaces 11 to 13 respectively include separation units 11a to 13a for converting AAL2 cells to partially filled cells and outputting the same, and multiplexers 11b to 13b for multiplexing short cells contained in partially filled cells and outputting them in the AAL2 format. The separation units 11a–13a function to convert AAL2 cells to partially filled cells, split a short packet that exceeds 48 bytes into the first and second partially filled cells PC1, PC2 and send these partially filled cells to the ATM switch 10. Each multiplexer has restoration functions for multiplexing short cells contained in a plurality of partially filled cells of a length less than 48 bytes, assembling a short packet of a length greater than 48 bytes using the short-packet portions contained in two partially filled cells having identical VPI/VCI values, and outputting the assembled short packet to a line.

If, when an AAL2 cell has entered from a line, the AAL2 cell contains one or more short cells of less than 48 bytes, the corresponding separation unit generates a partially filled cell for each short cell and inputs the partially filled cell to the ATM switch 10. The latter routes each partially filled cell to a predetermined output port upon referring to the VPI/VCI. The multiplexer of the interface on the output side multiplexes short cells having the same direction among the short cells contained in each of the partially filled cells, creates an AAL2 cell and outputs the same to the line.

If, when an AAL2 cell has entered from a line, the AAL2 cell contains a short cell having a length that exceeds 48 bytes, the corresponding separation unit converts the short cell to two partially filled cells (of identical VPI/VCI values) and inputs the partially filled cells to the ATM switch 10. The latter routes each partially filled cell to a predetermined output port upon referring to the VPI/VCI. The multiplexer of the interface on the output side restores a short packet having a length greater than 48 bytes from two partially filled cells having identical VPI/VCI values and outputs the short packet to the line in the AAL2 format. As a result of the foregoing operation, the switching of short packets having lengths greater than 48 bytes can be perform using a standard ATM switch.

(D) Partially Filled Cell Forming Unit and AAL2 Cell Forming Unit (a) First Embodiment of Partially Filled Cell Forming Unit and AAL2 Cell Forming Unit FIG. 16 is a block diagram showing a first embodiment of the construction of a partially filled cell forming unit for implementing the processing for forming partially filled cells described above in conjunction with FIG. 12. According to the processing for forming partially filled cells shown in FIG. 12, when the length of a short packet SPKT contained in a plurality of AAL2 cells exceeds 48 bytes, 32-byte significant data is mapped to the first partially filled cell PC1, the remaining significant data is mapped to the second partially filled cell PC2 and a code number is added onto each cell as the final byte thereof. In the description rendered below, it will be assumed that a short packet whose length is greater than 48 bytes is a 64-byte short packet.

When an AAL2 cell enters, a cell buffer 51 stores this AAL2 cell temporarily. The reason for this temporary storage is that since there are instances where the intervals of arriving AAL2 cells are not continuous, time is needed for a short packet of 64 bytes to be completed.

Next, in conformity with the timing signal of an output-cell frame, a short-cell extraction unit 52 successively extracts short cells having the same VPI/VCI from the cell buffer 51 and stores these short cells in a short-cell buffer 53. The short-cell extraction unit 52 further extracts the VPI/VCI/CID of the arriving cell, accesses a conversion table 54 using the VPI/VCI/CID, and reads the VPI/VCI that is to be added onto partially filled cell out of the conversion table. The correspondence between the VPI/VCI/CID of an arriving cell and the VPI/VCI added onto a sent cell (partially filled cell) is stored in the conversion table 54 beforehand at the time of an outgoing call.

A code creation unit 55 refers to the LI of an arriving short cell input from the short-cell extraction unit 52 and, if LI≧45 holds, generates a code number assigned to the partially filled cell to be output. More specifically, if LI is 44 or less, no code number is generated. If LI is 45 or greater, however, the length of the short packet is greater than 48 bytes. Accordingly, 0 is output in conformity with the timing at which the first partially filled cell is output and 1 is output in conformity with the timing at which the second partially filled cell is output.

When the length of a short packet exceeds 48 bytes (LI≧45), an LI creation unit 56 calculates and outputs the LI value of the short-packet header added onto the second partially filled cell PC2. Since the length of the short cell that has arrived is (LI+4) bytes and the length of data sent by the first partially filled cell PC1 is 32 bytes, the length of data sent by the second partially filled cell PC2 is (LI−28) bytes. Since 000000 is adopted as the length of one byte, 000001 as the length of two bytes, . . . , 111111 as the length of 64 bytes, the LI creation unit 56 performs the calculation (LI−29), calculates the LI to be added onto the second partially filled cell and outputs the same.

A counter 57 is a modulo-53 counter, i.e., a counter which counts a clock from 0 to 52 in sync with a cell-frame signal and outputs the value of the count. The counts of 0 to 52 correspond to 1 to 53 bytes of the AAL2 cell. In accordance with the LI and the value of the count, a select-signal creation unit 58 instructs a selector 59 as to which input signal applied thereto is to be selected. The selector 59 selects the input signal of which it has been instructed and outputs a partially filled cell. For example, the select-signal creation unit 58 (i) outputs a select signal in accordance with FIG. 17A if LI<45 holds, (ii) outputs a select signal in accordance with FIG. 17B if LI>44 holds and the first partially filled cell PC1 is created and output, and (iii) outputs a select signal in accordance with FIG. 17C if LI>44 holds and the second partially filled cell PC2 is created and output.

When a short packet having a length of 48 bytes or less is converted to a partially filled cell, all of the significant data of the short packet can be stored in the payload of one ATM cell (partially filled cell). The selector 59, therefore, as shown in FIG. 17A, selects (1) and outputs an ATM cell header when the count is 0 to 4; selects (2) and outputs short-packet data when the count is 5 to (LI+8), i.e., in the interval of the length of the significant data; and selects (4) and outputs "0" when the count is (LI+9) to 52.

On the other hand, when a short packet having a length that exceeds 48 bytes is converted to partially filled cells, the output of the select-signal creation unit 58 differs depending upon whether the cell is the first partially filled cell PC1 or the second partially filled cell PC2.

When the first partially filled cell PC1 is output, the selector 59, as shown in FIG. 17B, selects (1) and outputs an ATM cell header when the count is 0 to 4; selects (2) and outputs the short-packet data of the leading 32 bytes when the count is 5 to 36; selects (4) and outputs the fixed value "0" if the count becomes 37 or greater; and selects (3) and outputs a code signal indicating that the cell is the first partially filled cell of the count becomes 52. It should be noted that a short-cell header that contains the length indication LI has been mapped to the payload of the first partially filled cell PC1.

When the second partially filled cell PC2 is output, the selector 59, as shown in FIG. 17C, selects (1) and outputs an ATM cell header when the count is 0 to 4. Next, in order to output 0s for the portion of the 3-bytes short-cell header SCH with the exception of LI as well as a numerical value, which indicates the length of the remaining data, for the LI portion, the selector 59 selects (4) and outputs 0 when the count is 5 and 7, and selects (5) and outputs the LI value of the second partially filled cell PC2 when the count is 6. Further, the selector 59 selects (2) and transmits the remaining short-packet data in the interval of the remaining significant-data length when the count is 8 to (LI−21). If the count becomes (LI−21)+1 or greater, the selector 59 selects (4) and outputs the fixed value "0". If the count becomes 52, the selector 59 selects (3) and outputs the code number indicating that the cell is the second partially filled cell.

Figure 18:
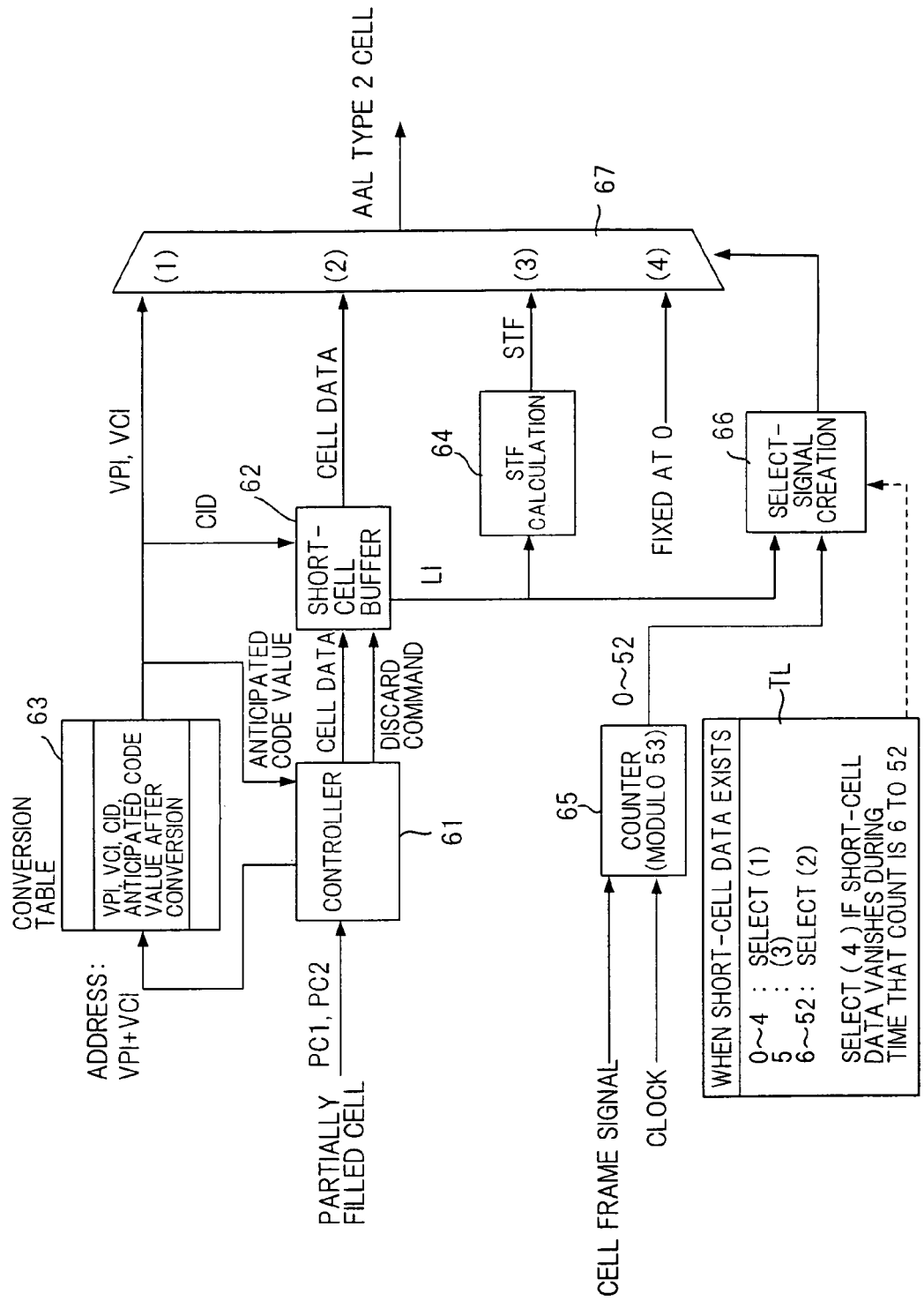
FIG. 18 is a block diagram showing an example of the construction of an AAL2 cell forming unit according to the first embodiment.

FIG. 18 is a block diagram showing the construction of an AAL2 cell forming unit for restoring and outputting AAL2 cells from the two partially filled cells created by the partially filled cell forming unit of FIG. 16.

When the first and second partially filled cells PC1, PC2 enter, a controller 61 refers to the LI value of each cell, extracts the short packet and stores it in a short-cell buffer 62. Since a short packet that exceeds 48 bytes arrives upon being split into first and second cells, one short packet is completed when two successive cells have arrived. Accordingly, the controller 61 checks the code number of the input cells and creates a short packet which exceeds 48 bytes in the short-cell buffer 62.

Anticipated code values of the first and second partially filled cells PC1, PC2 have been stored in a conversion table 63. The controller 61 therefore obtains the anticipated code values from the conversion table 63 based upon the VPI/VCI values of the input cells and determines, based upon these values, whether an input cell is missing or not. For example, the controller 61 compares the first anticipated code value and the code number contained in the first cell when the first cell enters and compares the second anticipated code value and the code number contained in the second cell when the second cell enters. If the discarding of one cell occurs along the path, therefore, the code number of the partially filled cell that has arrived will be different from the anticipated value. This makes it possible to detect that a cell has been discarded. Since a short packet cannot be completed if discarding of a cell occurs, the half of the data in the partially filled cell that had already arrived and been stored in the short-cell buffer 62 is discarded.

At the same time that it reads an anticipated code value out of the conversion table 63, the controller 61 reads the VPI/VCI/CID added onto the AAL2 cell out of the conversion table 63 and inputs the VPI/VCI values to a selector 67. The controller 61 inputs the read CID to the short-cell buffer 62 so that the CID of the short-cell header already stored in the short-cell buffer 62 is replaced by this input CID.

An STF calculation unit 64 obtains a transmission-wait byte count from the LI value of the short-cell header and the number of bytes already transmitted by the first AAL2 cell, calculates the offset value OSF within the start field STF from the transmission-wait byte count and outputs the offset value. By way of example, if the number of remaining bytes of a short packet that could not be sent by the first AAL2 cell is ten, then the OSF of the AAL2 output next will be ten. If the remaining number of bytes is 47 or greater, then OSF will be 47.

A modulo-53 counter 65 counts the clock from 0 to 52 in sync with the cell-frame signal and outputs the value of the count. The counts of 0 to 52 correspond to 1 to 53 bytes of the AAL2 cell. In accordance with the count and the absence or presence of data to be sent, as indicated in the table TL in FIG. 18, a select-signal creation unit 66 instructs a selector 67 as to which input signal of input signals (1) to (4) applied thereto is to be selected.

The selector 67 selects and outputs the input signals (1) to (4) of which it has been instructed. Specifically, the selector 67 outputs VPI/VCI when the count is 0 to 4, outputs the start field STF when the count is 5, and outputs cell data when the count is 6 to 52. A first AAL2 cell is created and transmitted as a result of this operation. Next, and in similar fashion, VPI/VCI, STF and the remaining cell data are output. If cell data to be transmitted vanishes during the time that the count is 6 to 52, 0 is output from this moment onward. As a result, a second AAL2 is created and transmitted. Thus, two partially filled cells are combined so that the original AAL2 cells can be restored.

When a partially filled cell of 48 bytes or less for which splitting has not be carried out arrives, VPI/VCI/CID are read out of the conversion table 63 and output in the AAL2 format. In this example, it is possible by examining the LI of the arriving cell to determine whether the cell is a partially filled cell that is only a single cell or a partially filled cell that is the result of a split into two cells.

Figure 19:
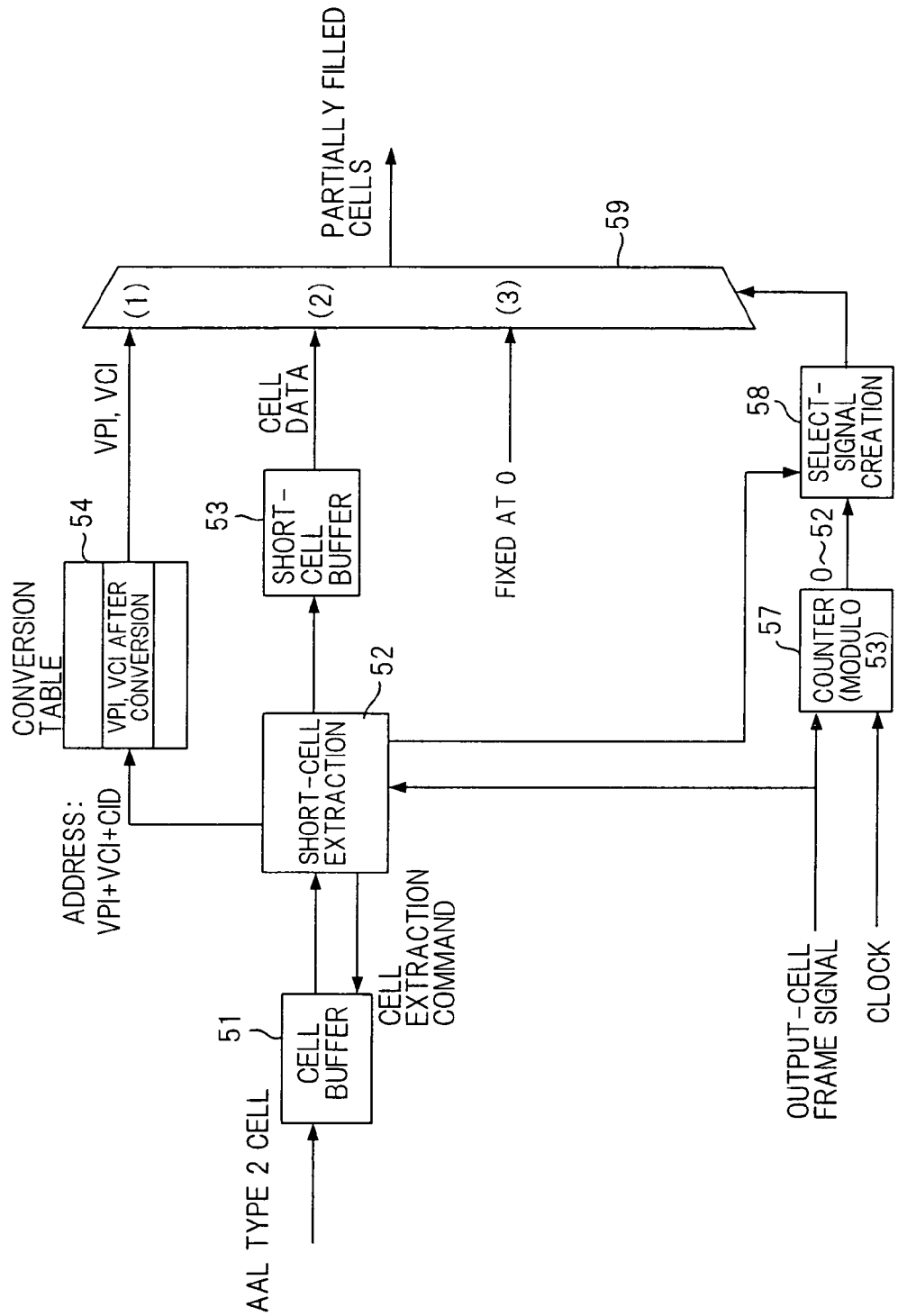
FIG. 19 is a block diagram showing an example of the construction of a partially filled cell forming unit according to a second embodiment of the present invention.

(b) Second Embodiment of Partially Filled Cell Forming Unit and AAL2 Cell Forming Unit FIG. 19 is a block diagram showing a second embodiment of the construction of a partially filled cell forming unit for implementing the processing for forming partially filled cells described above in conjunction with FIG. 2. Components identical with those of the first embodiment shown in FIG. 16 are designated by like reference characters.

The partially filled cell forming unit according to the second embodiment selects a predetermined input signal in accordance with the count in counter 57, as shown in FIG. 20A, if the length of a short packet is 48 bytes or less, thereby creating and outputting a partially filled cell. Specifically, in accordance with a command from the select-signal creation unit 58, the selector 59 (i) selects and outputs the ATM cell header (VPI/VCI, etc.), which enters from the conversion table 54, when the count is 0 to 4; (ii) selects and outputs short-packet data, which enters from the short-cell buffer 53, when the count is 5 to (LI+8), i.e., in the interval of the length of the significant data; and (iii) selects "0", thereby outputting a partially filled cell, when the count is (LI+9) to 52.

When the length of a short packet exceeds 48 bytes, the partially filled cell forming unit according to the second embodiment maps 48-byte significant data to the first partially filled cell PC1 and the remaining significant data to the second partially filled cell PC2 and then outputs the data. Accordingly, when the first partially filled cell PC1 is output, the selector 59, in accordance with a command from the select-signal creation unit 58, and as shown in FIG. 20B, (i) selects and outputs the ATM cell header (VPI/VCI, etc.), which enters from the conversion table 54, when the count is 0 to 4, and (ii) selects and outputs the leading 48 bytes of the short-packet data, which enters from the short-cell buffer 53, when the count is 5 to 52. The payload of this partially filled cell PC1 contains the short-cell header SCH, which includes the length indication LI.

When the second partially filled cell PC2 is output, the selector 59, in accordance with a command from the select-signal creation unit 58, and as shown in FIG. 20C, (i) selects the ATM cell header (VPI/VCI, etc.), which enters from the conversion table 54, when the count is 0 to 4; (ii) selects the short-packet data of the remaining (LI−44) bytes, which enters from the short-cell buffer 53, when the count is 5 to (LI−40); and (iii) selects the fixed value "0" when the count is (LI−40)+1 to 52.

Figure 21:
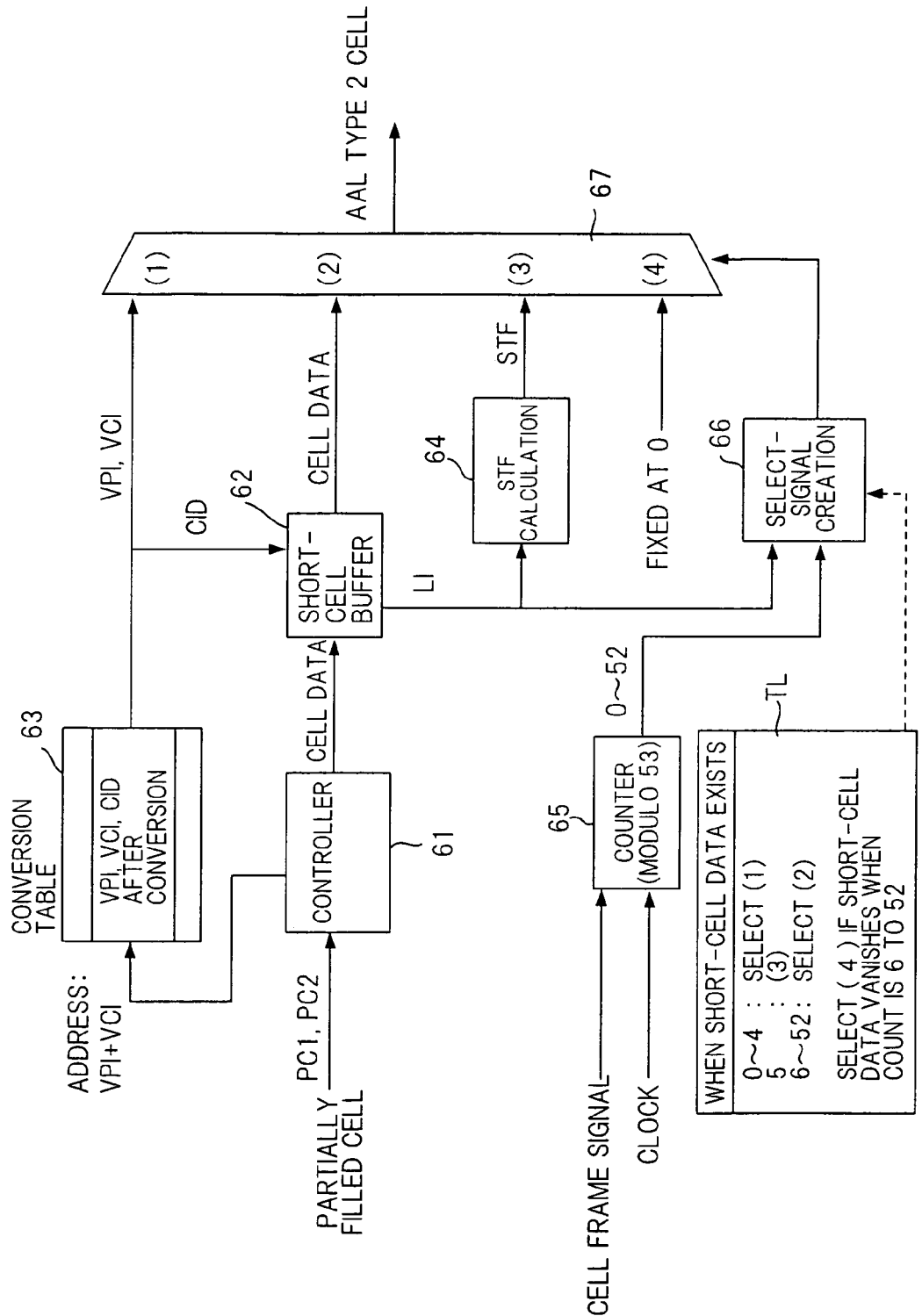
FIG. 21 is a block diagram showing an example of the construction of an AAL2 cell forming unit according to the second embodiment.

FIG. 21 is a block diagram showing a second embodiment of the construction of an AAL2 cell forming unit for restoring and outputting original AAL2 cells from the two partially filled cells created by the partially filled cell forming unit of FIG. 19. Components identical with those of the first embodiment shown in FIG. 18 are designated by like reference characters.

When the first and second partially filled cells PC1, PC2 enter, the controller 61 refers to the LI value of each cell, extracts the short packet and stores it in the short-cell buffer 62. Since a short packet that exceeds 48 bytes arrives upon being split into first and second cells, one short packet is completed when two successive cells have arrived. That is, the controller 61 determines whether the cell is the first partially filled cell depending upon whether the LI value of the short-cell header contained in the input cell is 45 or greater. If the cell is the first partially filled cell, then the cell that is received next is recognized as being the second partially filled cell and a short packet of greater than 48 bytes is created in the short-cell buffer 62.

The controller 61 further reads the VPI/VCI/CID added onto the AAL2 cell out of the conversion table 63, inputs the VPI/VCI values to the selector 67 and inputs the CID to the short-cell buffer 62 so that the CID of the short-cell header already stored in the short-cell buffer 62 is replaced by this input CID.

The STF calculation unit 64 obtains a transmission-wait byte count from the LI value of the short-cell header and the number of bytes already transmitted by the first AAL2 cell, calculates the offset value OSF within the start field STF from the transmission-wait byte count and outputs the offset value. By way of example, if the number of remaining bytes of a short packet that could not be sent by the first AAL2 cell is ten, then the OSF of the AAL2 output next will be ten. If the remaining number of bytes is 47 or greater, then OSF will be 47.

In accordance with the count and the absence or presence of data to be sent, as indicated in the table TL in FIG. 21, the select-signal creation unit 66 instructs the selector 67 as to which input signal of input signals (1) to (4) applied thereto is to be selected. The selector 67 selects and outputs the input signals (1) to (4) of which it has been instructed. Specifically, the selector 67 outputs the ATM header (VPI/VCI, etc.) when the count is 0 to 4, outputs the start field STF when the count is 5, and outputs cell data when the count is 6 to 52. A first AAL2 cell can be restored and transmitted as a result of this operation. Next, in similar fashion and on the basis of the count, VPI/VCI, etc., STF and the remaining cell data are output. If cell data to be transmitted vanishes during the time that the count is 6 to 52, 0 is output from this moment onward. As a result, a second AAL2 can be restored and transmitted. Thus, two partially filled cells are combined so that the original AAL2 cells can be restored.

When a partially filled cell of 48 bytes or less for which splitting has not be carried out arrives, VPI/VCI/CID are read out of the conversion table 63 and output in the AAL2 format. In this example, it is possible by examining the LI of the arriving cell to determine whether the cell is a partially filled cell that is only a single cell or a partially filled cell that is the result of a split into two cells.

Figure 22:
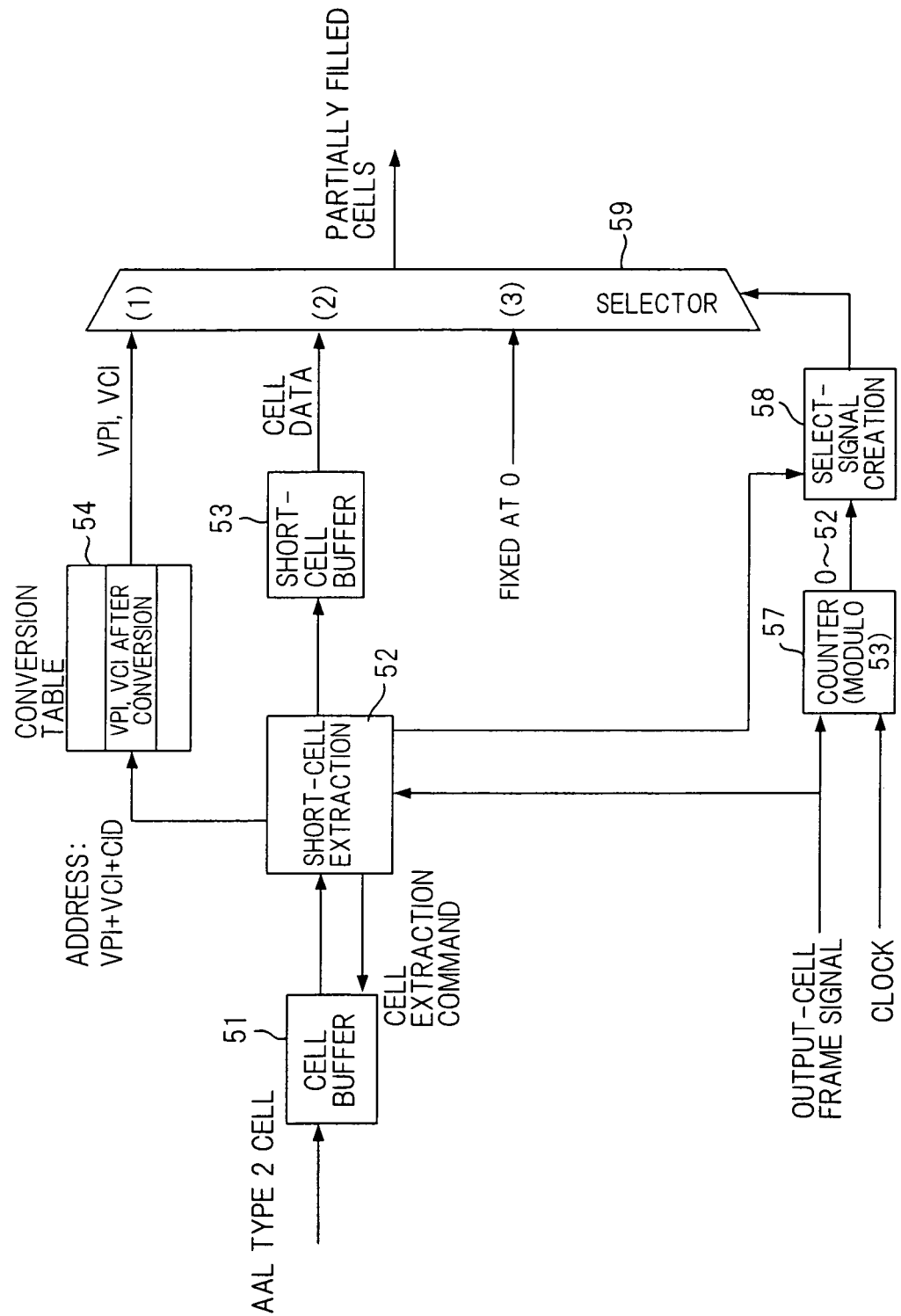
FIG. 22 is a block diagram showing an example of the construction of a partially filled cell forming unit according to a third embodiment of the present invention.

(c) Third Embodiment of Partially Filled Cell Forming Unit and AAL2 Cell Forming Unit FIG. 22 is a block diagram showing a third embodiment of the construction of a partially filled cell forming unit for implementing the processing for forming partially filled cells described above in conjunction with FIG. 3. Components identical with those of the first embodiment shown in FIG. 16 are designated by like reference characters.

The partially filled cell forming unit according to the third embodiment selects a predetermined input signal in accordance with the count in counter 57, as shown in FIG. 23A, if the length of a short packet is 48 bytes or less, thereby creating and outputting a partially filled cell. Specifically, in accordance with a command from the select-signal creation unit 58, the selector 59 (1) selects and outputs the ATM cell header (VPI/VCI, etc.), which enters from the conversion table 54, when the count is 0 to 4; (2) selects and outputs short-packet data, which enters from the short-cell buffer 53, when the count is 5 to (LI+8), i.e., in the interval of the length of the significant data; and (3) selects "0", thereby outputting a partially filled cell, when the count is (LI+9) to 52.

When the length of a short packet exceeds 48 bytes, the partially filled cell forming unit according to the second embodiment maps significant data having the byte counts B1, B2 shown in FIG. 4 to the first and second partially filled cells PC1, PC2, respectively. That is, when the first partially filled cell PC1 is output, the selector 59, in accordance with a command from the select-signal creation unit 58, and as shown in FIG. 23B, (i) selects and outputs the ATM cell header (VPI/VCI, etc.), which enters from the conversion table 54, when the count is 0 to 4; (ii) selects and outputs the leading B1 bytes of the short-packet data, which enters from the short-cell buffer 53, when the count is 5 to (B1+4); and (iii) selects the fixed value "0" when the count is (B1+5) to 52. The payload of this partially filled cell PC1 contains the short-cell header SCH, which includes the length indication LI.

When the second partially filled cell PC2 is output, the selector 59, in accordance with a command from the select-signal creation unit 58, and as shown in FIG. 23C, (i) selects the ATM cell header (VPI/VCI, etc.), which enters from the conversion table 54, when the count is 0 to 4; (ii) selects the short-packet data of the remaining B2 bytes, which enters from the short-cell buffer 53, when the count is 5 to (B2+4); and (iii) selects the fixed value "0" when the count is (B2+5) to 52.

Figure 24:
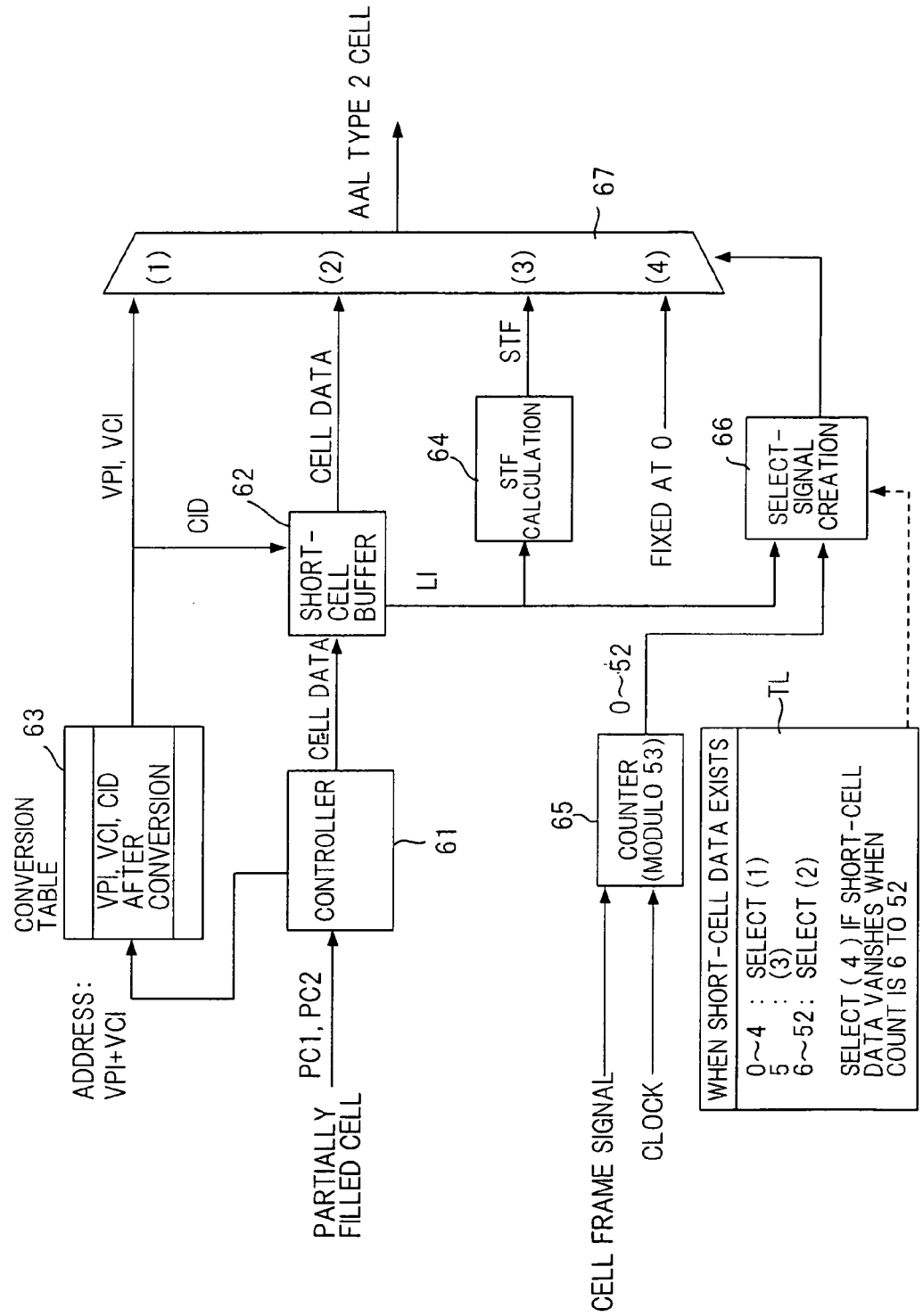
FIG. 24 is a block diagram showing an example of the construction of an AAL2 cell forming unit according to the third embodiment.

FIG. 24 is a block diagram showing a third embodiment of the construction of an AAL2 cell forming unit for restoring and outputting original AAL2 cells from the two partially filled cells created by the partially filled cell forming unit of FIG. 22. Components identical with those of the first embodiment shown in FIG. 18 are designated by like reference characters.

When the first and second partially filled cells PC1, PC2 enter, the controller 61 refers to the LI value of the first cell, extracts the short packet from the payload of each cell and stores it in the short-cell buffer 62. Since a short packet that exceeds 48 bytes arrives upon being split into first and second cells, one short packet is completed when two successive cells have arrived. Based upon the LI value of the short-cell header SCH, which is contained in the first input cell PC1, and the table shown in FIG. 4, the controller 61 identifies the numbers of cell bytes contained in the first and second input cells PC1, PC2, extracts and combines the cell data from each of the input cells PC1, PC2 and creates a short packet of greater than 48 bytes in the short-cell buffer 62.

The controller 61 further reads the VPI/VCI/CID added onto the AAL2 cell out of the conversion table 63, inputs the VPI/VCI values to the selector 67 and inputs the CID to the short-cell buffer 62 so that the CID of the short-cell header already stored in the short-cell buffer 62 is replaced by this input CID.

The STF calculation unit 64 obtains a transmission-wait byte count from the LI value of the short-cell header and the number of bytes already transmitted by the first AAL2 cell, calculates the offset value OSF within the start field STF from the transmission-wait byte count and outputs the offset value. By way of example, if the number of remaining bytes of a short packet that could not be sent by the first AAL2 cell is ten, then the OSF of the AAL2 output next will be ten. If the remaining number of bytes is 47 or greater, then OSF will be 47.

In accordance with the count and the absence or presence of data to be sent, as indicated in the table TL in FIG. 24, the select-signal creation unit 66 instructs the selector 67 as to which input signal of input signals (1) to (4) applied thereto is to be selected. The selector 67 selects and outputs the input signals (1) to (4) of which it has been instructed. Specifically, the selector 67 outputs the ATM header (VPI/VCI, etc.) when the count is 0 to 4, outputs the start field STF when the count is 5, and outputs cell data when the count is 6 to 52. A first AAL2 cell can be restored and transmitted as a result of this operation. Next, in similar fashion and on the basis of the count, VPI/VCI, etc., STF and the remaining cell data are output. If cell data to be transmitted vanishes during the time that the count is 6 to 52, 0 is output from this moment onward. As a result, a second AAL2 can be restored and transmitted. Thus, two partially filled cells are combined so that the original AAL2 cells can be restored.

When a partially filled cell of 48 bytes or less for which splitting has not be carried out arrives, VPI/VCI/CID are read out of the conversion table 63 and output in the AAL2 format. In this example, it is possible by examining the LI of the arriving cell to determine whether the cell is a partially filled cell that is only a single cell or a partially filled cell that is the result of a split into two cells.

Figure 25:
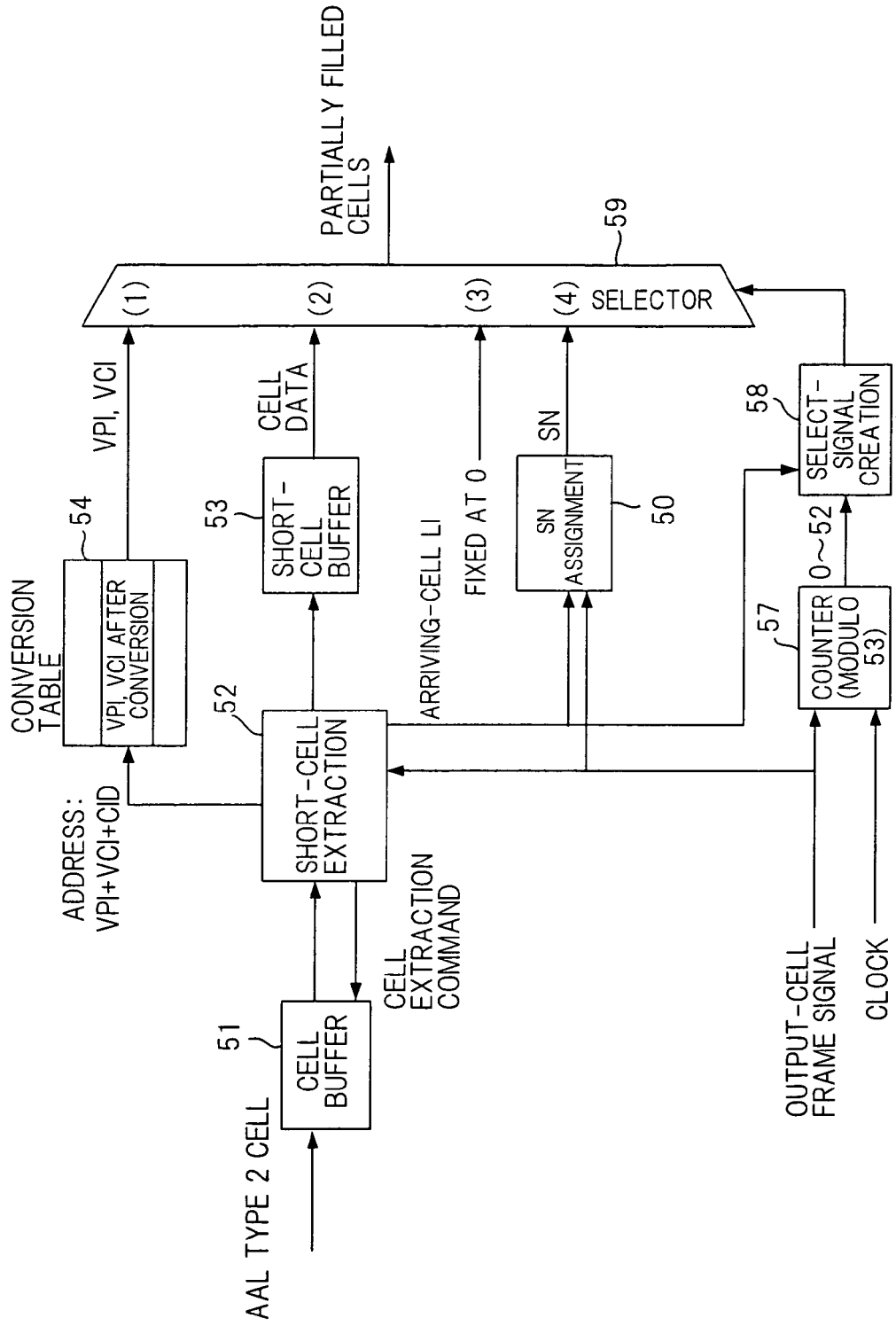
FIG. 25 is a block diagram showing an example of the construction of a partially filled cell forming unit according to a fourth embodiment of the present invention.

(d) Fourth Embodiment of Partially Filled Cell Forming Unit and AAL2 Cell Forming Unit FIG. 25 is a block diagram showing a fourth embodiment of the construction of a partially filled cell forming unit for implementing the processing for forming partially filled cells described above in conjunction with FIG. 5. Components identical with those of the third embodiment shown in FIG. 22 are designated by like reference characters. The fourth embodiment differs from the third embodiment in that an SN (sequence number) assigning unit 50 is provided. The latter creates sequence numbers SN (=0, 1) and applies them to the 52nd bytes of respective ones of the first and second partially filled cells PC1, PC2.

The partially filled cell forming unit according to the fourth embodiment selects a predetermined input signal in accordance with the count in counter 57, as shown in FIG. 26A, if the length of a short packet is 48 bytes or less, thereby creating and outputting a partially filled cell. When the length of a short packet exceeds 48 bytes, the partially filled cell forming unit according to the fourth embodiment first selects a predetermined input signal in accordance with the count in counter 57, as shown in FIG. 26B, creates the first partially filled cell PC1 and outputs the same. Next, the partially filled cell forming unit selects a predetermined input signal in accordance with the count in counter 57, as shown in FIG. 26C, creates the second partially filled cell PC2 and outputs the same.

Figure 27:
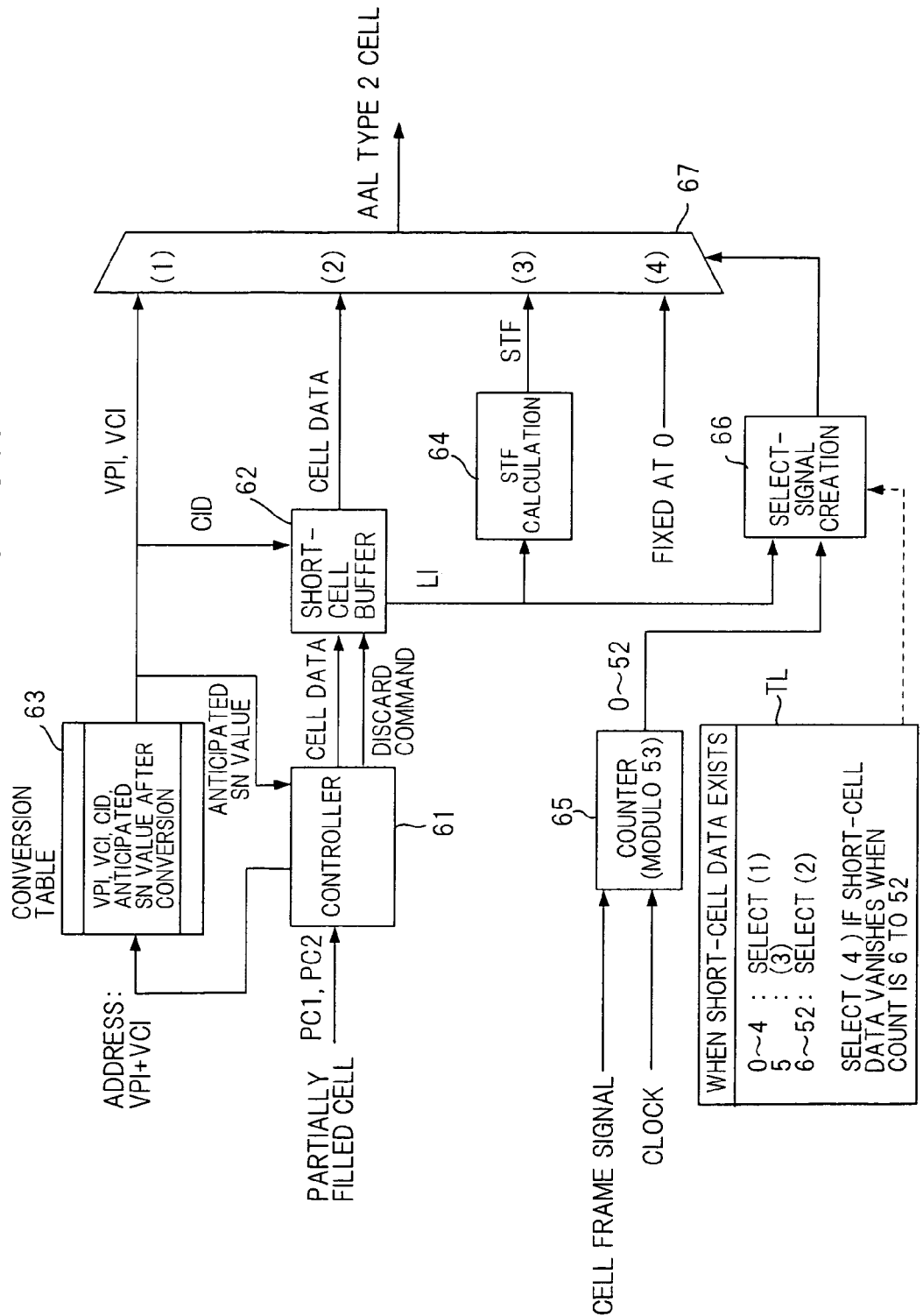
FIG. 27 is a block diagram showing an example of the construction of an AAL2 cell forming unit according to the fourth embodiment.

FIG. 27 is a block diagram showing a fourth embodiment of the construction of an AAL2 cell forming unit for restoring and outputting original AAL2 cells from the two partially filled cells created by the partially filled cell forming unit of FIG. 25. Components identical with those of the first embodiment shown in FIG. 18 are designated by like reference characters.

The fourth embodiment differs from the third embodiment in regard to discard control. Specifically, a short packet that exceeds 48 bytes arrives upon being split into the first and second partially filled cells PC1, PC2. Anticipated SN values of the first and second partially filled cells PC1, PC2 have been stored in a conversion table 63. The controller 61 therefore obtains the anticipated SN values from the conversion table 63 based upon the VPI/VCI values of the input cells and determines, based upon these anticipated SN values, whether an input cell is missing or not. For example, the controller 61 compares the first anticipated SN value and the sequence number SN contained in the first cell PC1 when the first cell PC1 enters and compares the second anticipated SN value and the sequence number SN contained in the second cell PC2 when the second cell PC2 enters. If the discarding of one cell occurs along the path, therefore, the sequence number of the partially filled cell that has arrived will be different from the anticipated SN value. This makes it possible to detect that a cell has been discarded. Since a short packet cannot be completed if discarding of a cell occurs, the half of the data in the partially filled cell that has already arrived and been stored in the short-cell buffer 62 is discarded.

According to the fourth embodiment, control for selecting predetermined signals based upon counts in the counter 65, restoring AAL2 cells and transmitting them is the same as that of the third embodiment.

Figure 28:
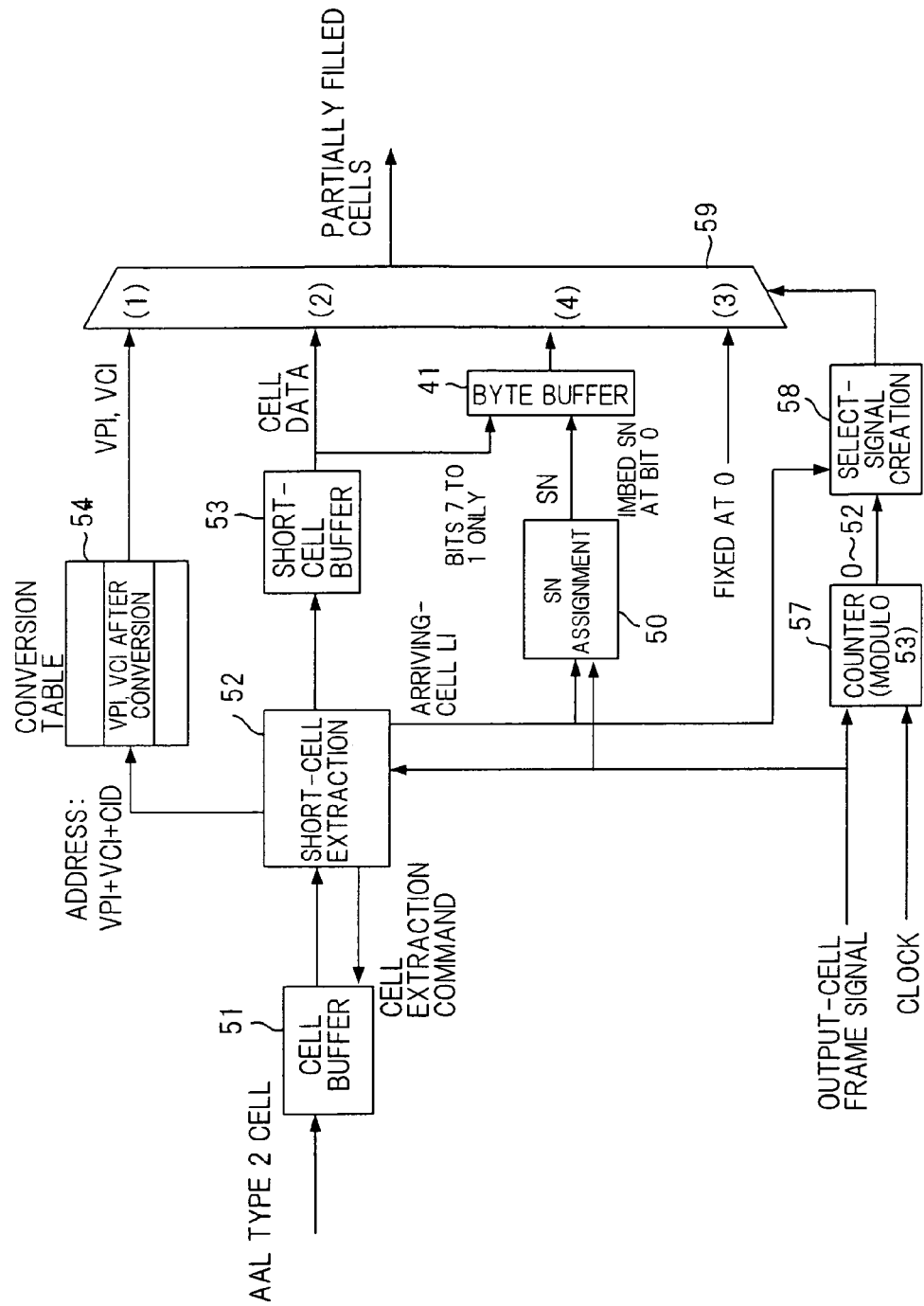
FIG. 28 is a block diagram showing an example of the construction of a partially filled cell forming unit according to a fifth embodiment of the present invention.

(e) Fifth Embodiment of Partially Filled Cell Forming Unit and AAL2 Cell Forming Unit FIG. 28 is a block diagram showing a fifth embodiment of the construction of a partially filled cell forming unit for implementing the processing for forming partially filled cells described above in conjunction with FIG. 6. Components identical with those of the fourth embodiment shown in FIG. 25 are designated by like reference characters. The fifth embodiment differs from the fourth embodiment in that:
- the short-cell header SCH in inserted into both the first and second partially filled cells PC1, PC2;
- a 1-byte buffer 41 is provided for storing one byte of data consisting of the 1-bit sequence number SN created by the SN assigning unit 50 and the high-order seven bits of the third byte of the short-cell header SCH; and
- the content (the sequence number SN) of buffer 41 is inserted into the S-HEC portion of the short-cell header SCH of each of the first and second partially filled cells PC1, PC2.

The partially filled cell forming unit according to the fifth embodiment selects a predetermined input signal in accordance with the count in counter 57, as shown in FIG. 29A, if the length of a short packet is 48 bytes or less, thereby creating and outputting a partially filled cell. When the length of a short packet exceeds 48 bytes, the partially filled cell forming unit according to the fifth embodiment first selects a predetermined input signal in accordance with the count in counter 57, as shown in FIG. 29B, creates the first partially filled cell PC1 and outputs the same. Next, the partially filled cell forming unit selects a predetermined input signal in accordance with the count in counter 57, as shown in FIG. 29C, creates the second partially filled cell PC2 and outputs the same.

FIG. 30 is a block diagram showing a fifth embodiment of the construction of an AAL2 cell forming unit for restoring and outputting original AAL2 cells from the two partially filled cells created by the partially filled cell forming unit of FIG. 28. Components identical with those of the fourth embodiment shown in FIG. 27 are designated by like reference characters. The fifth embodiment differs from the fourth embodiment in that, in control of cell discard, the sequence numbers SN of the first and second partially filled cells PC1, PC2 are extracted from the first bit of the third byte (the S-HEC portion) of the short-cell header SCH. Operation is the same as that of the fourth embodiment in other respects.

Figure 31:
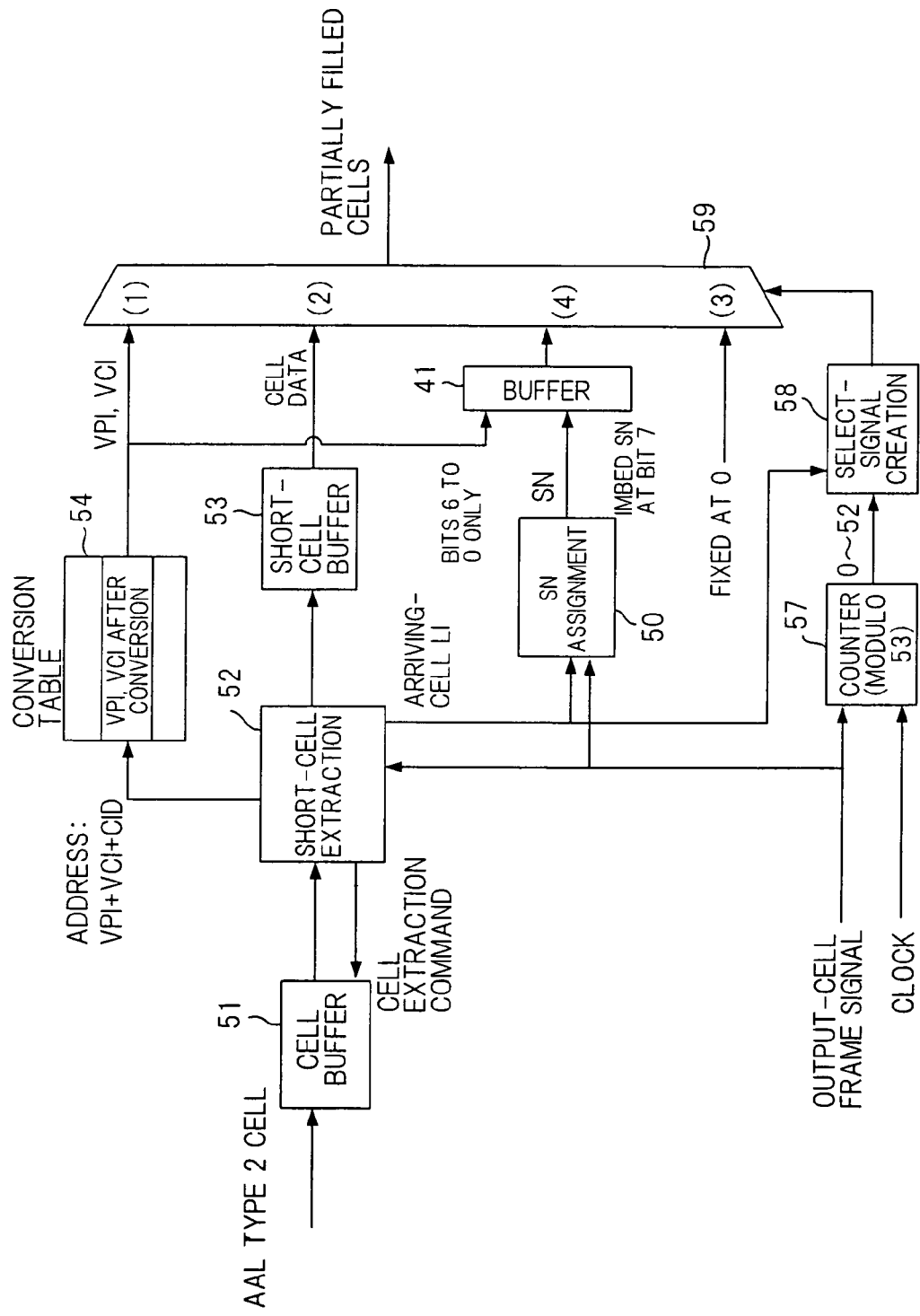
FIG. 31 is a block diagram showing an example of the construction of a partially filled cell forming unit according to a sixth embodiment of the present invention.

(f) Sixth Embodiment of Partially Filled Cell Forming Unit and AAL2 Cell Forming Unit FIG. 31 is a block diagram showing a sixth embodiment of the construction of a partially filled cell forming unit for implementing the processing for forming partially filled cells described above in conjunction with FIG. 7. Components identical with those of the fourth embodiment shown in FIG. 25 are designated by like reference characters. The sixth embodiment differs from the fifth embodiment in that:
- the 1-byte buffer 41 is provided for storing one byte of data consisting of the 1-bit sequence number SN created by the SN assigning unit 50 and the low-order seven bits of the first byte (the VPI portion) of the ATM header; and
- the content (the sequence number SN) of buffer 41 is inserted into the most significant bit of the first byte of the ATM cell header of each of the first and second partially filled cells PC1, PC2.

The partially filled cell forming unit according to the sixth embodiment selects a predetermined input signal in accordance with the count in counter 57, as shown in FIG. 32A, if the length of a short packet is 48 bytes or less, thereby creating and outputting a partially filled cell. When the length of a short packet exceeds 48 bytes, the partially filled cell forming unit according to the sixth embodiment first selects a predetermined input signal in accordance with the count in counter 57, as shown in FIG. 32B, creates the first partially filled cell PC1 and outputs the same. Next, the partially filled cell forming unit selects a predetermined input signal in accordance with the count in counter 57, as shown in FIG. 32C, creates the second partially filled cell PC2 and outputs the same. As a result, the sequence number SN is inserted into the most significant bit of the first byte of the ATM cell header of each of the first and second partially filled cells PC1, PC2.

Figure 33:
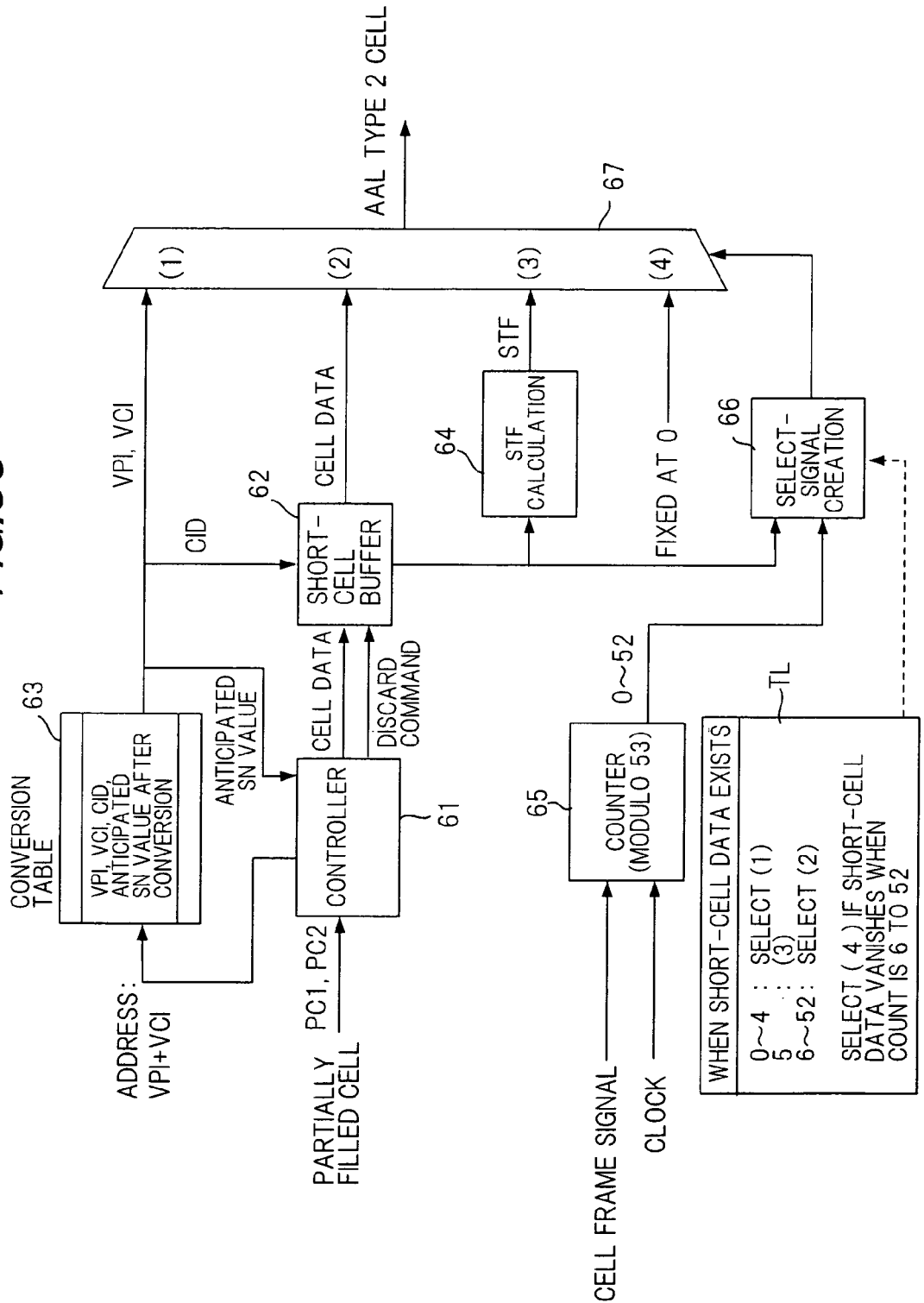
FIG. 33 is a block diagram showing an example of the construction of an AAL2 cell forming unit according to the sixth embodiment.

FIG. 33 is a block diagram showing a sixth embodiment of the construction of an AAL2 cell forming unit for restoring and outputting original AAL2 cells from the two partially filled cells created by the partially filled cell forming unit of FIG. 31. Components identical with those of the fourth embodiment shown in FIG. 27 are designated by like reference characters. The sixth embodiment differs from the fourth embodiment in that, in control of cell discard, the sequence numbers SN of the first and second partially filled cells PC1, PC2 are extracted from the most significant bit of the first byte of the ATM cell header. Operation is the same as that of the fourth embodiment in other respects.

Figure 34:
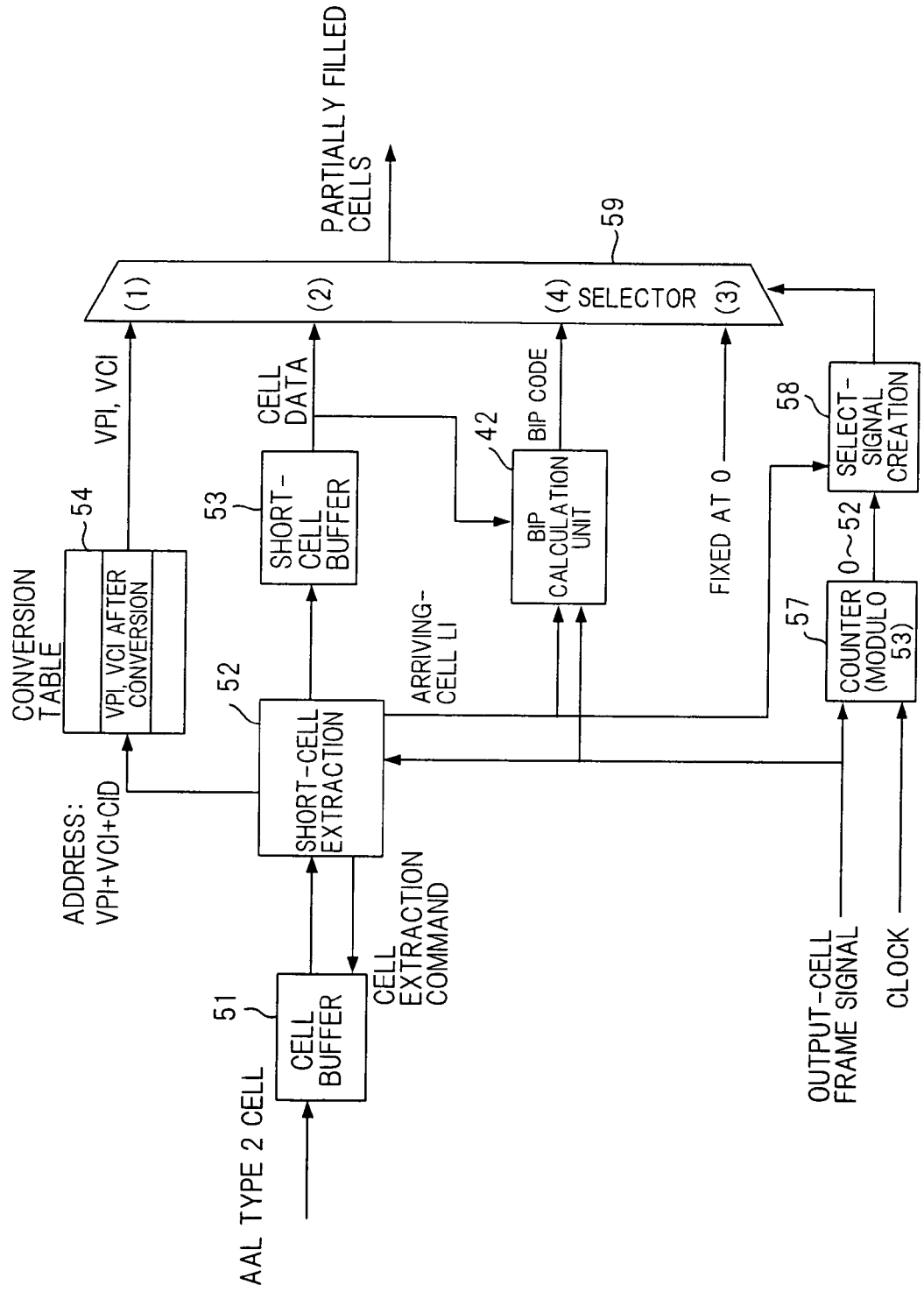
FIG. 34 is a block diagram showing an example of the construction of a partially filled cell forming unit according to the seventh embodiment of the present invention.

(g) Seventh Embodiment of Partially Filled Cell Forming Unit and AAL2 Cell Forming Unit FIG. 34 is a block diagram showing a seventh embodiment of the construction of a partially filled cell forming unit for implementing the processing for forming partially filled cells described above in conjunction with FIG. 8. Components identical with those of the second embodiment shown in FIG. 19 are designated by like reference characters. The seventh embodiment differs from the sixth embodiment in that:
- a BIP calculation unit 42 is provided for calculating BIP as an error detection code; and
- if the length of a short packet exceeds 48 bytes, the BIP calculation unit 42 calculates the BIP of this short packet and inserts the 8-bit result obtained into the final byte of the second partially filled cell PC2.

The partially filled cell forming unit according to the seventh embodiment selects a predetermined input signal in accordance with the count in counter 57, as shown in FIG. 35A, if the length of a short packet is 48 bytes or less, thereby creating and outputting a partially filled cell. When the length of a short packet exceeds 48 bytes, the partially filled cell forming unit according to the seventh embodiment first selects a predetermined input signal in accordance with the count in counter 57, as shown in FIG. 35B, creates the first partially filled cell PC1 and outputs the same. Next, the partially filled cell forming unit selects a predetermined input signal in accordance with the count in counter 57, as shown in FIG. 35C, creates the second partially filled cell PC2 and outputs the same. As a result, the BIP is inserted into the final byte of the second partially filled cell PC2.

Figure 36:
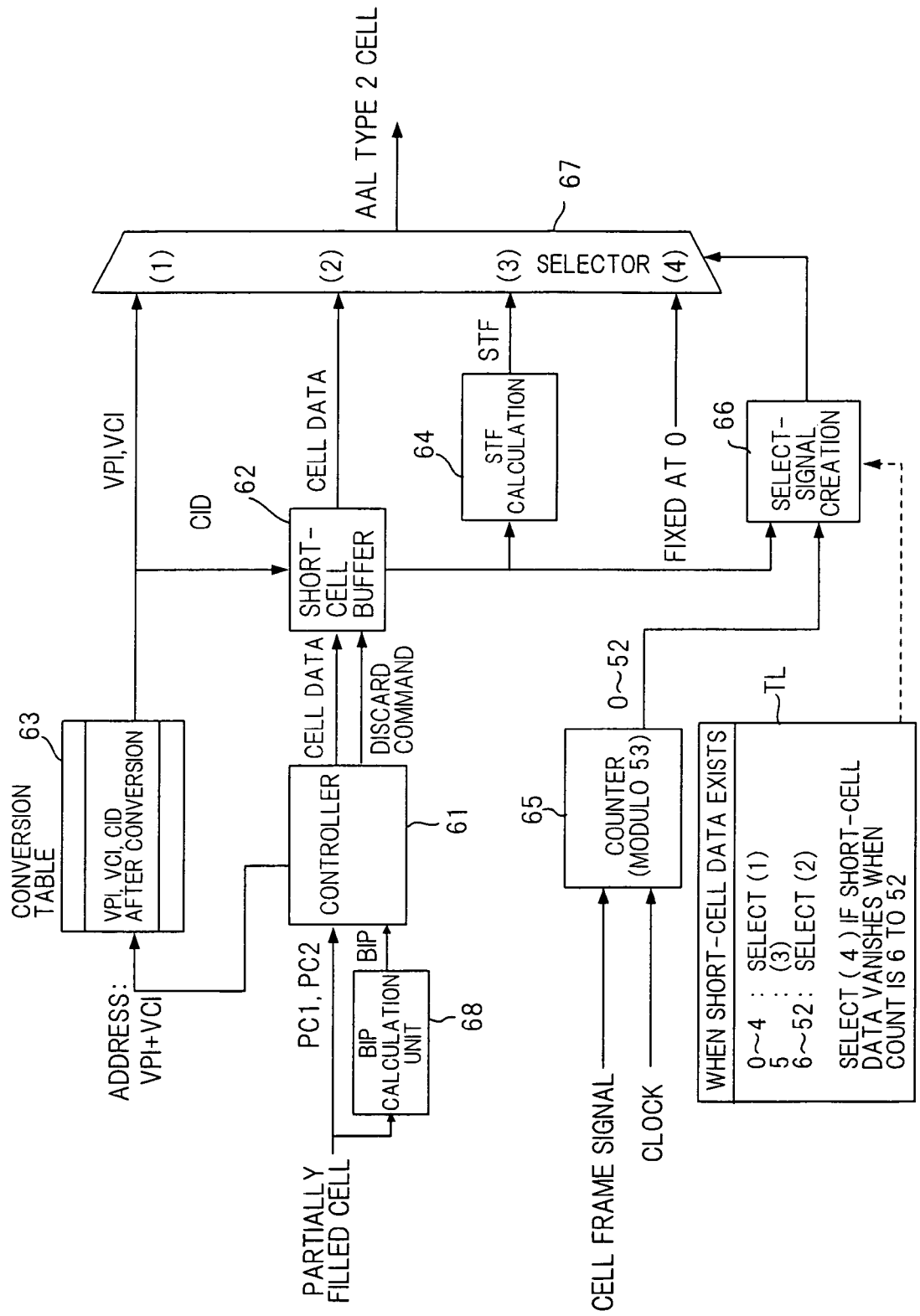
FIG. 36 is a block diagram showing an example of the construction of an AAL2 cell forming unit according to the seventh embodiment.

FIG. 36 is a block diagram showing a sixth embodiment of the construction of an AAL2 cell forming unit for restoring and outputting original AAL2 cells from the two partially filled cells created by the partially filled cell forming unit of FIG. 34. Components identical with those of the second embodiment shown in FIG. 21 are designated by like reference characters. The seventh embodiment differs from the second embodiment in that when an error is detected in one partially filled cell of a pair thereof, the other partially filled cell of the pair is discarded;

a BIP calculation unit 68 is provided for receiving the first and second partially filled cells PC1, PC2, which have been created by splitting a short packet having a length greater than 48 bytes, and calculating the BIP of the significant data of the received cells; and the calculated BIP and an anticipated BIP that has been inserted into the final bit of the second partially filled cell PC2 are compared and, if they do not match, an error is detected on the grounds that a bit error has occurred or that a cell has gone missing.

A short packet greater than 48 bytes arrives upon being split into the first and second partially filled cells PC1, PC2. The BIP value of the significant data portion of the first and second partially filled cells PC1, PC2 is calculated and the calculated BIP value is compared with an anticipated BIP that has been inserted in the final byte of the second partially filled cell PC2. If the two do not match, it is construed that an error has occurred and some of the data of the short packet that has already arrived and been stored in the short-cell buffer 62 is discarded.

In the seventh embodiment, control for selecting predetermined signals based upon counts in the counter 65, restoring AAL2 cells and transmitting them is the same as that of the second embodiment.

Figure 37:
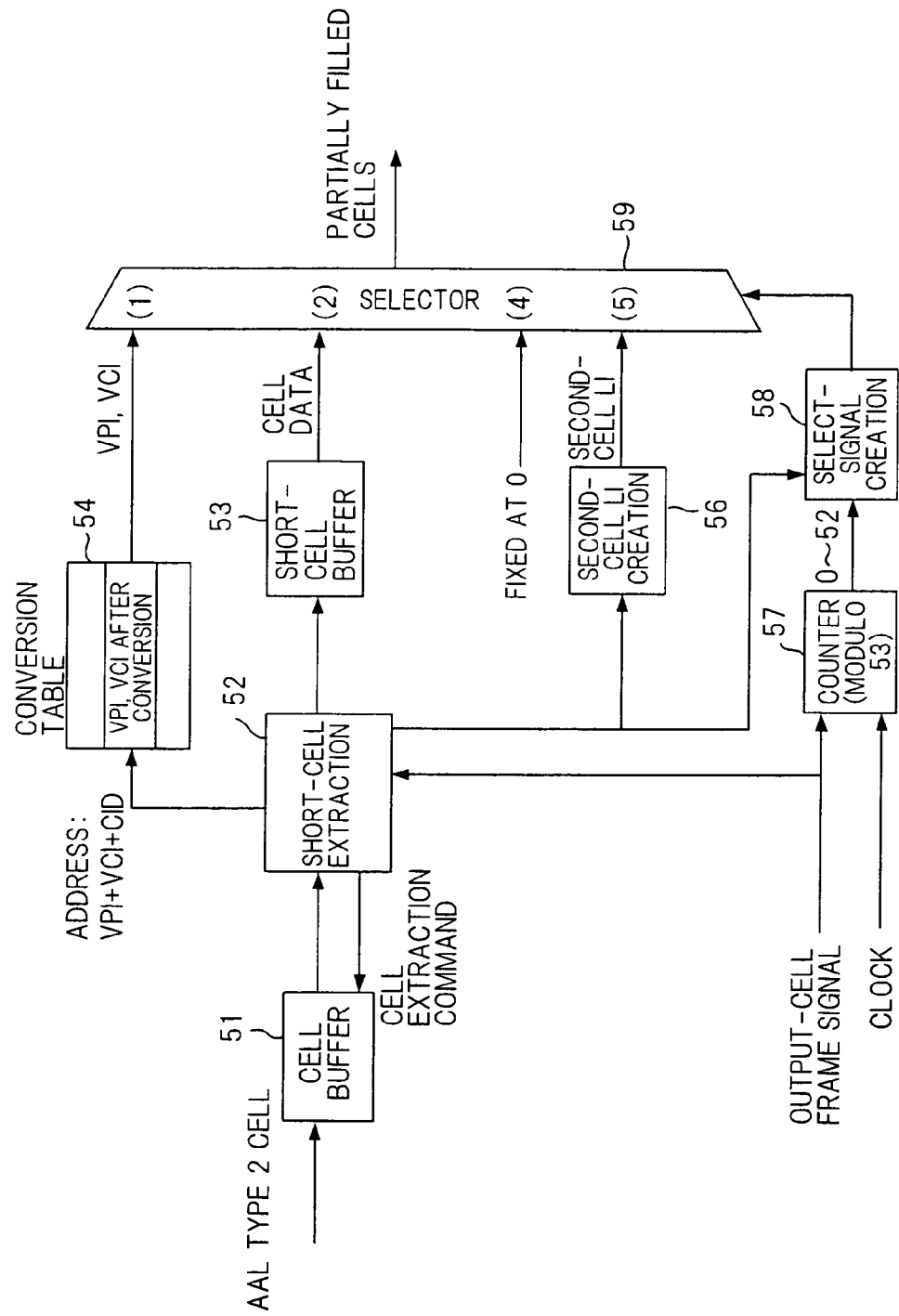
FIG. 37 is a block diagram showing an example of the construction of a partially filled cell forming unit according to the eighth embodiment of the present invention.

(h) Eighth Embodiment of Partially Filled Cell Forming Unit and AAL2 Cell Forming Unit FIG. 37 is a block diagram showing an eighth embodiment of the construction of a partially filled cell forming unit for implementing the processing for forming partially filled cells described above in conjunction with FIG. 9. Components identical with those of the first embodiment shown in FIG. 16 are designated by like reference characters. The eighth embodiment differs from the first embodiment in that:

no code creation unit is provided;

in the first and second partially filled cells PC1, PC2 created because the length of a short packet exceeds 48 bytes, 0 is indicated by the LI of the short-cell header of the first partially filled cell PC1 and the length of the short packet is indicated by the LI of the short-cell header of the second partially filled cell PC2; and the LI creation unit 56, which creates the LI of the second cell, calculates and outputs the LI value of the short-cell header of the second partially filled cell PC2.

The partially filled cell forming unit according to the eighth embodiment selects a predetermined input signal in accordance with the count in counter 57, as shown in FIG. 38A, if the length of a short packet is 48 bytes or less, thereby creating and outputting a partially filled cell. When the length of a short packet exceeds 48 bytes, the partially filled cell forming unit according to the eighth embodiment first selects a predetermined input signal in accordance with the count in counter 57, as shown in FIG. 38B, creates the first partially filled cell PC1 for which LI=0 holds, and outputs the same. Next, the partially filled cell forming unit selects a predetermined input signal in accordance with the count in counter 57, as shown in FIG. 38C, creates the second partially filled cell PC2, for which LI is equal to the length of the short packet, and outputs the same.

Figure 39:
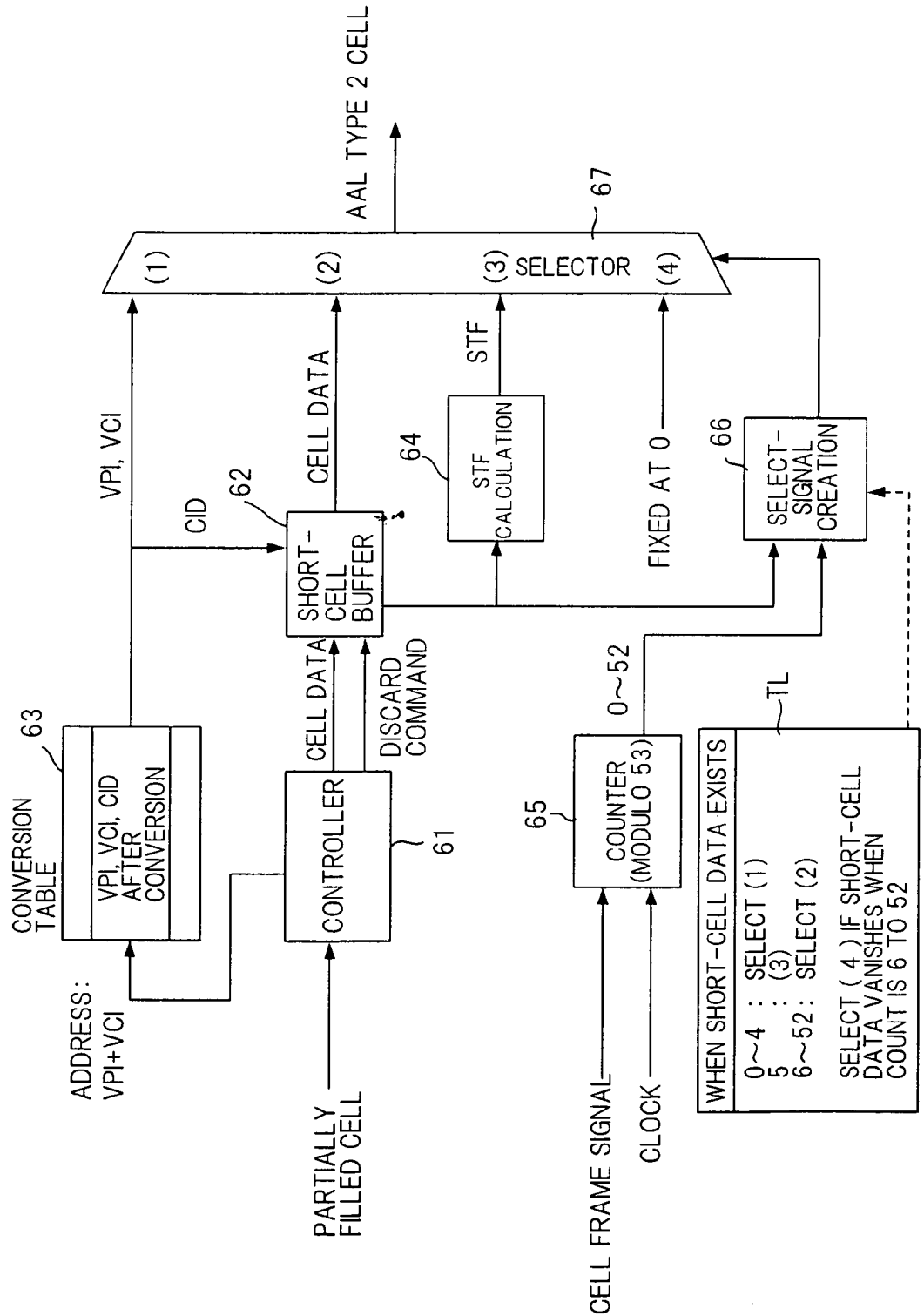
FIG. 39 is a block diagram showing an example of the construction of an AAL2 cell forming unit according to the eighth embodiment.

FIG. 39 is a block diagram showing an eighth embodiment of the construction of an AAL2 cell forming unit for restoring and outputting original AAL2 cells from the two partially filled cells created by the partially filled cell forming unit of FIG. 37. Components identical with those of the first embodiment shown in FIG. 18 are designated by like reference characters. The eighth embodiment differs from the first embodiment in that:

the controller 61 detects loss of the second partially filled cell PC2 by receiving cells for which LI=0 holds in succession, and detects loss of the first partially filled cell PC1 by receiving cells for which LI>44 holds in succession; and control for the discarding of cells is performed upon detected loss of a cell.

A short packet greater than 48 bytes arrives upon being split into the first and second partially filled cells PC1, PC2. The controller 61 extracts the LI values of the first and second cells PC1, PC2 and determines whether cells for which LI=0 holds are contiguous or whether cells for which LI>44 holds. If either is the case, the controller construes that one cell of the pair has been lost and discards the half of the data of the short packet that has been stored in the short-cell buffer 62.

In the eighth embodiment, control for selecting predetermined signals based upon counts in the counter 65, restoring AAL2 cells and transmitting them is the same as that of the second embodiment.

(E) Cell Discard Control

Thus, the ATM exchange splits a short packet of greater 48 bytes to accommodate the packet in two partially filled cells (first-half and second-half cells), performs switching by an ATM switch in units of the partially filled cells, restores the original short packet of greater than 48 bytes using the first- and second-half cells, and outputs the short packet to a line in the AAL2 cell format. However, there are cases where only the first-half cell arrives and not the second-half cell on the restoration side of the ATM exchange. In such cases it is necessary to discard the first-half cell in order to utilize the memory of the restoration unit and maintain the data transmission quality. Further, there are cases where even though the second-half cell arrives at the restoration unit and the short packet is restored, the short packet is retained in memory for an extended period of time without being sent to a line. In such cases also it is necessary to discard the first-half cell in order to utilize the memory of the restoration unit and maintain the data transmission quality.

(a) Overview of Cell Discard Control

Figure 40:
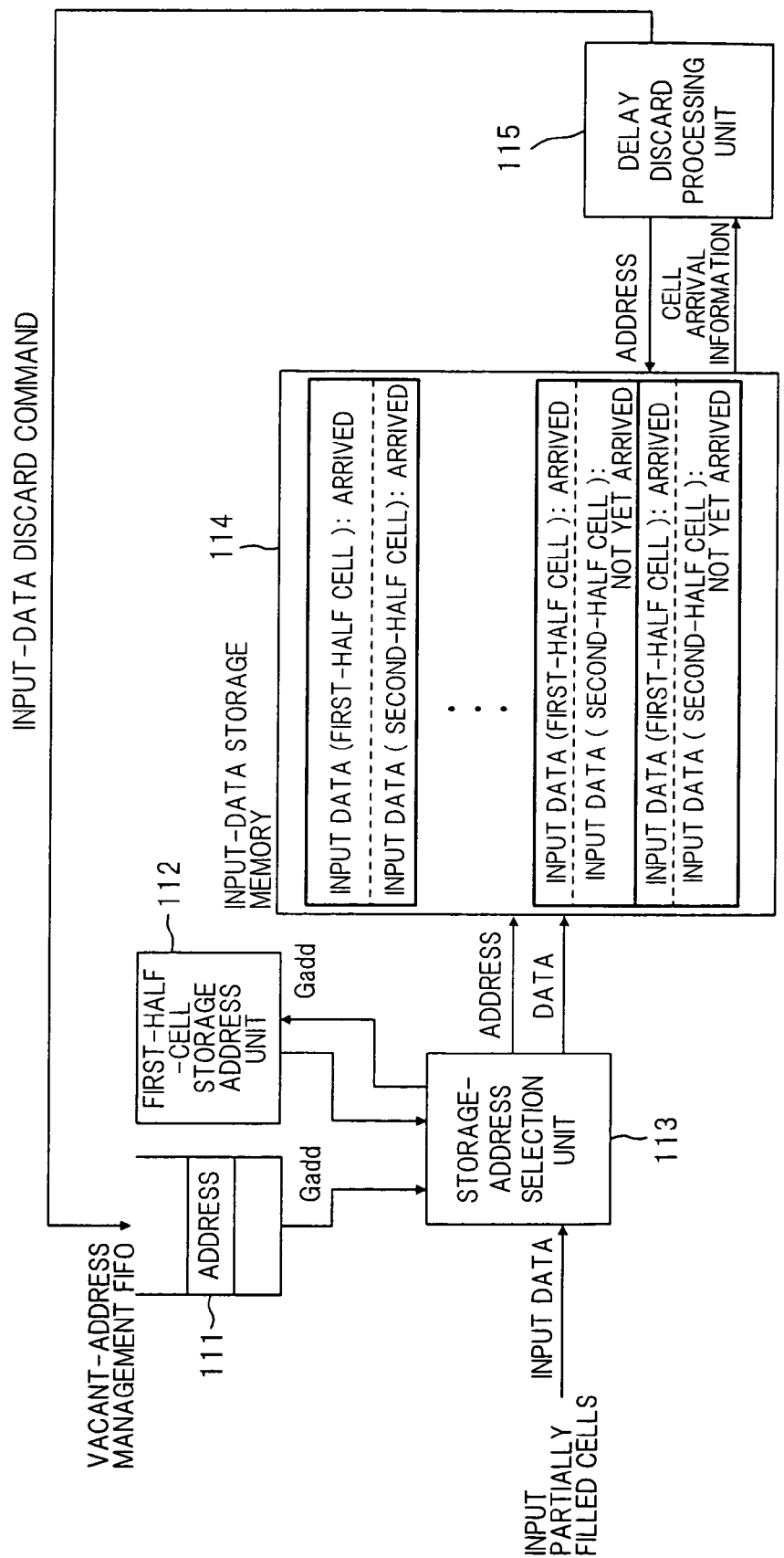
FIG. 40 is a diagram useful in describing an overview of cell discard control according to the present invention.

FIG. 40 is a diagram useful in describing an overview of cell discard control according to the present invention. The components include a vacant-address management FIFO 111, a first-half-cell storage address unit 112, a storage-address selection unit 113, an input-data storage memory 114 and a delay discard processing unit 115. If a first-half partially filled cell (first-half cell) of greater than 48 bytes enters the storage-address selection unit 113, the latter accepts a write address Gadd from the vacant-address management FIFO 111, stores the input data (first-half cell) in the memory 114 at the location indicated by the write address Gadd and stores the address Gadd in the first-half-cell storage address unit 112. If a second-half partially filled cell (second-half cell) of greater than 48 bytes enters the storage-address selection unit 113, the latter accepts address Gadd at which the first-half cell was stored from the first-half-cell storage address unit 112 and stores the input data (second-half cell) in the memory 114 following the first-half cell at the located indicated by the address Gadd. However, if a second-half cell of greater than 48 bytes does not arrive upon elapse of stipulated period of time and the first-half cell remains in the memory 114 over an extended period of time, the delay discard processing unit 115 instructs that the first-half cell be discarded. In other words, the delay discard processing unit 115 notifies the vacant-address management FIFO 111 of the address at which the first-half cell is stored and makes this address a vacant address so that another first-half cell can be stored.

Thus, the delay discard processing unit 115 manages arrival of a second-half cell that corresponds to a first-half cell that has been stored in the memory 114. (This is referred to as "delay discard processing".) Even if a second-half cell fails to arrive, therefore, the first-half cell will not remain in memory permanently and, as a result, the memory can be utilized efficiently.

(b) First Embodiment of Cell Discard (b-1) Construction

Figure 41:
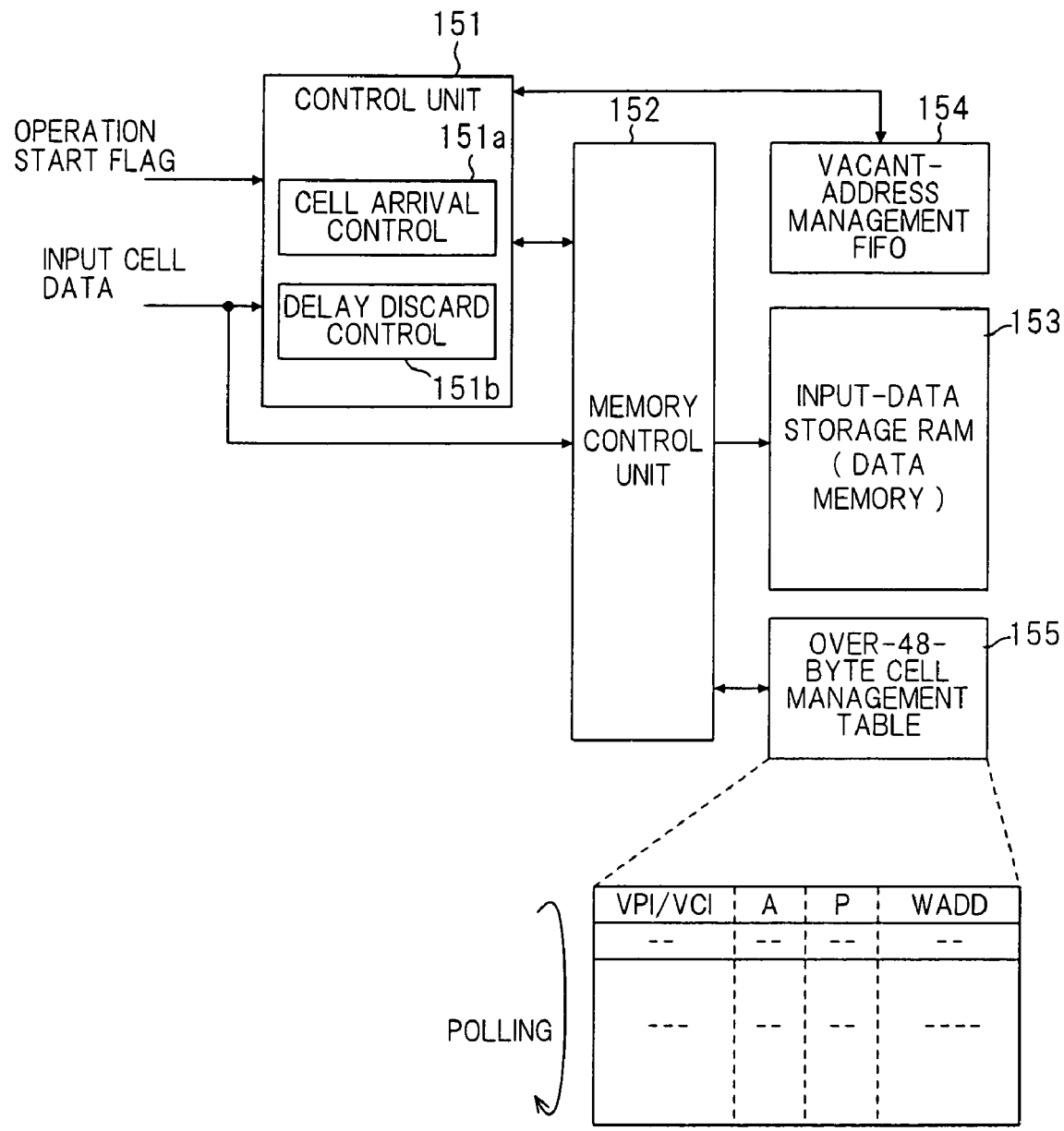
FIG. 41 is a block diagram showing a first arrangement for implementing cell discard control according to the present invention.

FIG. 41 is a block diagram illustrating a first embodiment for implementing discard control for discarding a first-half cell in response to delayed arrival of a second-half cell. According to the first embodiment, (1) data indicating whether or not a second-half cell, which corresponds to a first-half cell that has already arrived, has arrived is stored in memory, (2) this data is read out by polling at fixed cycles and checked to determine whether the second-half cell has arrived or not, and (3) the first-half cell is discarded if the second-half cell does not arrive even after the data is checked a predetermined number of times or more, e.g., twice.

As shown in FIG. 41, a control unit 151 for executing cell arrival control and delay discard control has a cell arrival controller 151a and a delay discard controller 151b. A memory control unit 152 performs control for writing and reading memory to and from memory, an input-data storage RAM (data memory) 153 stores input data, and a vacant-address management FIFO 154 manages vacant addresses of the data memory 153. An over-48-byte-cell management table 155 uses the VPI/VCI appended to a first-half cell as an address to manage (1) a first-half cell arrival flag A, (2) a polling-completed flag P and (3) a write address WADD for writing a first-half cell to the data memory 153. The first-half cell arrival flag A is set to "1" by the arrival of a first-half cell and is reset to "0" by the arrival of a second-half cell. The polling-completed flag P initially is "0" but is set to "1" when polling is performed.

(b-2) Cell Arrival Processing

Figure 42:
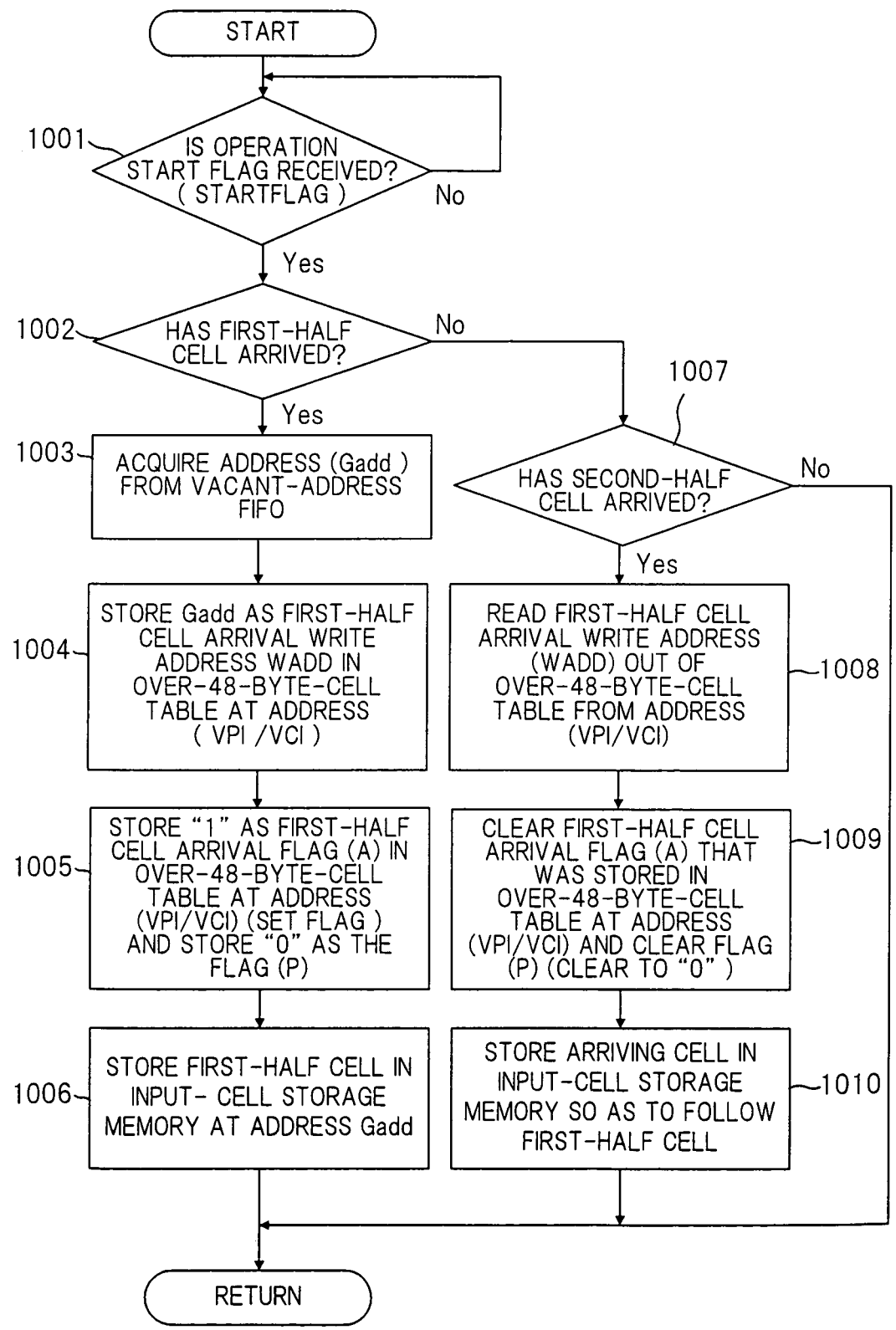
FIG. 42 is a flowchart of cell arrival processing.

FIG. 42 is a flowchart of cell arrival processing according to the first embodiment.

The control unit 151 starts cell arrival processing (step 1001) when an operation start flag (STARTFLAG) is received from a control panel (not shown).

First, the control unit 151 checks to determine whether a first-half cell has arrived (step 1002). If a first-half cell arrives, the control unit 151 acquires, from the vacant-address management FIFO 154, an address (Gadd) for storing a first-half cell whose length exceeds 48 bytes (step 1003).

Next, the control unit 151 regards the VPI/VCI of the input cell as address data of the over-48-byte-cell management table 155 and stores the first-half cell storage address Gadd as the write address WADD in the storage area indicated by VPI/VCI (step 1004).

Further, the control unit 151 stores the "1" as the first-half cell arrival flag A and "0" as the flag P in the storage area of the management table 155 indicated by the VPI/VCI (step 1005).

Next, the control unit 151 stores the first-half cell at the address Gadd of the data memory 153 acquired from the vacant-address management FIFO 154 (step 1006). Control then returns to the beginning and processing from step 1001 onward is repeated.

If it is determined at step 1002 that a first-half cell has not arrived, the control unit 151 checks to see whether a second-half cell has arrived (step 1007). If a second-half cell has not arrived, control returns to the beginning and processing from step 1001 onward is repeated. If it is found at step 1007 that a second-half cell has arrived, then the control unit 151 adopts the VPI/VCI of the second-half cell as an address and reads the address WADD at which the first-half cell was stored out of the management table 155 (step 1008). The control unit 151 further clears to "0" the first-half cell arrival flag A and flag P that was stored in the storage area of management table 155 indicated by VPI/VCI (step 1009).

Next, the control unit 151 stores the second-half cell so as to follow the first-half cell at the address WADD of the data memory 153 (step 1010). Control then returns to the beginning and processing from step 1001 onward is repeated.

(b-3) Delay Discard Processing

Figure 43:
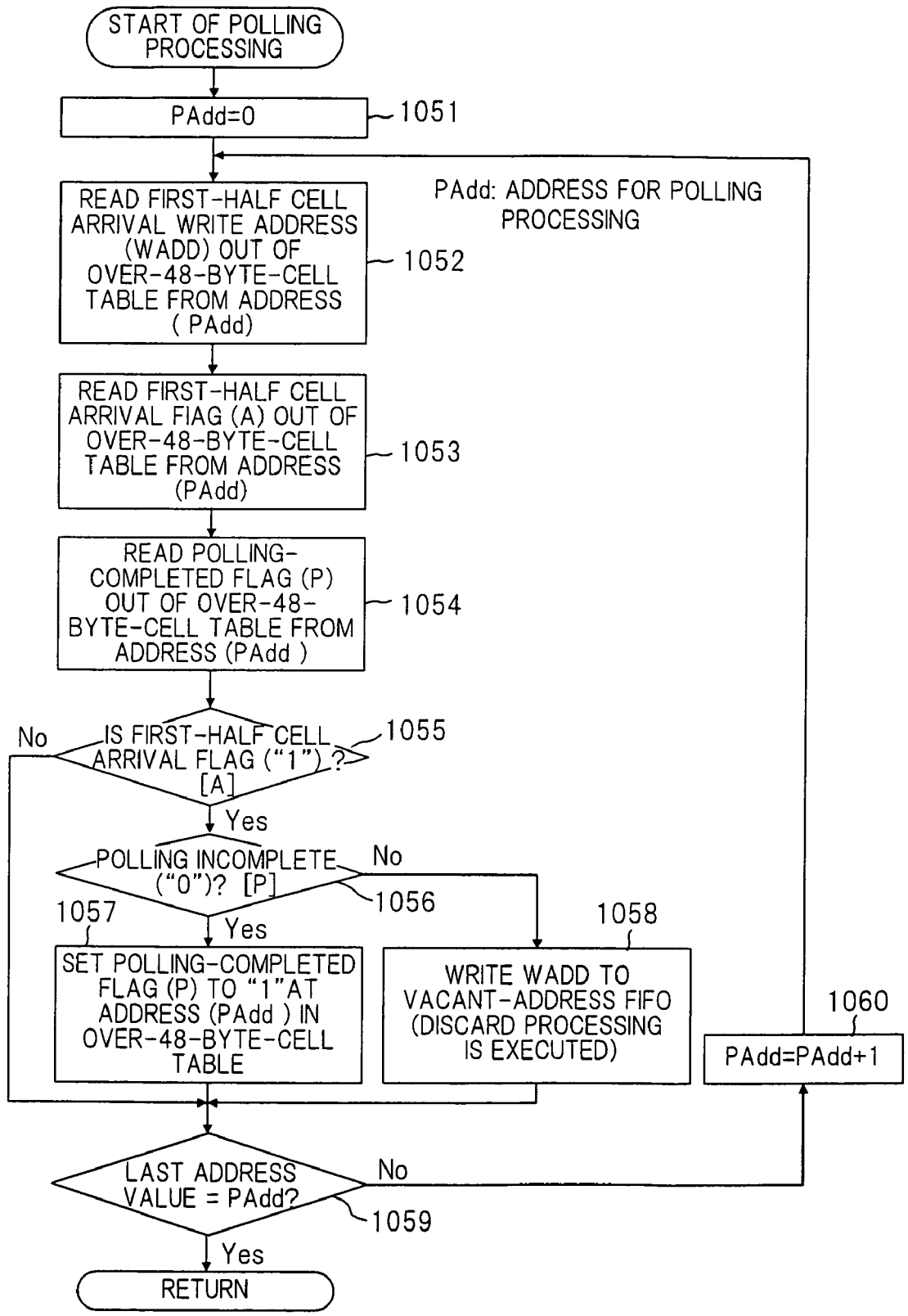
FIG. 43 is a flowchart of polling processing.

FIG. 43 is a flowchart of discard processing (polling processing) in response to delay of arrival of a second-half cell. The control unit 151 executes polling processing in concurrence with the above-described cell arrival processing.

At initialization, a polling address PAdd is made 0 (step 1051).

Next, the control unit 151 reads (1) the write address WADD of the first-half cell, (2) the first-half cell arrival flag A and (3) the polling-completed flag P out of the management table 155 from the polling address PAdd thereof (steps 1052–1054) and checks the status of the first-half cell arrival flag A and the status of the polling-completed flag P (steps 1055, 1056). Next, the control unit 151 executes the processing (i) to (iii) below in dependence upon the states of the first-half cell arrival flag A and polling-completed flag P.

(i) If the first-half cell arrival flag A has been set (A=1) and polling processing has not yet been executed (P=0), the polling-completed flag P in the storage area indicated by the polling address PAdd is set (P=1) (step 1057).

(ii) If the first-half cell arrival flag A has been set (A=1) and polling processing has been executed once (P=1), this means that a second-half cell has not arrived upon elapse of one polling period following the arrival of a first-half cell. In order to discard the first-half cell, therefore, the management table 155 reports the write address WADD of the first-half cell to the vacant-address management FIFO 154 (step 1058). As a result, the vacant-address management FIFO 154 vacates the address WADD of which it has been notified (i.e., discard processing is executed).

(iii) If the first-half cell arrival flag A has been reset (A=0), this means that a second-half cell has arrived and, hence, no particular processing is executed.

When the processing (i) to (iii) described above ends, the control unit 151 checks to determine whether the polling address PAdd is equal to the last address of the management table 155 (step 1059). If they are equal, control returns to the beginning and processing from step 1051 onward is repeated. If the two are not equal, however, the polling address PAdd is incremented (PAdd+1→PAdd) (step 1060) and processing from step 1052 onward is repeated.

Figure 44:
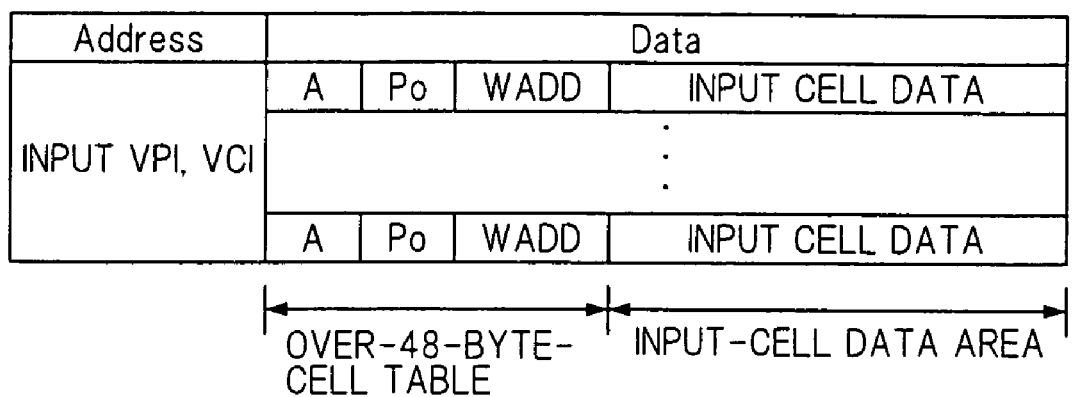
FIG. 44 is a diagram showing an example of the content of a RAM for storing input data.

The above illustrates an example in which the data memory 153 and the over-48-byte cell management table 155 are stored in separate memories. However, as shown in FIG. 44, it is possible to adopt an arrangement in which the first-half cell arrival flag A, polling-completed flag P and first-half cell write address WADD are stored, together with the input cell data (the first- and second-half cells), in the data memory 153 addressed by the VPI/VCI.

In accordance with the first embodiment, discard processing based upon delayed arrival of a second-half cell is executed after a first-half cell arrives, and the first-half cell is discarded if the second-half cell fails to arrive at elapse of a set time (the polling period). This makes it possible to prevent prolonged residence of the first-half cell so that effective utilization of memory can be achieved.

(c) Second Embodiment of Cell Discard (c-1) Construction

Figure 45:
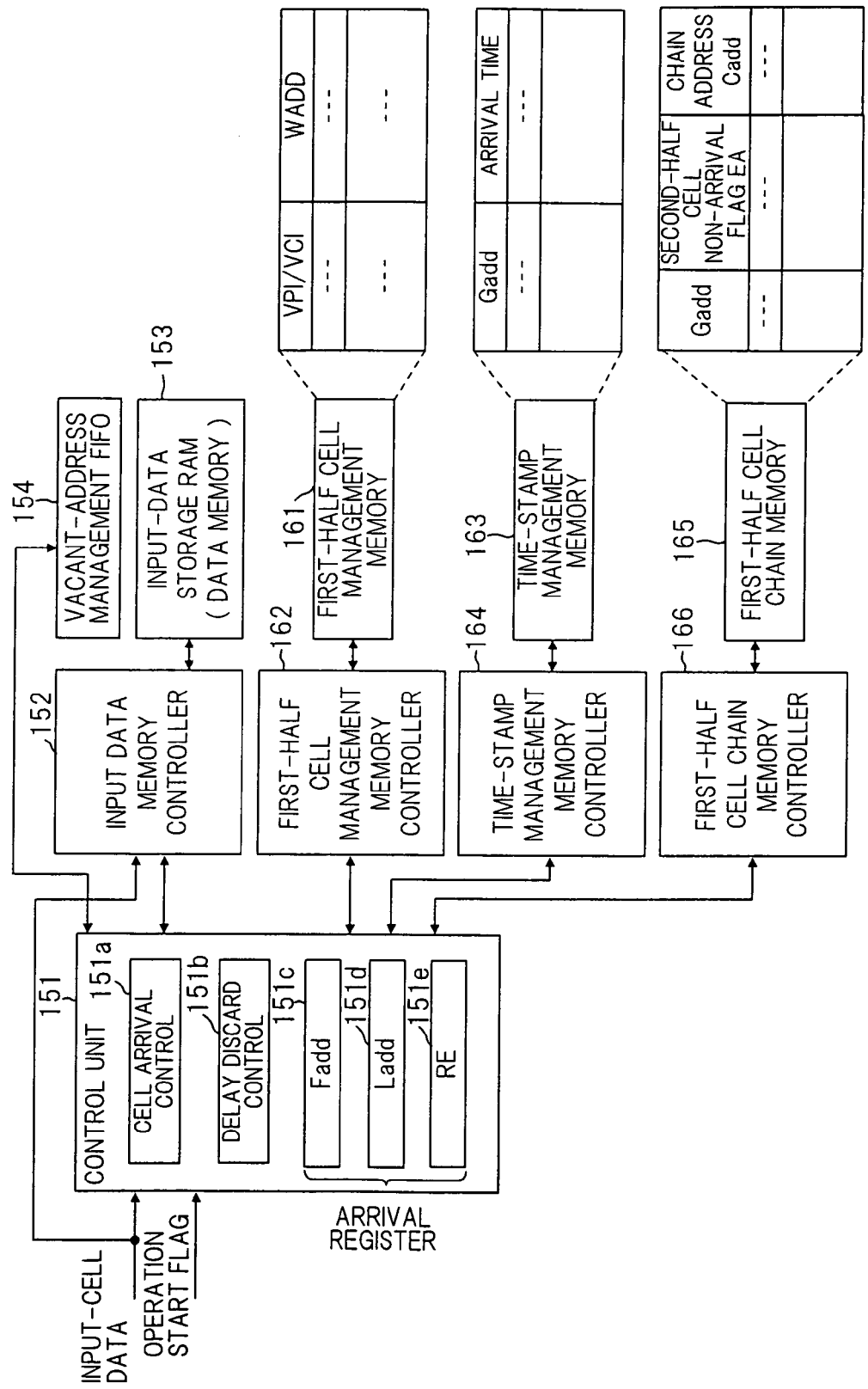
FIG. 45 is a block diagram showing a second arrangement for implementing cell discard control according to the present invention.

FIG. 45 is a block diagram illustrating a second embodiment for implementing discard control for discarding a first-half cell in response to delayed arrival of a second-half cell. Components identical with those of the first embodiment shown in FIG. 41 are designated by like reference characters. According to the second embodiment, the arrival time of a first-half cell that has already arrived is stored in advance, the difference between present time and the stored arrival time of a first-half cell whose second-half cell has not arrived is calculated and the first-half cell is discarded if the difference exceeds a stipulated time.

As shown in FIG. 45, the control unit 151 for executing cell arrival control and delay discard control has the cell arrival controller 151a, the delay discard controller 151b, a first-address (Fadd) storage register 151c, a last-address (Ladd) storage register 151d, and a register 151e for storing an arrival-register validation flag RE. Also shown in FIG. 45 are the memory control unit 152 which performs control for writing and reading memory to and from memory, the input-data storage RAM (data memory) 153 which stores input data, and the vacant-address management FIFO 154 which manages vacant addresses of the data memory 153. A first-half cell stored in the data memory 153 has the order of its arrival managed (in a manner described later). A data memory address which stores a first-half cell that arrives first in the order is adopted as the first address Fadd, and a data memory address which stores a first-half cell that arrives last in the order is adopted as the last address Ladd. The arrival-register validation flag RE indicates "0" (invalid state) when a first-half cell has not been stored in the data memory 153 and indicates "1" (valid state) when one or more first-half cells have been store in the data memory 153.

A first-half cell management memory 161 manages the first-half cell write address WADD in the data memory 153 and a memory controller 162 controls the writing and reading of data to and from the first-half cell management memory 161. The first-half cell management memory 161 stores, at a location indicated by the VPI/VCI of the first-half cell, the address Gadd of the data memory 153 at which this first-half cell has been written. The address Gadd is stored as the write address WADD.

A time-stamp management memory 163 manages the arrival time of the first-half cell, and a memory controller 164 controls the writing and reading of data to and from the time-stamp management memory 163. The latter stores the arrival time of a first-half cell so as to correspond to the address Gadd of the data memory 153 at which this first-half cell has been written.

A first-half cell chain memory 165 manages the order of arrival of first-half cells and manages arrival/non-arrival of second-half cells. A memory controller 166 controls the writing and reading of data to and from the first-half cell chain memory 165. The latter stores the following so as to correspond to the address Gadd of the data memory 153 at which the first-half cell has been written: (1) a second-half cell non-arrival flag EA, which indicates whether or not a second-half cell has arrived, and (2) a chain address Cadd for pointing to a first-half cell that arrived next. The second-half cell non-arrival flag EA is set (EA=1) in response to arrival of a first-half cell and is reset (EA=0) in response to arrival of a second-half cell.

Figure 46:
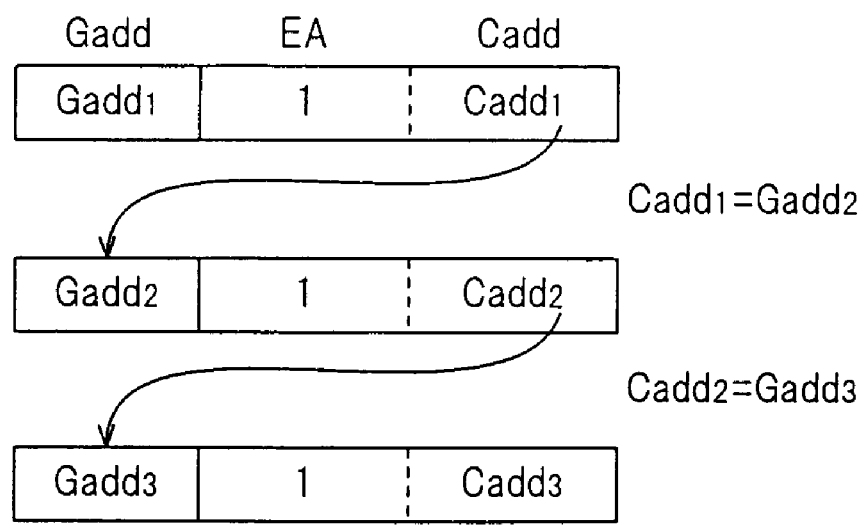
FIG. 46 is a diagram useful in describing a chain address Cadd.

FIG. 46 is a diagram useful in describing the chain address. It is assumed that first-half cells have been stored at addresses of the data memory 153 in the following order: Gadd1→Gadd2→Gadd3. In such case the chain address Cadd1 stored in the first-half cell chain memory 165 in correspondence with the first first-half cell storage address Gadd1 is made equal to the second first-half cell storage address Gadd2 so as to point to Gadd2. Further, the chain address Cadd2 stored in correspondence with the second first-half cell storage address Gadd2 is made equal to the third first-half cell storage address Gadd3 so as to point to Gadd3.

(c-2) Cell Arrival Processing (Time-Stamp Processing)

Figure 47:
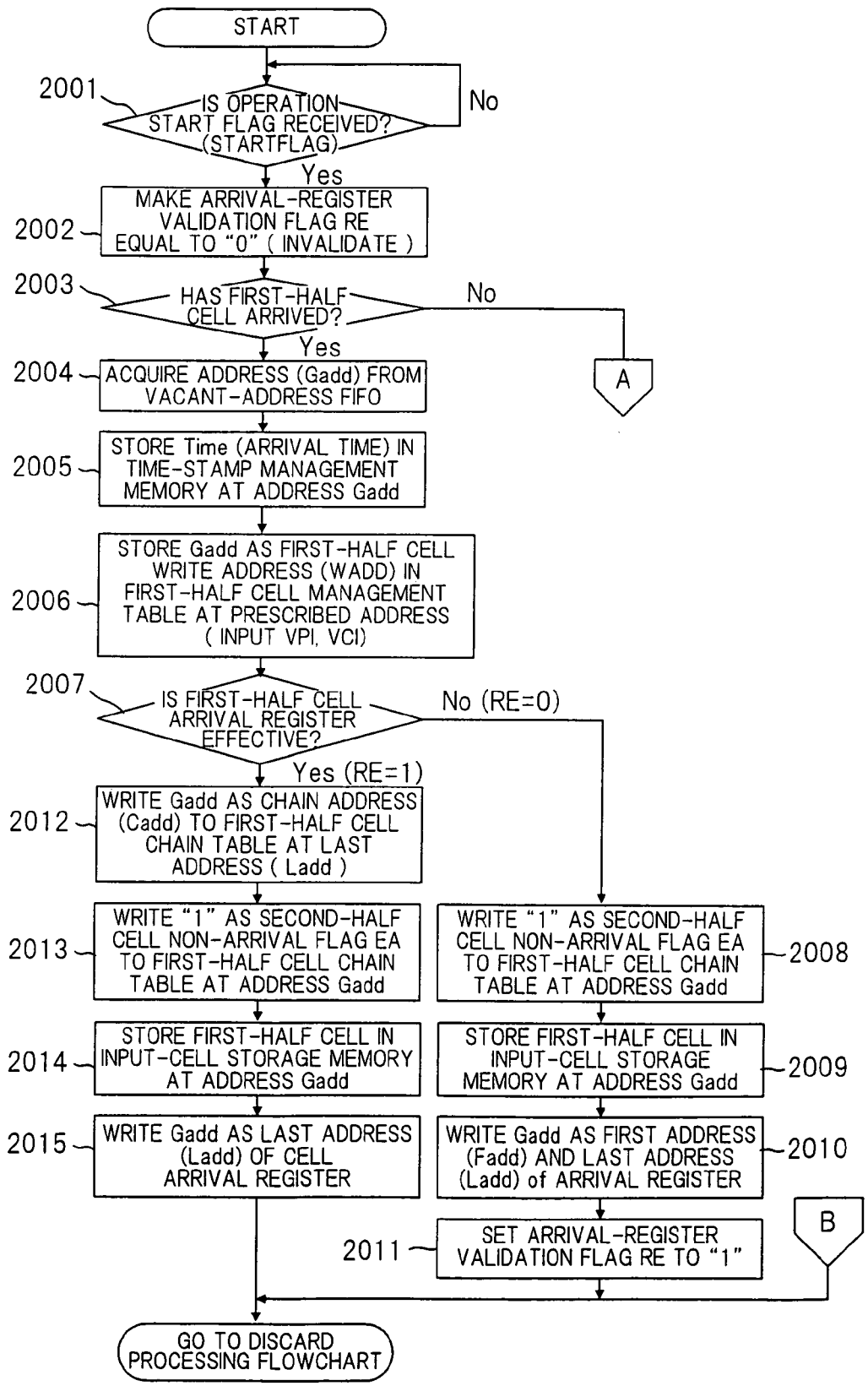
FIG. 47 is a flowchart (part 1) of time-stamp processing.
Figure 48:
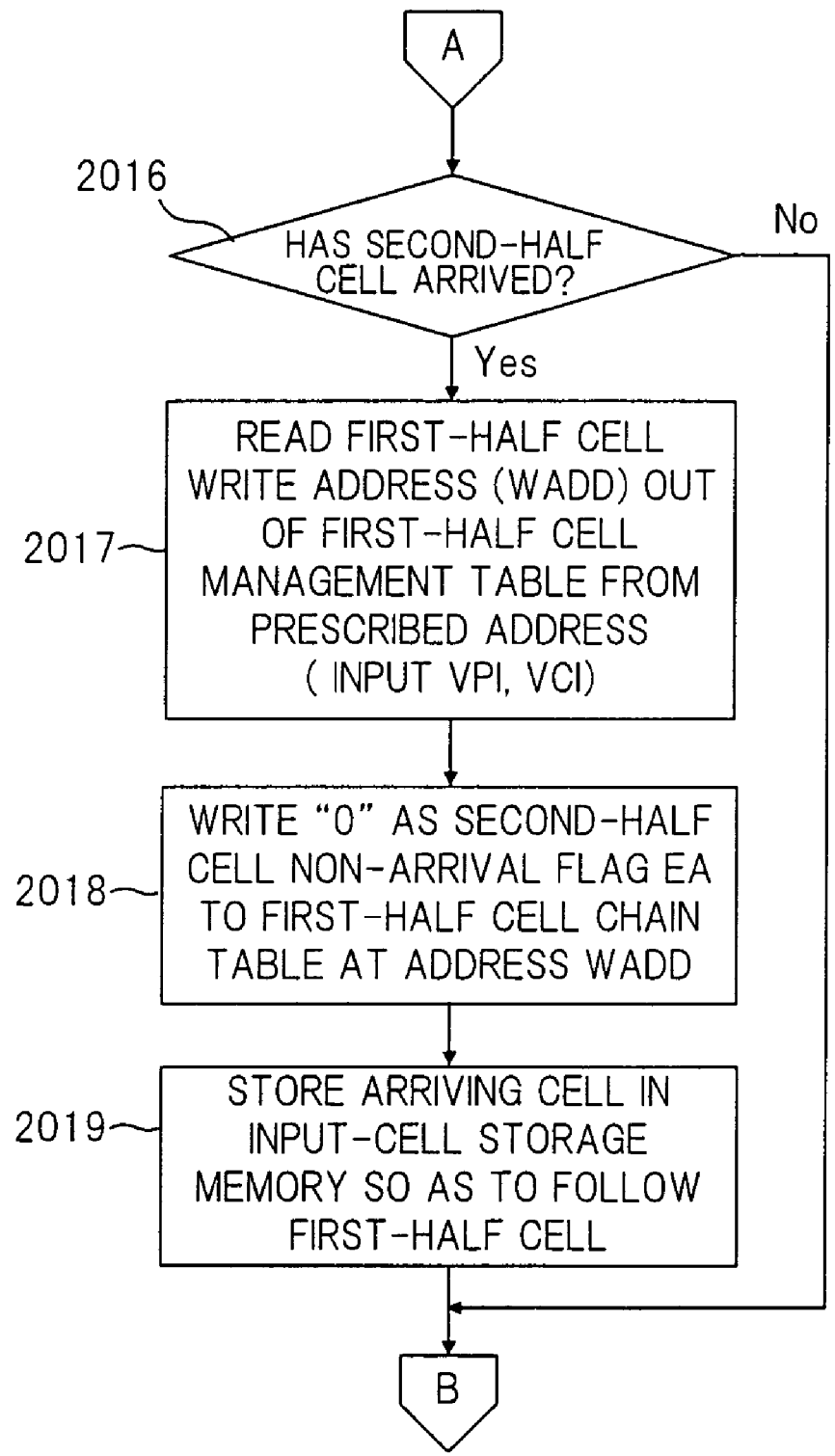
FIG. 48 is a flowchart (part 2) of time-stamp processing.

FIGS. 47 and 48 are flowcharts of cell arrival processing (time-stamp processing) according to the second embodiment.

The control unit 151 starts cell arrival processing (step 2001) when an operation start flag (STARTFLAG) is received from a control panel (not shown) and then places the arrival-register validation flag RE in the invalid state (RE=0) (step 2002).

Next, the control unit 151 checks to determine whether a first-half cell has arrived (step 2003). If a first-half cell arrives, the control unit 151 acquires, from the vacant-address management FIFO 154, an address (Gadd) for storing a first-half cell whose length exceeds 48 bytes (step 2004). Further, the control unit 151 stores the arrival time (Time) of the first-half cell in the time-stamp management memory 163 in the storage area indicated by the address Gadd acquired from the vacant-address management FIFO 154 (step 2005). Further, the control unit 151 regards the VPI/VCI of the first-half cell that has arrived as address data of the first-half cell management memory 161 and stores the first-half cell storage address Gadd acquired from the vacant-address management FIFO 154 as the write address WADD in the storage area indicated by VPI/VCI (step 2006).

The control unit 151 subsequently checks to see whether the first-half cell arrival register is valid, i.e., whether the arrival-register validation flag RE is 1 or not (step 2007). If a first-half cell has entered for the first time, RE=0 will hold.

If RE=0 holds, the control unit 151 sets the second-half cell non-arrival flag EA, which corresponds to the data-memory address Gadd in the first-half cell chain memory 165, to 1 (EA=1) (step 2008). Next, the control unit 151 stores the received first-half cell in the data memory 153 at the address Gadd acquired from the vacant-address management FIFO (step 2009). Further, the control unit 151 writes the above-mentioned address Gadd as the first address Fadd and last address Ladd to the registers 151c, 151d which store Fadd, Ladd, respectively (step 2010), sets the arrival-register validation flag RE (RE=1) and validates the registers 151c, 151d (step 2011). The control unit 151 then executes discard processing, described later, and repeats the processing from step 2003 onward after discard processing is executed.

If it is found at step 2007 that one or more first-half partially filled cells have been stored (RE=1), the control unit 151 writes the data-memory address Gadd just acquired to the first-half cell chain memory 165, in the storage area indicated by the last address Ladd, as the chain address Cadd (step 2012). Further, the control unit 151 sets the second-half cell non-arrival flag EA, which corresponds to the data-memory address Gadd just acquired in the first-half cell chain memory 165, to 1 (EA=1) (step 2013). Next, the control unit 151 stores the received first-half cell in the data memory 153 at the address Gadd (step 2014). The control unit 151 further writes the above-mentioned address Gadd as Ladd to the register 151d that stores the last address Ladd (step 2015). The control unit 151 then executes discard processing, described later, and repeats the processing from step 2003 onward after discard processing is executed.

If it is determined at step 2003 that a first-half cell has not arrived, the control unit 151 checks to see whether a second-half cell has arrived (step 2016). If a second-half cell has not arrived, control returns to the beginning and processing from step 2003 onward is repeated. If it is found at step 2016 that a second-half cell has arrived, then the control unit 151 adopts the VPI/VCI of this second-half cell as an address and reads the address WADD at which the first-half cell was stored out of the first-half cell management memory 161 from the storage area indicated by above-mentioned address (the VPI/VCI) (step 2017). The control unit 151 further clears to "0" the second-half cell non-arrival flag EA that was stored in the first-half cell chain memory 165 in the storage area indicated by the address WADD (step 2018). The control unit 151 further stores the second-half cell so as to follow the first-half cell in the storage area indicated by the address WADD of the data memory 153 (step 2019). Control then returns to the beginning and processing from step 2003 onward is repeated.

(c-3) Delay Discard Processing

Figure 49:
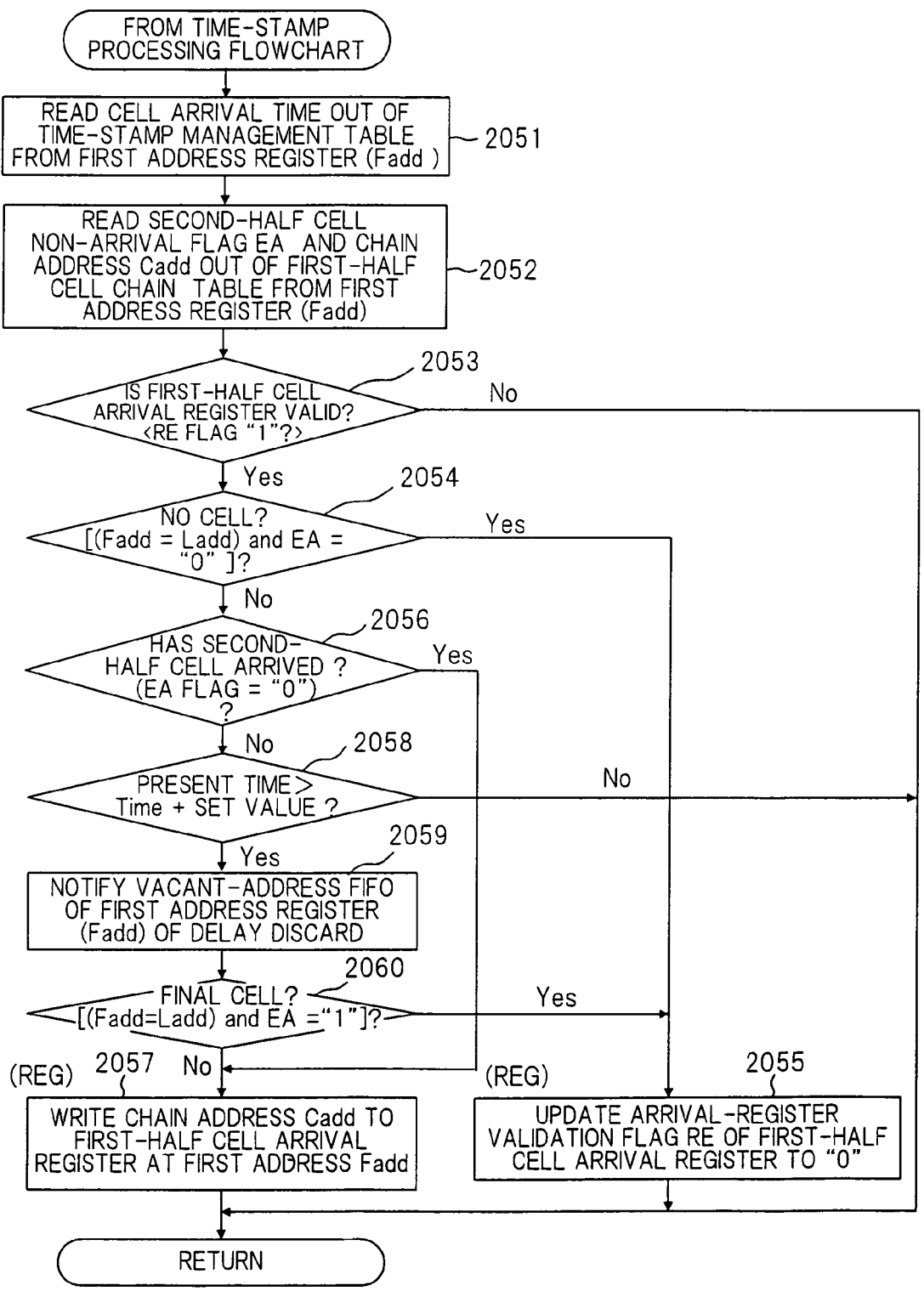
FIG. 49 is a flowchart of discard processing in response to a delay.

FIG. 49 is a flowchart of discard processing in response to delay of arrival of a second-half cell. The control unit 151 executes this discard processing following time-stamp processing.

The control unit 151 reads out the arrival time of the leading first-half cell from the location of the time-stamp management memory 163 indicated by the first address Fadd (step 2051). Similarly, the control unit 151 reads out the second-half cell non-arrival flag EA and chain address Cadd from the location of the first-half cell chain memory 165 indicated by the first address Fadd (step 2052).

Next, the control unit 151 checks to determine whether the first-half cell arrival register is valid or not, i.e., whether RE=1 holds (step 2053). If the first-half cell arrival register is invalid (i.e., if RE= 0 holds), discard processing is terminated.

If RE=1 holds, meaning that the first-half cell arrival register is valid, the control unit 151 determines whether the first address Fadd and last address Ladd match and whether the second-half cell forming the pair with the first-half cell that is the object of discard processing has arrived, i.e., whether EA=0 holds (step 2054). If Fadd=Ladd and EA=0 hold, then the control unit 151 construes that there is no next first-half cell that is the object of discard processing, invalidates the value in the first-half cell arrival register (RE=0) (step 2055) and terminates discard processing.

If the conditions set forth in step 2054 are not satisfied, the control unit 151 checks to see whether the second-half cell forming the pair with the first-half cell that is the object of discard processing has arrived, i.e., whether EA=0 holds (step 2056).

If EA=0 holds, then the control unit 151 adopts the address storing the first-half cell that is the object of discard processing in the next cycle as the new first address Fadd. The address storing the first-half cell that is the object of discard processing in the next cycle equals to the chain address Cadd that was read out at step 2052. Accordingly, if EA=0 holds, the control unit 151 adopts the chain address Cadd as the new first address Fadd (step 2057) and terminates discard processing.

If EA=1 holds, meaning that the second-half cell has not arrived, then the control unit 151 checks to see whether the inequality present time>arrival time (Time)+set value holds (step 2058). If this condition is not satisfied, the control unit 151 immediately terminates discard processing on the grounds that the above relation will not hold for all first-half cells.

If the above-mentioned condition is satisfied, however, then the control unit 151 construes that the second-half cell has not arrived even upon elapse of an extended period of time following arrival of the first-half cell and, hence, that the second-half cell has been discarded during transfer, and reports the first address Fadd to the vacant-address management FIFO 154 (step 2059). As a result, the vacant-address management FIFO 154 vacates the address of which it has been notified. This is discard processing.

Next, the control unit 151 checks to determine whether the first address Fadd and last address Ladd match and whether the second-half cell has failed to arrive (i.e., whether EA=1 holds) (step 2060). If Fadd=Ladd and EA=1 hold, then the control unit 151 construes that there is no next cell that is the object of discard processing, invalidates the value in the first-half cell arrival register (RE=0) (step 2055) and terminates discard processing.

If either Fadd≠Ladd or EA≠1 hold, however, this means that there is a next cell that is the object of delay discard processing and, hence, the control unit 151 adopts the chain address Cadd as the new first address Fadd (step 2057) and terminates discard processing. It should be noted that processing for discarding the first-half cell indicated by the new first address Fadd is executed in the next cycle.

In accordance with the second embodiment, discard processing in response to delay in the arrival of a second-half cell following arrival of a first-half cell is executed. If a second-half cell fails to arrive upon elapse of a set period of time, the first-half cell is discarded. As a result, a situation in which a first-half cell resides in memory for too long can be prevented. thereby making it possible to utilize the memory effectively.

(d) Third Embodiment of Cell Discard (d-1) Construction

Figure 50:
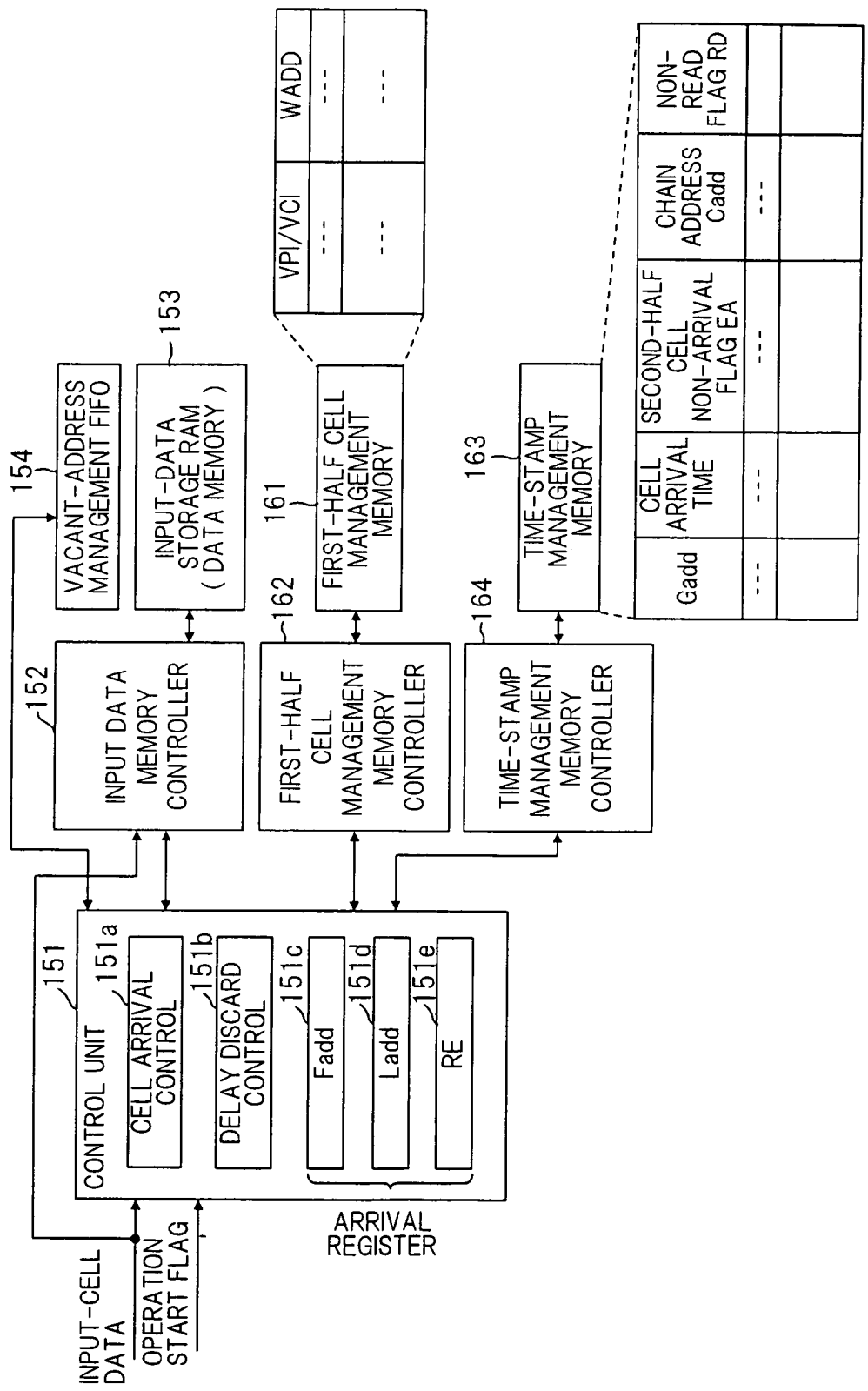
FIG. 50 is a block diagram showing a third arrangement for implementing cell discard control according to the present invention.

FIG. 50 is a block diagram illustrating a third embodiment for implementing discard control. Components identical with those of the second embodiment shown in FIG. 45 are designated by like reference characters. According to the third embodiment, a first-half cell is discarded in response to a delay in the arrival of a second-half cell, and both cells (first- and second-half cells) are discarded in response to a delay in cell read-out from memory. More specifically, the third embodiment stores the time of arrival of a second-half cell in memory, compares this arrival time with the present time and discards first- and second-half cells which have arrived but which have not been read out of the memory and sent to a line upon elapse of a predetermined period of time.

The third embodiment illustrated in FIG. 50 differs from the second embodiment of FIG. 45 in that:

the first-half cell chain memory 165 of the second embodiment is deleted;

the second-half cell non-arrival flag EA and chain address Cadd stored in the first-half cell chain memory 165 in the second embodiment are stored in the time-stamp management memory 163 in this embodiment;

a non-read flag RD, which indicates whether a cell has been read out of the data memory 153, is stored in the time-stamp management memory 163;

the arrival time of a first-half cell is written to a cell-arrival time section of the time-stamp management memory 163 and is overwritten with the arrival time of the second-half cell; and short packets having lengths of 48 bytes or less and lengths of more than 48 bytes are processed in mixed fashion.

In regard to the non-read flag RD, the condition RD=1 is established when a cell having a length of 48 bytes or less arrives or when a second-half cell arrives, and the condition RD=0 is established when a cell has been read out of memory.

(d-2) Cell Arrival Processing (Time-Stamp Processing)

Figure 51:
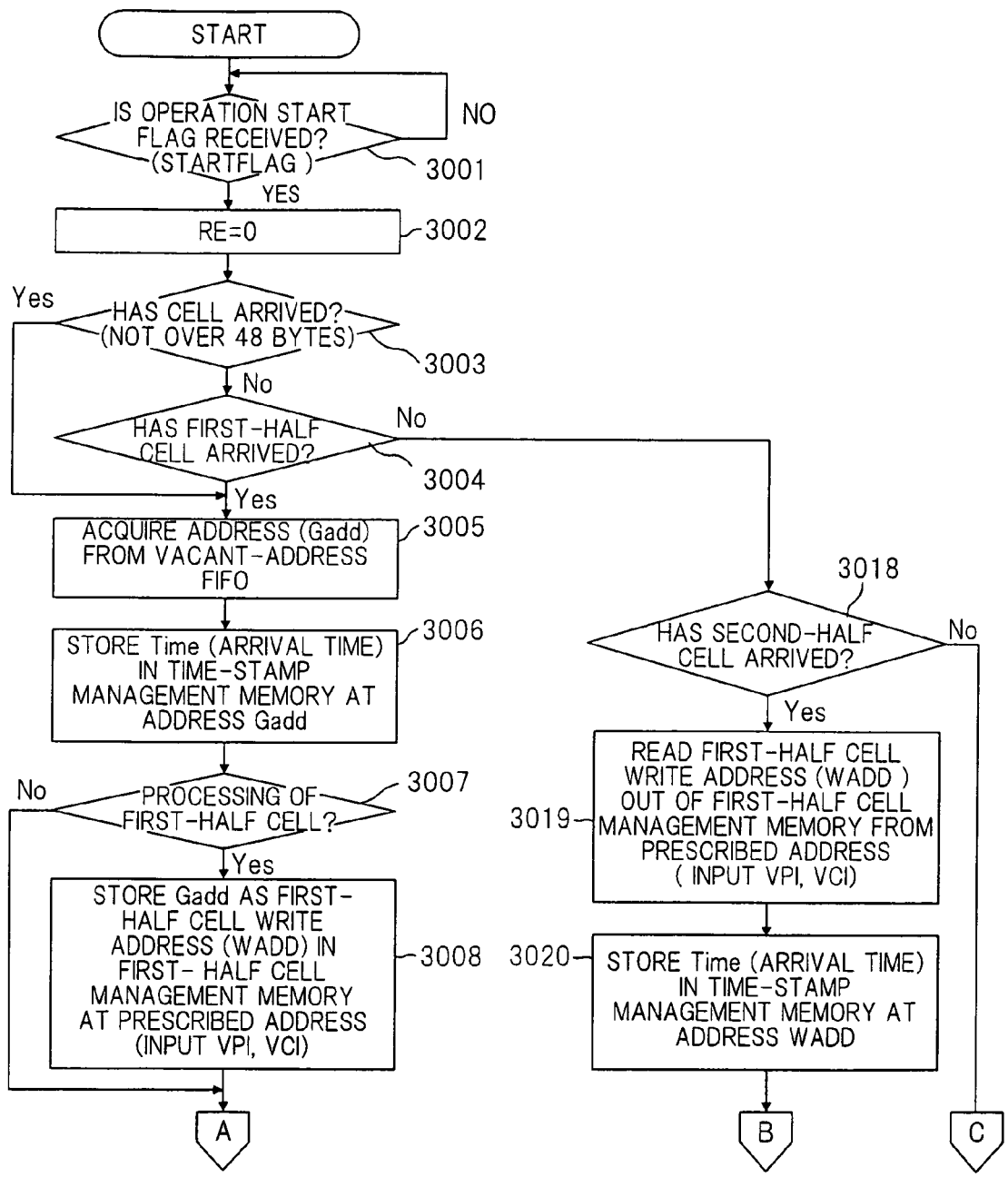
FIG. 51 is a flowchart (part 1) of time-stamp processing.
Figure 52:
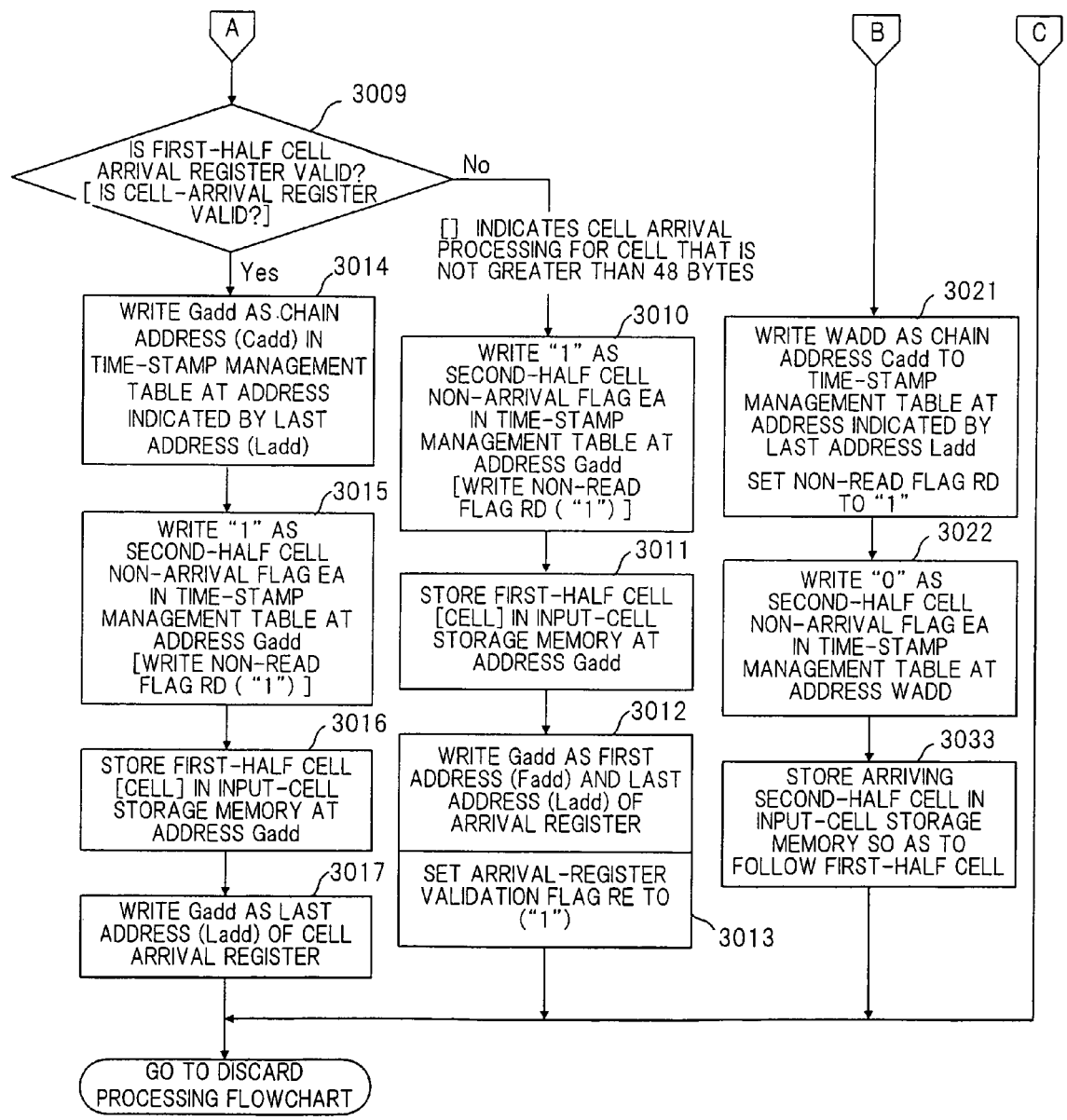
FIG. 52 is a flowchart (part 2) of time-stamp processing.

FIGS. 51 and 52 are flowcharts of cell arrival processing (time-stamp processing) according to the third embodiment.

The control unit 151 starts cell arrival processing (step 3001) when an operation start flag (STARTFLAG) is received from a control panel (not shown) and then places the arrival-register validation flag RE in the invalid state (RE=0) (step 3002).

Next, the control unit 151 checks to determine whether a partially filled cell of 48 bytes or less has arrived (step 3003). If such a cell has not arrived, the control unit 151 checks to determine whether a first-half cell has arrived (step 3004).

If it is found at step 3003 that a partially filled cell of 48 bytes or less has arrived or at step 3004 that a first-half cell has arrived, then the control unit 151 acquires, from the vacant-address management FIFO 154, an address (Gadd) for storing a cell of 48 bytes or less or a first-half cell of greater than 48 bytes (step 3005). Further, the control unit 151 stores the cell arrival time (Time) in the time-stamp management memory 163 in the storage area indicated by the address Gadd acquired from the vacant-address management FIFO 154 (step 3006).

Next, the control unit 151 determines whether the cell that has arrived is a cell of 48 bytes or less or a first-half cell of greater than 48 bytes (step 3007). If the cell is a first-half cell of greater than 48 bytes, the control unit 151 regards the VPI/VCI of this first-half cell as address data of the first-half cell management memory 161 and stores the data-memory address Gadd acquired at step 3005 as the write address WADD in the storage area indicated by VPI/VCI (step 3008).

The control unit 151 subsequently checks to see whether the cell arrival register is valid, i.e., whether the arrival-register validation flag RE is 1 or not (step 3009). If a cell (a cell of 48 bytes or less or a first-half cell of greater than 48 bytes) has entered for the first time, RE=0 will hold. It should be noted that when a cell is simply referred to as a "cell" below, it should be taken to mean a cell of 48 bytes or less and a first-half cell of greater than 48 bytes.

If RE=0 holds and the cell that has arrived is a first-half cell of greater than 48 bytes, the control unit 151 sets the second-half cell non-arrival flag EA, which corresponds to the data-memory address Gadd in the time-stamp management memory 163, to 1 (EA=1). If RE= 0 holds and the cell that has arrived is a cell of 48 bytes or less, then the control unit 151 sets the non-read flag RD to 1 (RD=1) (step 3010).

Next, the data memory 153 stores the received cell in the data memory 153 at the address Gadd acquired from the vacant-address management FIFO (step 3011). Further, the control unit 151 writes the above-mentioned address Gadd as the first address Fadd and last address Ladd to the registers 151*c*, 151*d* which store Fadd, Ladd, respectively (step 3012), sets the arrival-register validation flag RE to 1 and validates the registers 151*c*, 151*d* (step 3013). The control unit 151 then executes discard processing, described later, and repeats the processing from step 3003 onward after discard processing is executed.

If it is found at step 3009 that one or more cells have been stored (RE=1), the control unit 151 writes the data-memory address Gadd just acquired to the time-stamp management memory 163, in the storage area indicated by the last address Ladd, as the chain address Cadd (step 3014).

If the cell that has arrived is a first-half cell of greater than 48 bytes, then the control unit 151 sets the second-half cell non-arrival flag EA, which corresponds to the data-memory address Gadd in the time-stamp management memory 163, to 1 (EA=1). If the cell that has arrived is a cell of 48 bytes or less, then the control unit 151 sets the non-read flag RD to 1 (RD=1) (step 3015).

Next, the control unit 151 stores the received cell in the data memory 153 at the address Gadd (step 3016) and writes this address Gadd as the last address Ladd in the register 151*d* that stores Ladd (step 3017). The control unit 151 then executes discard processing, described later, and repeats the processing from step 3003 onward after discard processing is executed.

If it is determined at step 3004 that a first-half cell has not arrived, the control unit 151 checks to see whether a second-half cell has arrived (step 3018). If a second-half cell has not arrived, the control unit 151 executes discard processing. After discard processing, the control unit 151 repeats the processing from step 3003 onward. If it is found at step 3018 that a second-half cell has arrived, then the control unit 151 adopts the VPI/VCI of this second-half cell as an address and reads the address WADD at which the first-half cell was stored out of the first-half cell management memory 161 from the storage area indicated by above-mentioned address (the VPI/VCI) (step 3019). When the address WADD is obtained, the arrival time (Time) of the second-half cell is written over the storage area (arrival-time section) of the time-stamp management memory 163 indicated by the address WADD (step 3020). Though the arrival time of the first-half cell is erased by this overwrite operation, no problems arise because the arrival time of the first-half cell is no longer necessary after the arrival of the second-half cell. The reason for storing the arrival time of the second-half cell is for the purpose of performing control (discard control in response to delayed read-out) for discarding first-half/second-half cells not read out of the data memory 153 upon elapse of a predetermined period of time following arrival of a second-half cell.

Next, the control unit 151 executes processing for applying discard control, which is in response to delayed read-out, to a second-half cell and to the first-half cell forming the pair with this second-half cell. More specifically, the above-mentioned address WADD is written as the chain address to the storage area (chain-address section) of the time-stamp management memory 163 indicated by the last address Ladd. Further, the non-read flag RD is set (RD=1) (step 3021).

Thereafter, the control unit 151 clears to "0" the second-half cell non-arrival flag EA that was stored in the time-stamp management memory 163 in the storage area indicated by the address WADD (step 3022). The control unit 151 further stores the second-half cell so as to follow the first-half cell in the storage area indicated by the address WADD of the data memory 153 (step 3033). After the processing for storing the second-half cell is finished, the control unit 151 executes discard processing and repeats the processing from step 3003 onward after discard processing is executed.

(d-3) Delay Discard Processing

Figure 53:
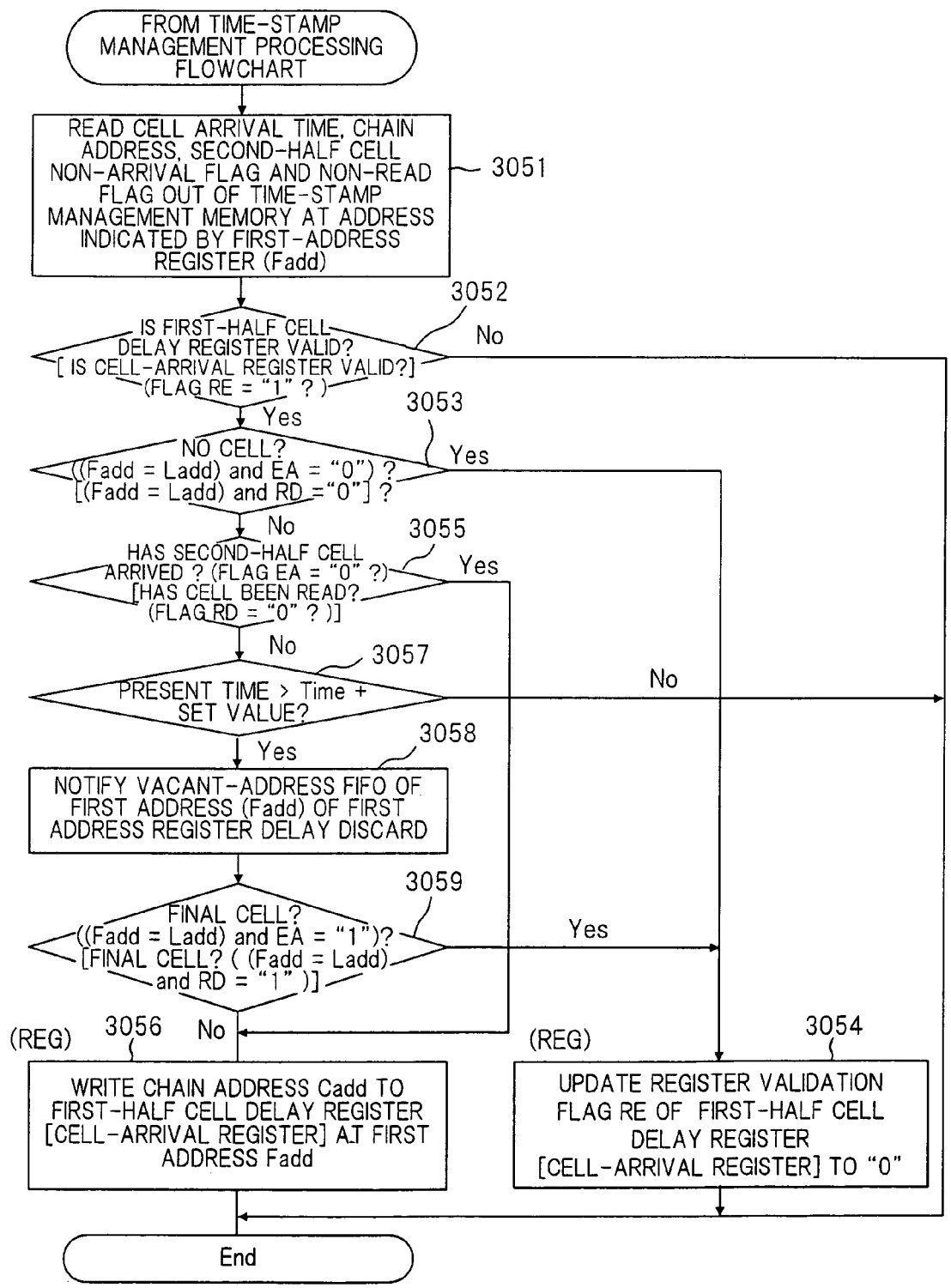
FIG. 53 is a flowchart of discard processing in response to a delay.
Figure 54:
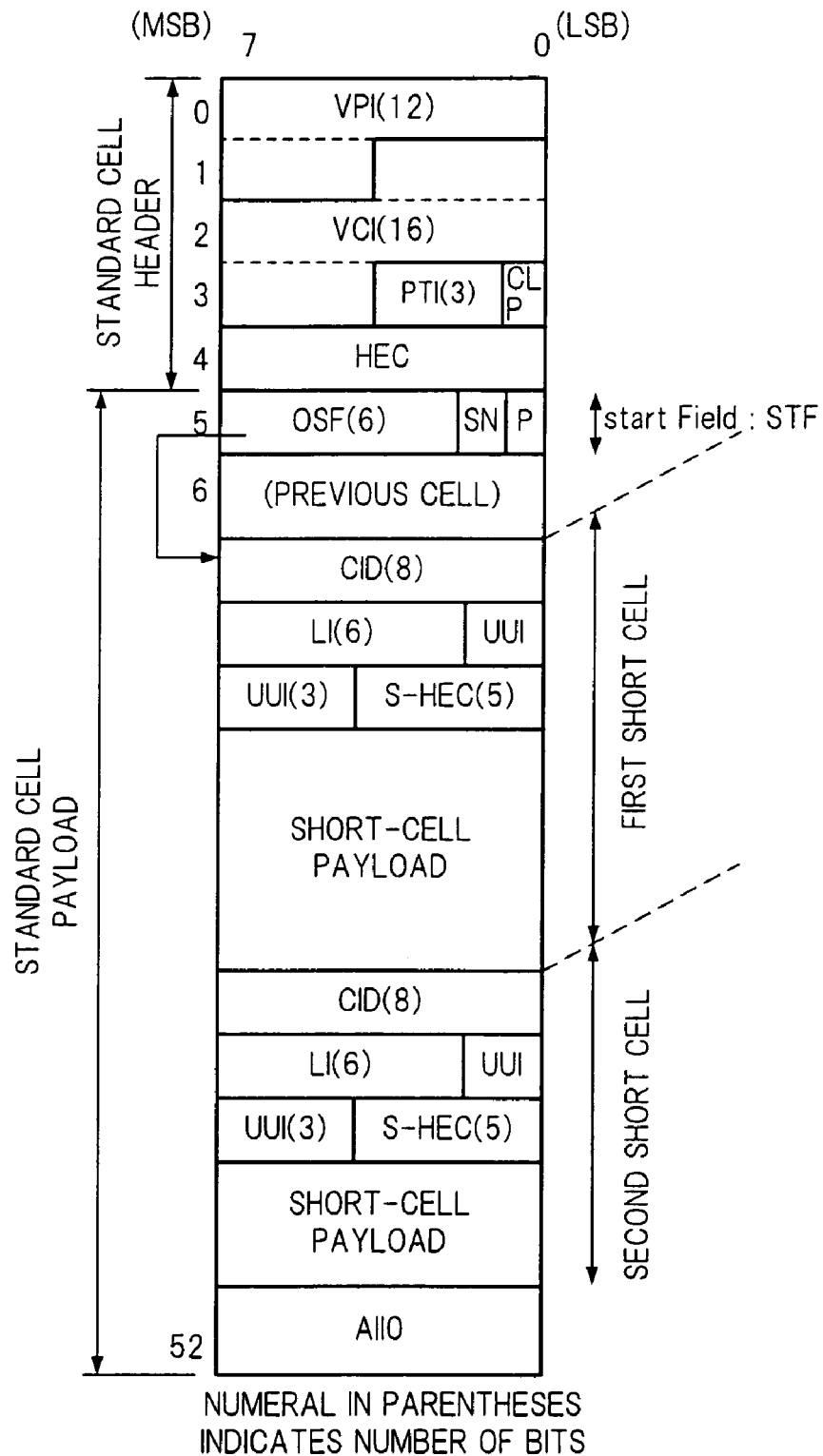
FIG. 54 is a diagram useful in describing the format of an AAL2 cell.
Figure 57:
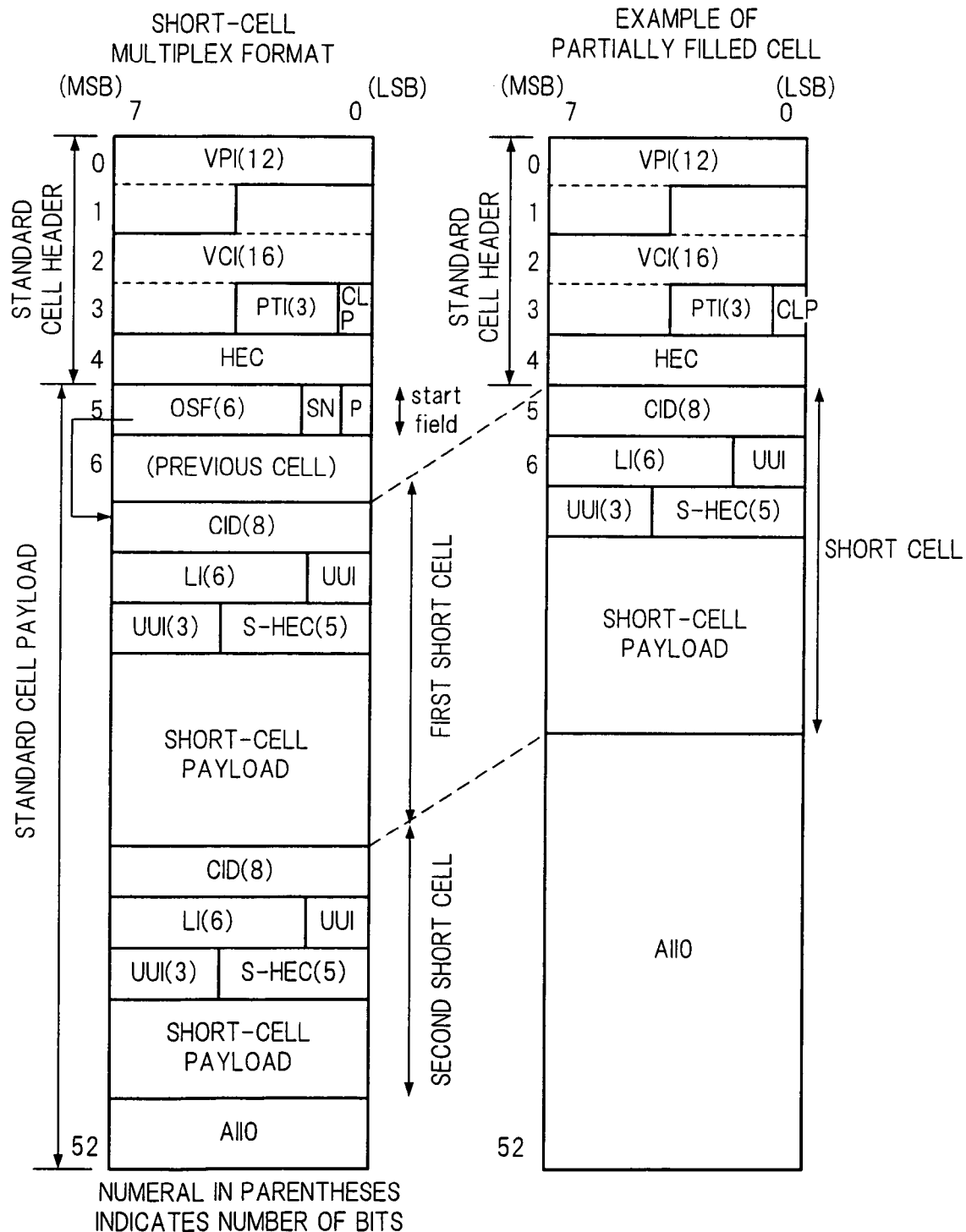
FIG. 57 is a diagram useful in describing the formats of the AAL2 cell, short cell and partially filled cell.
Figure 58:
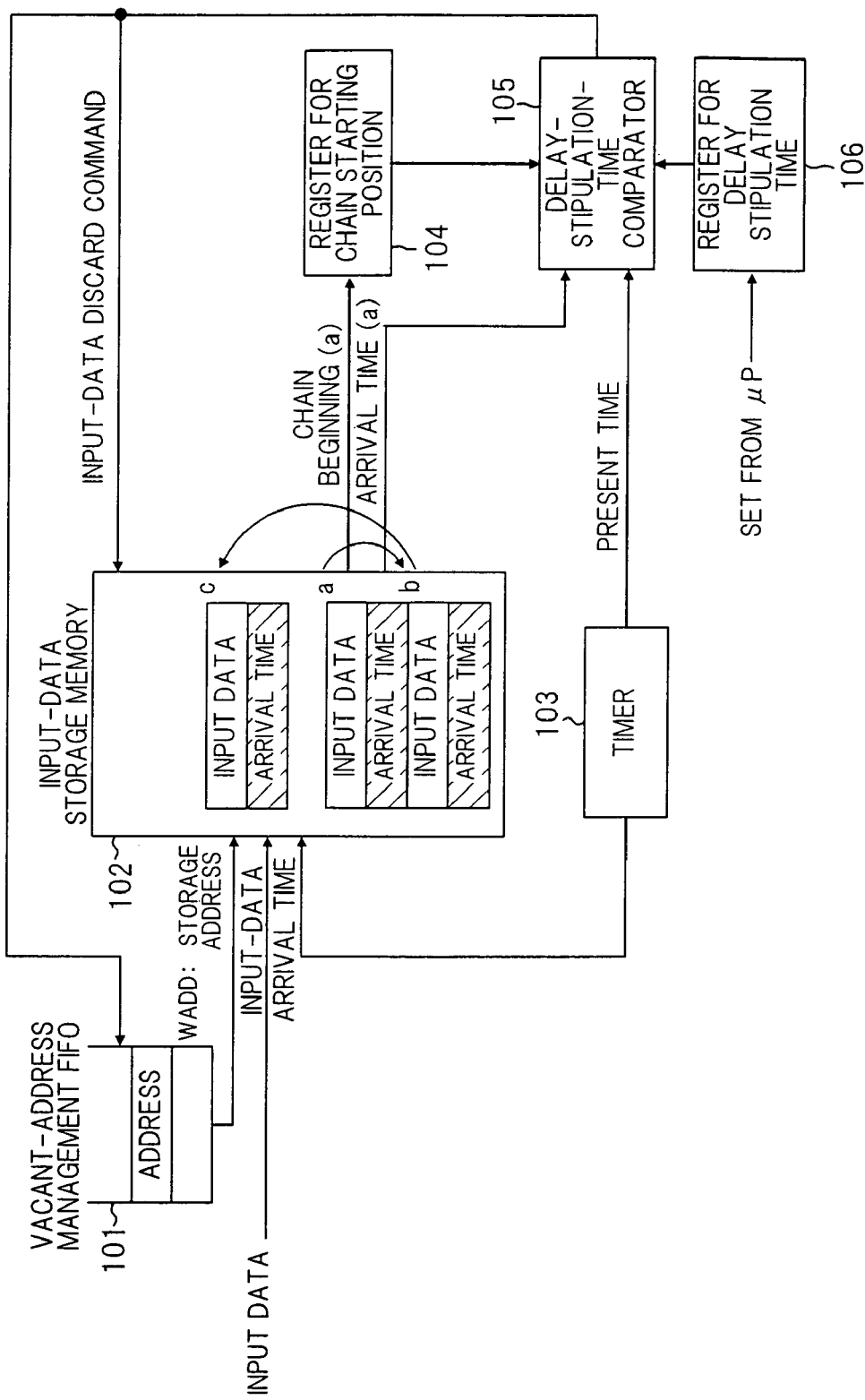
FIG. 58 is a diagram useful in describing an overview of discard control according to the prior art.
Figure 59A:
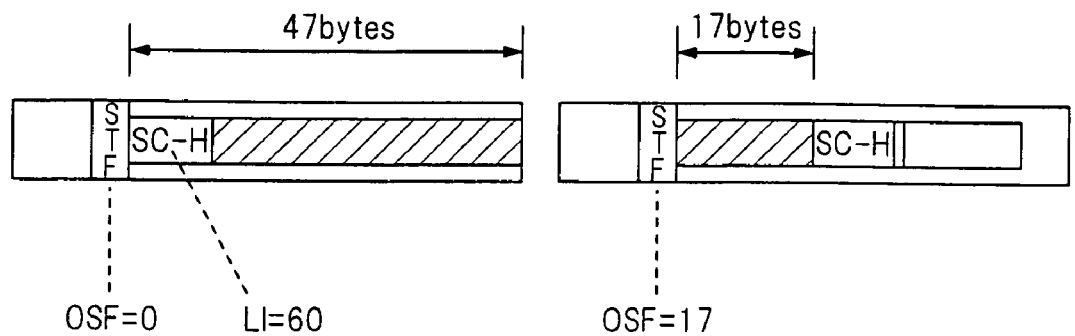
FIGS. 59A, 59B are diagrams illustrating a 64-byte short cell (AAL2 cell).
Figure 59B:
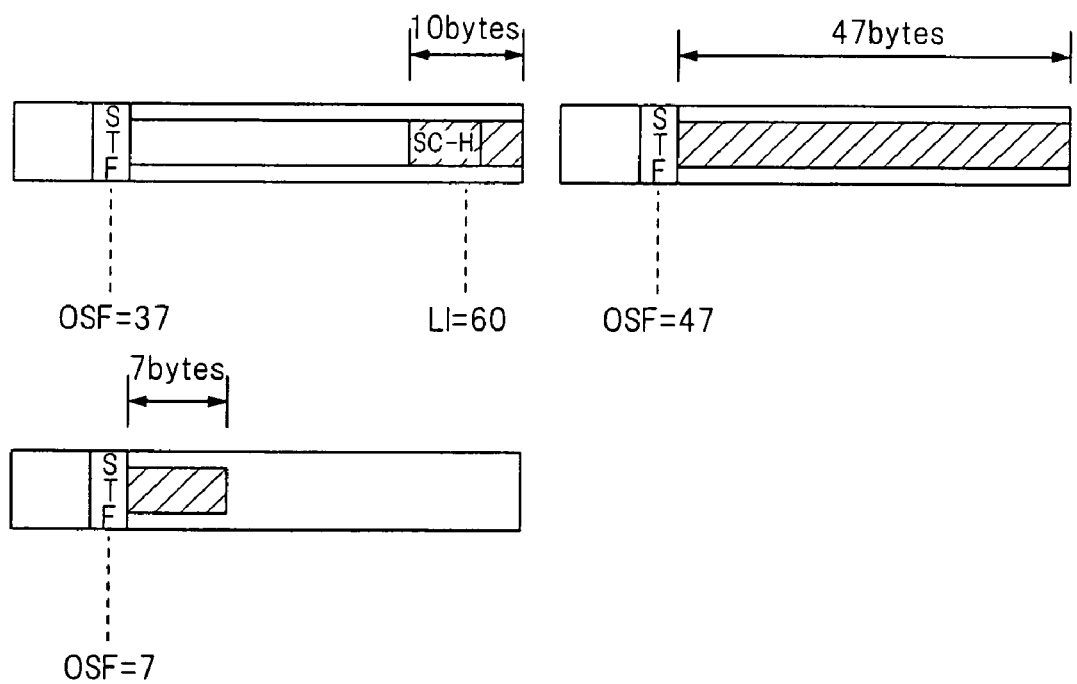

FIG. 53 is a flowchart of discard processing according to the third embodiment. This processing includes both delay processing in response to delay in the arrival of a second-half cell and discard processing in response to delayed cell read-out. Though the processing operations are executed in unison, they will be described separately below for the sake of convenience.

Discard Processing in Response to Delay in Arrival of Second-Half Cell

The control unit 151 reads out the cell arrival time, the second-half cell non-arrival flag EA, the chain address Cadd and the non-read flag RD from the location of the time-stamp management memory 163 indicated by the first address Fadd (step 3051).

Next, the control unit 151 checks to determine whether the first-half cell arrival register is valid or not, i.e., whether RE=1 holds (step 3052). If the first-half cell arrival register is invalid (i.e., if RE= 0 holds), discard processing is terminated.

If RE=1 holds, meaning that the first-half cell arrival register is valid, the control unit 151 determines whether the first address Fadd and last address Ladd match and whether the second-half cell forming the pair with the first-half cell that is the object of discard processing has arrived, i.e., whether EA=0 holds (step 3053). If Fadd=Ladd and EA=0 hold, then the control unit 151 construes that there is no next first-half cell that is the object of discard processing, invalidates the value in the first-half cell arrival register (RE=0) (step 3054) and terminates discard processing.

If the conditions set forth in step 3053 are not satisfied, the control unit 151 checks to see whether the second-half cell forming the pair with the first-half cell that is the object of discard processing has arrived, i.e., whether EA=0 holds (step 3055).

If EA=0 holds, then the control unit 151 adopts the address storing the first-half cell that is the object of discard processing in the next cycle as the new first address Fadd. The address storing the first-half cell that is the object of discard processing in the next cycle equals to the chain address Cadd that was read out at step 3051. Accordingly, if EA=0 holds, the control unit 151 adopts the chain address Cadd as the new first address Fadd (step 3056) and terminates discard processing.

If it is found at step 3055 that EA=1 holds, meaning that the second-half cell has not arrived, then the control unit 151 checks to see whether the inequality present time>arrival time (Time)+set value holds (step 3057). If this condition is not satisfied, the control unit 151 immediately terminates discard processing on the grounds that the above relation will not hold for all first-half cells.

If the above-mentioned condition is satisfied, however, then the control unit 151 construes that the second-half cell has not arrived even upon elapse of an extended period of time following arrival of the first-half cell and, hence, that the second-half cell has been discarded during transfer, and reports the first address Fadd to the vacant-address management FIFO 154 (step 3058). As a result, the vacant-address management FIFO 154 vacates the address of which it has been notified. This is discard processing.

Next, the control unit 151 checks to determine whether the first address Fadd and last address Ladd match and whether EA=1 holds) (step 3059). If Fadd= Ladd and EA=1 hold, then the control unit 151 construes that there is no next cell that is the object of discard processing, invalidates the value in the first-half cell arrival register (RE=0) (step 3054) and terminates discard processing.

If either Fadd≠Ladd or EA≠1 hold, however, this means that there is a next cell that is the object of delay discard processing and, hence, the control unit 151 adopts the chain address Cadd as the new first address Fadd (step 3056) and terminates discard processing. It should be noted that processing for discarding the first-half cell indicated by the new first address Fadd is executed in the next cycle.

Discard Processing in Response to Read-Out Delay

The processing that follows is processing for discarding cells of 48 bytes or less and discard processing in a case where both first- and second-half cells have arrived.

The control unit 151 reads out the cell arrival time, the second-half cell non-arrival flag EA, the chain address Cadd and the non-read flag RD from the location of the time-stamp management memory 163 indicated by the first address Fadd (step 3051).

Next, the control unit 151 checks to determine whether the cell arrival register is valid or not, i.e., whether RE=1 holds (step 3052). If the cell arrival register is invalid (i.e., if RE=0 holds), discard processing is terminated.

If RE=1 holds, meaning that the cell arrival register is valid, the control unit 151 determines whether the first address Fadd and last address Ladd match and whether the non-read flag RD is 0 or not (step 3053). If Fadd=Ladd and RD=0 hold, then the control unit 151 construes that there is no next cell that is the object of discard processing, invalidates the value in the cell arrival register (RE=0) (step 3054) and terminates discard processing.

If the conditions set forth in step 3053 are not satisfied, the control unit 151 checks to see whether a cell that is the object of discard processing has already been read out, i.e., whether RD=0 holds (step 3055). If RD=0 holds, meaning that such a cell has already been read out, then the control unit 151 adopts the address storing the cell that is the object of discard processing in the next cycle as the new first address Fadd. The address storing the cell that is the object of discard processing in the next cycle equals to the chain address Cadd that was read out at step 3051. Accordingly, if RD=0 holds, the control unit 151 adopts the chain address Cadd as the new first address Fadd (step 3056) and terminates discard processing.

If it is found that RD=1 holds, meaning that a cell has not yet been read out, then the control unit 151 checks to see whether the inequality present time>arrival time (Time)+set value holds (step 3057). If this condition is not satisfied, the control unit 151 immediately terminates discard processing on the grounds that the above relation will not hold for all cells. It should be noted that the arrival time in the above-cited equation is the arrival time of a second-half cell or the arrival time of a cell of 48 bytes or less.

If the above-mentioned condition is satisfied, this means that a cell or a second-half cell has been residing in the data memory 153 for an extended period of time without having been read out. Since there is little possibility that such a cell will ever be read out, the control unit 151 reports the first address Fadd to the vacant-address management FIFO 154 to effect discard (step 3058). That is, the vacant-address management FIFO 154 vacates the address of which it has been notified. This is discard processing and makes it possible to utilize the memory effectively.

Next, the control unit 151 checks to determine whether the first address Fadd and last address Ladd match and whether RD=1 holds (step 3059). If Fadd= Ladd and RD=1 hold, then the control unit 151 construes that there is no next cell that is the object of read-out delay discard processing, invalidates the value in the cell arrival register (RE=0) (step 3054) and terminates discard processing.

If either Fadd≠Ladd or RD≠1 hold, however, this means that there is a next cell that is the object of read-out delay discard processing and, hence, the control unit 151 adopts the chain address Cadd as the new first address Fadd (step 3056) and terminates discard processing. It should be noted that processing for discarding the cell indicated by the new first address Fadd is executed in the next cycle.

In accordance with the third embodiment, discard processing in response to a delay in the arrival of a second-half cell is carried out after the arrival of a first-half cell. If a second-half cell fails to arrive upon elapse of a set period of time, the first-half cell is discarded. As a result, a situation in which a first-half cell resides in memory for too long can be prevented. thereby making it possible to utilize the memory effectively.

Further, in accordance with the third embodiment, discard processing in response to a delay in read-out is performed after the arrival of a second-half cell. If a cell fails to be read out of memory upon elapse of set period of time, the first- and second-half cells are discarded. As a result, a situation in which a first- and second-half cells reside in memory for too long can be prevented, thereby making it possible to utilize the memory effectively.

Thus, in accordance with the present invention, the arrangement is such that a short packet, which has a length greater than a length L (=48) bytes capable of being accommodated in one ATM cell, is split so as to be capable of being accommodated in first and second ATM cells, (1) one of the short-packet portions and (2) significant data containing short-packet length information are accommodated in a payload area of the first ATM cell, remaining significant data, which could not be accommodated in the first ATM cell, is accommodated in a payload area of the second ATM cell, and each ATM cell is input to an ATM switch. As a result, a short packet having a length that exceeds 48 bytes can be switched. In addition, in accordance with the present invention, existing hardware such as the ATM switch for processing standard ATM cells can be used as is. This makes it possible to suppress equipment cost.

In accordance with the present invention, various methods of splitting a short packet of greater 48 bytes are devised. On the restoration side, therefore, it is easy to identify (1) whether a cell is a partially filled cell that has been produced by splitting a short packet, and (2) the length of the significant data in each cell. This makes it possible to restore correctly the original short cell of greater than 48 bytes.

In accordance with the present invention, (1) sequence-number information is added on in a specific area of each of each of first- and second-half cells, or (2) cell-identification code information is added on in a specific area of each of first- and second-half cells, or (3) an error detection code, which has been created using all significant data of a short packet, is added onto a specific area of a second-half cell. As a result, discarding of a cell during the course of transfer can be detected reliably on the restoration side and the quality of data transmission can be maintained by discarding the other cell that constitutes the pair with the cell whose discarding has been detected.

In accordance with the present invention, a cell that has been retained in memory for too long is discarded. This makes it possible to utilize the memory effectively and to store new cells in the memory reliably.

In accordance with the present invention, discard processing in response to a delay in the arrival of a second-half cell is carried out after the arrival of a first-half cell. If a second-half cell fails to arrive upon elapse of a set period of time, the first-half cell is discarded. As a result, a situation in which a first-half cell resides in memory for too long can be prevented. thereby making it possible to utilize the memory effectively. Moreover, data transmission quality can be maintained.

In accordance with the present invention, discard processing in response to a delay in read-out is performed after the arrival of a second-half cell. If a cell fails to be read out of memory upon elapse of set period of time, the first- and second-half cells are discarded. As a result, a situation in which a first- and second-half cells reside in memory for too long can be prevented. thereby making it possible to utilize the memory effectively. Moreover, data transmission quality can be maintained.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for executing processing for switching a short-packet, comprising:
   means for judging whether the length of the short packet is larger than length L bytes, where L bytes can be accommodated in one ATM cell;
   means for splitting the short packet, which has a length greater than the length L bytes, into short-packet portions so as to be accommodated respectively in first and second ATM cells;
   cell creation means for accommodating significant data containing one of the short-packet portions and short-packet length information in a payload area of the first ATM cell, accommodating remaining significant data including another short-packet portion, the remaining significant data could not be accommodated in the first ATM cell, in a payload area of the second ATM cell, and inputting the first and second ATM cells to an ATM switch;
   restoration means for extracting short-packet portions accommodated in respective ones of first and second ATM cells upon referring to said short-packet length information that has been accommodated in the first ATM cell output from the ATM switch, restoring the original short packet having the length greater than L bytes, and sending the original short packet to a line; and
   means for generating sequence-number information for identifying the first and second ATM cells;
   said cell creation means adding on the sequence number information in a specific area of each of the first and second ATM cells, and said restoration means detecting absence or presence of cell discard upon referring to the sequence-number information of a received ATM cell.

2. The apparatus according to claim 1, wherein said restoration means preserves the significant data that has been accommodated in the payload of one of the first and second ATM cells received from the ATM switch and, if cell discard is detected, discards the preserved significant data.

3. The apparatus according to claim 1, wherein the specific area is an area within the payload of an ATM cell and contains no significant data of the short packet.

4. The apparatus according to claim 1, wherein the specific area is an unused area within an ATM cell header.

5. The apparatus according to claim 1, wherein said cell creation means adds on a short-packet header in the payload area of each of the first and second ATM cells and employs an unused area within the short-packet header of each cell as the specific area.

6. An apparatus for executing processing for switching a short-packet, comprising:

means for judging whether the length of the short packet is larger than length L bytes, where L bytes can be accommodated in one ATM cell;

means for splitting the short packet, which has a length greater than the length L bytes, into short-packet portions so as to be accommodated respectively in first and second ATM cells;

cell creation means for accommodating significant data containing one of the short-packet portions and short-packet length information in a payload area of the first ATM cell, accommodating remaining significant data including another short-packet portion, the remaining significant data could not be accommodated in the first ATM cell, in a payload area of the second ATM cell, and inputting the first and second ATM cells to an ATM switch;

restoration means for extracting short-packet portions accommodated in respective ones of first and second ATM cells upon referring to said short-packet length information that has been accommodated in the first ATM cell output from the ATM switch, restoring the original short packet having the length greater than L bytes, sending the original short packet to a line; and means for generating code information for identifying the first and second ATM cells;

said cell creation means adding on the code information in a specific area of each of the first and second ATM cells, and said restoration means detecting absence or presence of cell discard upon referring to the code information of a received ATM cell.

7. The apparatus according to claim 6, wherein said restoration means preserves the significant data that has been accommodated in the payload of one of the first and second ATM cells received from the ATM switch and, if cell discard is detected, discards the preserved significant data.

8. The apparatus according to claim 6, wherein the specific area is an area within the payload of the first and second ATM cells and contains no significant data of the short packet.

9. The apparatus according to claim 6, wherein the specific area is an unused area within an ATM cell header.

10. The apparatus according to claim 6, wherein said cell creation means adds on a short-packet header in the payload area of each of the first and second ATM cells and employs an unused area within the short-packet header of each cell as the specific area.

11. An apparatus for executing processing for switching a shown-packet, comprising:

means for judging whether the length of the short packet is larger than length L bytes, where L bytes can be accommodated in one ATM cell;

means for splining the short packet, which has a length greater than the length L bytes, into short-packet portions so as to be accommodated respectively in first and second ATM cells;

cell creation means for accommodating significant data containing one of the short-packet portions and short-packet length information in a payload area of the first ATM cell, accommodating remaining significant data including another short-packet portion, the remaining significant data could not be accommodated in the first ATM cell, in a payload area of the second ATM cell, and inputting the first and second ATM cells to a ATM switch;

restoration means for extracting short-packet portions accommodated in respective ones of first and second ATM cells upon referring to said short-packet length information that has been accommodated in the first ATM cell output from the ATM switch, restoring the original short packet having the length greater than L bytes, and sending the original short packet to a line; and means for generating an error detection code for detecting an error in significant data;

wherein said cell creation means adding on the error detection code in a specific area of the second ATM cell, and said restoration means calculating an error detection code using significant data in the payload area of a received ATM cell, comparing this calculated error code with a received error correction code and detecting absence or presence of cell discard and bit error in data.

12. An apparatus for executing processing for switching a short-packet, comprising:

means for splitting the short packet, which has a length greater than a length L bytes, where L bytes can be accommodated in one ATM cell, into short-packet portions so as to be accommodated respectively in first and second ATM cells;

cell creation means for accommodating the short-packet portions in the first and second ATM cells, accommodating short-cell headers, onto which have been added length information identifying the length of the accommodated short-packet portion, in the first and second ATM cells, and inputting the first and second ATM cells to an ATM switch; and restoration means for discriminating the length of the short-packet portion accommodated in each ATM cell upon referring to the length information contained in the short-cell headers of first and second ATM cells output from the ATM switch, extracting the short-packet portion from each ATM cell based upon the length information, restoring the original short packet having a length greater than L bytes, and sending the original short packet to a line, wherein said cell creation means accommodates L-bytes short-packet portion in the first cell and remaining short-packet portion in the second cell, makes length information LI of the first ATM cell a specific value, e.g., 0, and makes length information LI of the second ATM cell a value indicating the length of the short packet, and when said restoration means detects successive cells for which LI=said specific value holds, or detects successive cells for which LI≧45 holds, said restoration means decides that cell discard has occurred.

13. An apparatus for executing processing for switching a short-packet comprising:
- means for splitting the short packet, which has a length greater than a length L bytes where L bytes are capable of being accommodated in one ATM cell, into short-packet portions so as to be accommodated respectively in first and second ATM cells;
- cell creation means for accommodating the short-packet portions in payloads of the first and second ATM cells, accommodating short-cell headers, onto which have been added information identifying lengths of respective ones of the short-packet portions, in the payloads of the first and second ATM cells, adding on code information, which is for identifying the first and second ATM cells, to a predetermined position of each ATM cell, and inputting the first and second ATM cells to an ATM switch; and
- restoration means for discriminating the length of the short-packet portion accommodated in each ATM cell upon referring to the length information contained in first and second ATM cells output from the ATM switch, identifying the first and second ATM cells upon referring to the code information, extracting the short-packet portion from each ATM cell based upon the length information and code information, restoring the original short packet having a length greater than L bytes, and sending the original short packet to a line.

14. The apparatus according to claim 13, wherein said restoration means detects absence or presence of cell discard upon referring to the code information of the ATM cells received from the ATM switch, and, when cell discard has been detected, discards the short-packet portion that is incapable of completing the short packet.

15. A cell discard method in an ATM exchange for splitting a short packet, which has a length greater than a length L bytes, where L bytes can be accommodated in one ATM cell, into short-packet portions, accommodating the short-packet portions in respective ones of two ATM cells which constitute a first-half cell and a second-half cell, switching the ATM cells by an ATM switch on a per-ATM-cell basis, restoring the original short packet, which has the length greater than L bytes, using the first- and second-half cells after the ATM cells are switched, outputting the original short packet to a line and discarding the first-half cell in a case where only the first-half cell arrives and not the second-half cell, said method comprising the steps of:
- storing, in memory, data indicating whether a second-half cell, which corresponds to a first-half cell that has already arrived, has arrived or not;
- investigating whether the second-half cell has arrived or not by reading out said data periodically by means of polling; and
- discarding the first-half cell if the second-half cell has not arrived even when said data has been investigated a predetermined number of times or more.

16. A cell discard method in an ATM exchange for splitting a short packet, which has a length greater than a length L bytes, where L bytes can be accommodated in one ATM cell, into short-packet portions, accommodating the short-packet portions in respective ones of two ATM cells which constitute a first-half cell and a second-half cell, switching the ATM cells by an ATM switch on a per-ATM-cell basis, restoring the original short packet, which has the length greater than L bytes, using the first- and second-half cells after the ATM cells are switched, outputting the original short packet to a line, and discarding the first-half cell in a case where only the first-half cell arrives and not the second-half cell, said method comprising the steps of:
- storing, in memory, arrival time of a first-half cell, data indicating whether a second-half cell, which corresponds to the first-half cell that has already arrived, has arrived or not, and chain data indicating order of arrival of first-half cells;
- calculating a difference between present time and arrival time of the first-half cell, for which the corresponding second-half cell has not arrived, wherein the first-half cell is the leading cell in the order of arrival; and
- if the difference exceeds a stipulated time, discarding the leading first-half cell and adopting a first-half cell that is next in the order of arrival as the leading first-half cell.

17. The method according to claim 16, further comprising the steps of:
- storing the time at which the second-half cell arrives; and
- comparing the arrival time of this second-half cell with the present time and discarding the first- and second-half cells which have arrived but which have not been read out of the memory and sent to the line upon elapse of a predetermined period of time.

18. The apparatus according to claim 1, wherein said short-packet is a short-packet in AAL Type 2 cell format.

19. The apparatus according to claim 6, wherein said short-packet is a short-packet in AAL Type 2 cell format.

20. The apparatus according to claim 13, wherein said short-packet is a short-packet in AAL Type 2 cell format.

21. The ATM exchange method according to claim 12, wherein said short-packet is a short-packet in AAL Type 2 cell format.

* * * * *